United States Patent
Gromes, Sr. et al.

(10) Patent No.: US 10,599,162 B2
(45) Date of Patent: *Mar. 24, 2020

(54) INDEXER, INDEXER RETROFIT KIT AND METHOD OF USE THEREOF

(71) Applicant: TERYDON, INC., Navarre, OH (US)

(72) Inventors: Terry D. Gromes, Sr., Navarre, OH (US); Terry D. Gromes, Jr., Navarre, OH (US); Kristen E. Gromes, Navarre, OH (US); Jon M. Shockey, Jr., Canton, OH (US); Gordon W. East, North Canton, OH (US); William C. Jackson, Cleveland, OH (US)

(73) Assignee: Terydon, Inc., Navarre, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/155,340

(22) Filed: Oct. 9, 2018

(65) Prior Publication Data

US 2019/0041877 A1 Feb. 7, 2019

Related U.S. Application Data

(63) Continuation of application No. 15/689,483, filed on Aug. 29, 2017, now Pat. No. 10,401,878, and a
(Continued)

(51) Int. Cl.
*G05D 7/06* (2006.01)
*B24C 7/00* (2006.01)
(Continued)

(52) U.S. Cl.
CPC ........... *G05D 7/0617* (2013.01); *B24C 3/327* (2013.01); *B24C 7/0015* (2013.01); *F28G 1/163* (2013.01);
(Continued)

(58) Field of Classification Search
CPC ...... B24C 7/0015; G05B 19/406; G05B 9/02; G05B 2219/45036; G05B 2219/39447;
(Continued)

(56) References Cited

U.S. PATENT DOCUMENTS

| 3,665,608 A | 5/1972 | Stockebrand |
| 4,379,335 A | 4/1983 | Kirsch et al. |

(Continued)

FOREIGN PATENT DOCUMENTS

| CN | 201828811 U | 5/2011 |
| DE | 3426889 | 5/1985 |
| WO | 2009131512 | 10/2009 |

OTHER PUBLICATIONS

Topcon introduces X-22 wireless excavator control system, www.equipmentworld.com/topcon-introduces-x-22-wireless-excavator-control-system/, Annotated, Equipment World Staff, Oct. 28, 2011, 4 pages.

(Continued)

*Primary Examiner* — Robert E Fennema
*Assistant Examiner* — Marzia T Monty
(74) *Attorney, Agent, or Firm* — Sand, Sebolt & Wernow Co., LPA

(57) ABSTRACT

A system and method for cleaning of heat exchanger tubes including an assembly, an indexer, and a communication device provided with specialized software and programming. The indexer includes orthogonally arranged first and second arms. A trolley and sensors are provided on the indexer arms. One or more lances are provided on the trolley to deliver water jets into the openings. Sensors measure displacement as the trolley is moved relative to the heat exchanger's face plate. An operator controls the system from a distance away using the communication device. During setup, the pattern of the face plate is learned and mapped (Continued)

FIG.6 utilizing information from the sensors as one of the inputs. This information is utilized to help navigate the face plate during a subsequent cleaning operation. A kit for retrofitting existing X-Y indexers is also disclosed.

9 Claims, 31 Drawing Sheets

Related U.S. Application Data continuation-in-part of application No. 14/204,265, filed on Mar. 11, 2014, now Pat. No. 10,265,834, said application No. 15/689,483 is a continuation-in-part of application No. 14/204,350, filed on Mar. 11, 2014, now Pat. No. 10,040,169, and a continuation-in-part of application No. 14/204,451, filed on Mar. 11, 2014, now abandoned, application No. 16/155,340, which is a continuation of application No. 15/689,572, filed on Aug. 29, 2017, now Pat. No. 10,408,552, and a continuation-in-part of application No. 14/204,265, filed on Mar. 11, 2014, now Pat. No. 10,265,834, said application No. 15/689,572 is a continuation-in-part of application No. 14/204,350, filed on Mar. 11, 2014, now Pat. No. 10,040,169, and a continuation-in-part of application No. 14/204,451, filed on Mar. 11, 2014, now abandoned.

(60) Provisional application No. 62/381,390, filed on Aug. 30, 2016, provisional application No. 61/821,433, filed on May 9, 2013.

(51) Int. Cl.
  *G06F 3/0488* (2013.01)
  *B24C 3/32* (2006.01)
  *F28G 1/16* (2006.01)
  *F28G 15/00* (2006.01)
  *F28G 15/02* (2006.01)
  *F28G 15/08* (2006.01)
  *F28D 7/16* (2006.01)

(52) U.S. Cl.
  CPC .......... *F28G 15/003* (2013.01); *F28G 15/02* (2013.01); *F28G 15/08* (2013.01); *G06F 3/04886* (2013.01); *F28D 7/16* (2013.01)

(58) Field of Classification Search
  CPC ......... G06F 3/04886; G06F 3/01; B26D 7/22; B26D 5/00; G05D 7/0676; G05D 7/0617; B26F 3/004
  See application file for complete search history.

(56) References Cited

U.S. PATENT DOCUMENTS

| | | |
|---|---|---|
| 4,380,796 A | 4/1983 | Ostby |
| 4,760,859 A | 8/1988 | Brown |
| 4,813,146 A | 3/1989 | Jaluzot |
| 4,918,817 A | 4/1990 | Eaton |
| 5,092,193 A | 3/1992 | Yanagisawa |
| 5,148,600 A | 9/1992 | Chen et al. |
| 5,276,970 A | 1/1994 | Wilcox et al. |
| 5,838,882 A | 11/1998 | Gan et al. |
| 5,954,494 A | 9/1999 | Goldsmith et al. |
| 6,232,736 B1 | 5/2001 | Bullen |
| 6,457,792 B1 | 10/2002 | Saund et al. |
| 6,681,839 B1 | 1/2004 | Balzer |
| 6,877,930 B2 | 4/2005 | Stromdahl et al. |
| 7,228,125 B2 | 6/2007 | Adachi et al. |
| 7,846,260 B2 | 12/2010 | Jiang et al. |
| 8,057,607 B2 | 11/2011 | Gardner et al. |
| 8,078,297 B2 | 12/2011 | Lasher et al. |
| 8,195,344 B2 | 6/2012 | Song et al. |
| 8,612,641 B1 | 12/2013 | Bozarth et al. |
| 8,676,390 B2 | 3/2014 | Berry, Jr. et al. |
| 8,978,276 B2 | 3/2015 | Moon, Jr. et al. |
| 9,363,220 B2 | 6/2016 | Ubillos et al. |
| 10,024,613 B2 | 7/2018 | Mathis |
| 2003/0065424 A1 | 4/2003 | Erichsen et al. |
| 2003/0147727 A1 | 8/2003 | Fujishima et al. |
| 2003/0202091 A1 | 10/2003 | Garcia et al. |
| 2004/0035445 A1 | 2/2004 | Saxon et al. |
| 2004/0093850 A1 | 5/2004 | Horii et al. |
| 2004/0182842 A1 | 9/2004 | Denney et al. |
| 2005/0196314 A1 | 9/2005 | Petersen et al. |
| 2006/0090622 A1 | 5/2006 | Adkins |
| 2006/0212203 A1 | 9/2006 | Furuno |
| 2008/0062140 A1 | 3/2008 | Hotelling et al. |
| 2008/0175569 A1 | 7/2008 | Johnson |
| 2008/0204426 A1 | 8/2008 | Hotelling et al. |
| 2008/0282583 A1 | 11/2008 | Koellner et al. |
| 2009/0097502 A1 | 4/2009 | Yamamoto |
| 2010/0095559 A1 | 4/2010 | Buckner |
| 2010/0185364 A1 | 7/2010 | McClure |
| 2010/0186971 A1 | 7/2010 | Seyffert |
| 2010/0313451 A1 | 12/2010 | Trubiano |
| 2011/0186657 A1 | 8/2011 | Haviland |
| 2011/0287692 A1 | 11/2011 | Erichsen et al. |
| 2011/0301755 A1 | 12/2011 | Anderson |
| 2011/0315164 A1 | 12/2011 | DesOrmeaux |
| 2012/0007885 A1 | 1/2012 | Huston |
| 2012/0061108 A1 | 3/2012 | Cerrano |
| 2012/0067370 A1 | 3/2012 | Crock et al. |
| 2012/0229662 A1 | 9/2012 | Lankalapalli et al. |
| 2012/0330449 A1 | 12/2012 | Edwards et al. |
| 2013/0030589 A1 | 1/2013 | Pessina et al. |
| 2013/0033090 A1 | 2/2013 | Jokonya |
| 2013/0042894 A1 | 2/2013 | Gromes, Sr. |
| 2013/0167697 A1 | 7/2013 | Reukers |
| 2013/0271004 A1 | 10/2013 | Min et al. |
| 2014/0045409 A1 | 2/2014 | Zhang et al. |
| 2014/0046477 A1 | 2/2014 | Brahan et al. |
| 2015/0065114 A1 | 3/2015 | Dua |
| 2015/0379785 A1 | 12/2015 | Brown, Jr. et al. |
| 2016/0243597 A1 | 8/2016 | Shawver |
| 2017/0102195 A1 | 4/2017 | Watkins |
| 2018/0281030 A1 | 10/2018 | Eisermann et al. |
| 2018/0292151 A1 | 10/2018 | Mathis |

OTHER PUBLICATIONS

WardJet Brochure, X-Classic Controller, 2012, 3 pages.

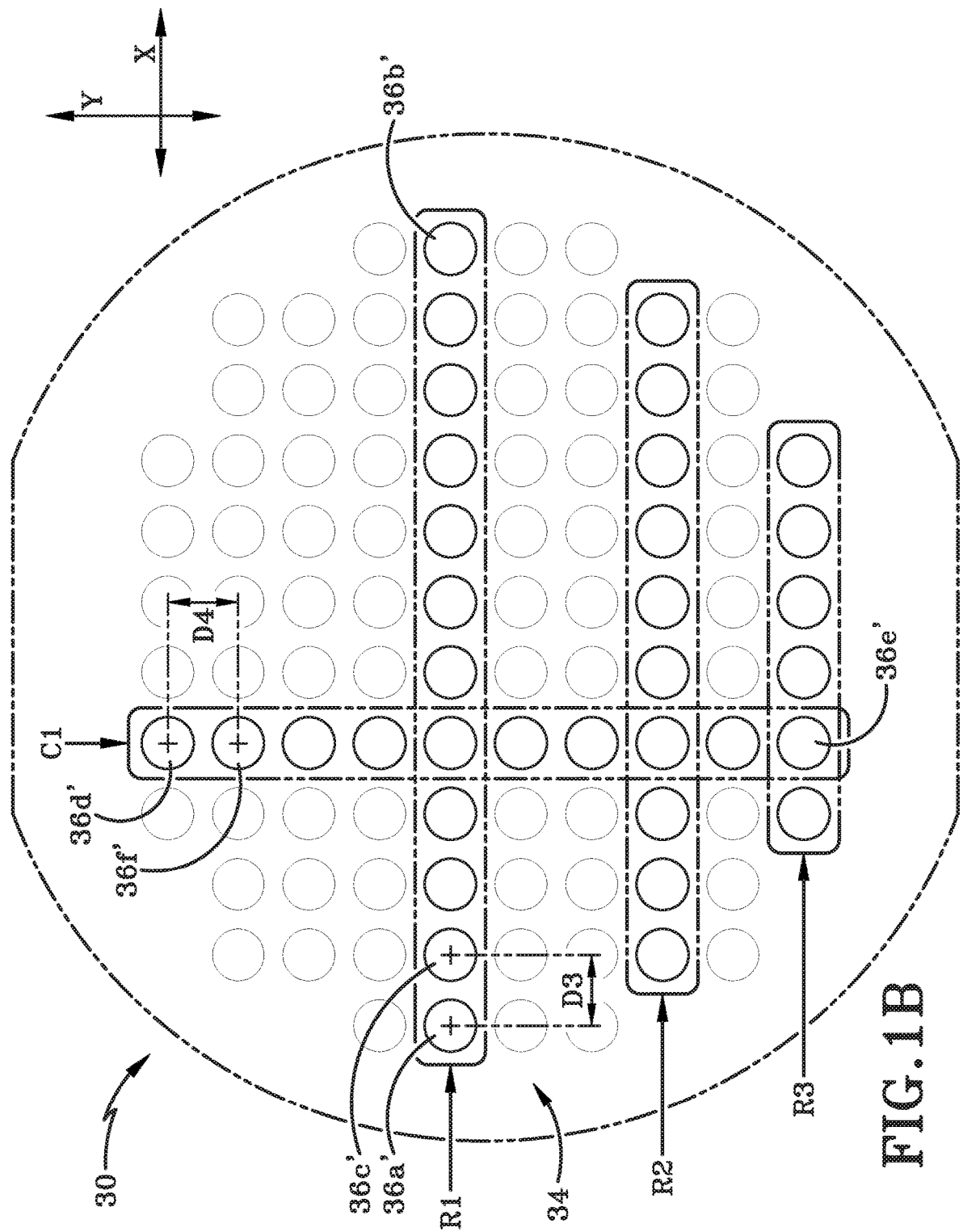

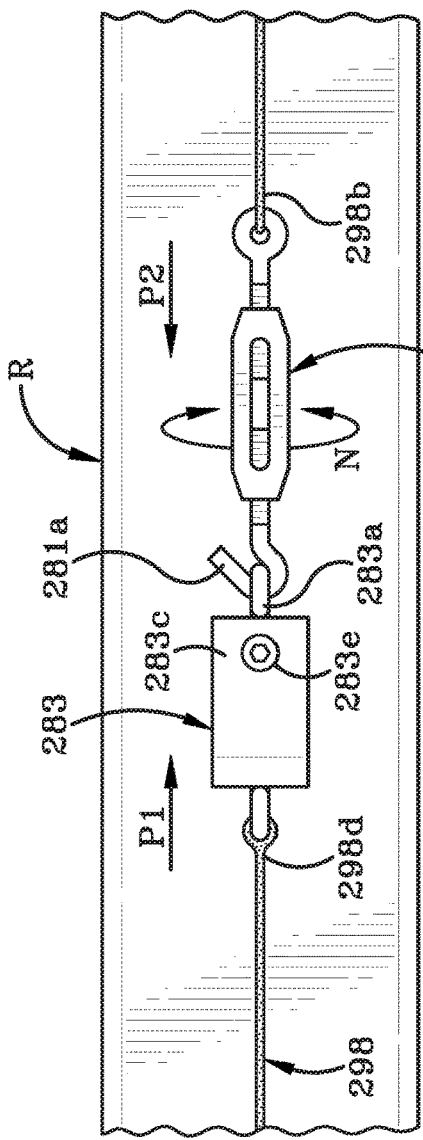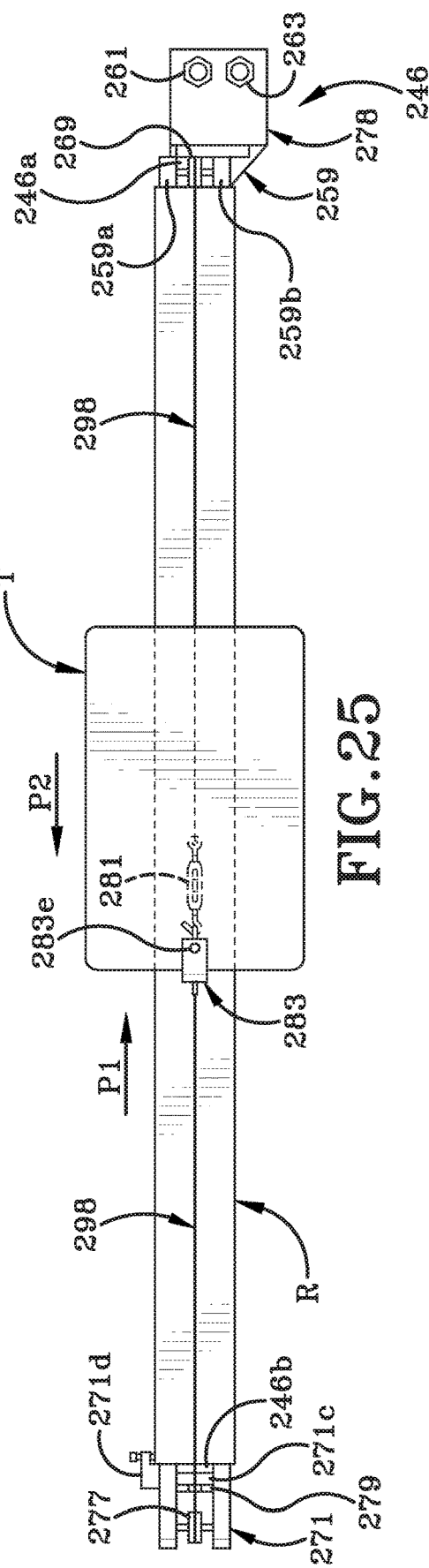
FIG.24
FIG.25

INDEXER, INDEXER RETROFIT KIT AND METHOD OF USE THEREOF

CROSS REFERENCE TO RELATED APPLICATIONS

This application is a Continuation of U.S. patent application Ser. No. 15/689,483 filed Aug. 29, 2017, which claims the benefit of U.S. Provisional Patent Application Ser. No. 62/381,390, filed Aug. 30, 2016.

U.S. patent application Ser. No. 15/689,483 is a Continuation-in-Part of U.S. patent application Ser. No. 14/204,265 filed Mar. 11, 2014 which claims the benefit of U.S. Provisional Patent Application Ser. No. 61/821,433 filed May 9, 2013.

U.S. patent application Ser. No. 15/689,483 is also a Continuation-in-Part of U.S. patent application Ser. No. 14/204,350 filed Mar. 11, 2014, now U.S. Pat. No. 10,040,169, which claims the benefit of U.S. Provisional Patent Application Ser. No. 61/821,433 filed May 9, 2013.

U.S. patent application Ser. No. 15/689,483 is also a Continuation-in-Part of U.S. patent application Ser. No. 14/204,451, filed Mar. 11, 2014 which claims the benefit of U.S. Provisional Patent Application Ser. No. 61/821,433 filed May 9, 2013.

This application is also a Continuation of U.S. patent application Ser. No. 15/689,572, filed Aug. 29, 2017, which claims the benefit of U.S. Provisional Patent Application Ser. No. 62/381,390, filed Aug. 30, 2016.

U.S. patent application Ser. No. 15/689,572 is a Continuation-in-Part of U.S. patent application Ser. No. 14/204,265 filed Mar. 11, 2014 which claims the benefit of U.S. Provisional Patent Application Ser. No. 61/821,433 filed May 9, 2013.

U.S. patent application Ser. No. 15/689,572 is also a Continuation-in-Part of U.S. patent application Ser. No. 14/204,350 filed Mar. 11, 2014, now U.S. Pat. No. 10,040,169, which claims the benefit of U.S. Provisional Patent Application Ser. No. 61/821,433 filed May 9, 2013.

U.S. patent application Ser. No. 15/689,572 is also a Continuation-in-Part of U.S. patent application Ser. No. 14/204,451, filed Mar. 11, 2014 which claims the benefit of U.S. Provisional Patent Application Ser. No. 61/821,433 filed May 9, 2013.

The entire disclosures of the above-listed applications are all incorporated herein by reference.

BACKGROUND

Technical Field

The present invention is directed generally to equipment and a method for cleaning heat exchanger tubes. More particularly, the invention relates to water-jet cleaning equipment and a method of setting up and using the same. Specifically, the invention is directed an indexer system including an indexer or an indexer retrofit kit and a communication device for controlling the same; where the indexer system directs high pressure jets of water into heat exchanger tubes after a setup procedure where the tube bundle pattern and the x/y coordinates of the tube openings on the heat exchanger's tube face are determined.

Background Information

Heat exchangers typically include a tube bundle, i.e., a plurality of individual tubes, encased in a cylindrical outer shell. An end of each tube terminates in a face plate that is secured to one end of the cylindrical shell by a flange. The face plate defines a plurality of openings therein and each of these openings permits access to the bore of one of the tubes in the tube bundle.

After a heat exchanger has been used for some time the bores of the heat exchanger tubes tend to become partially or completely blocked with material that has been deposited therein. It is necessary to clean out this accumulated material from time to time. The typical way of cleaning these tubes is by directing a high pressure water-jet into the bore and blasting away the built-up material.

One of the issues of cleaning heat exchanger tubes with a high pressure water-jet is that the high-pressure stream of water has to be directed reasonably accurately into the opening of each tube. If the water-jet is not in the correct location relative to the perimeter of the opening, not only will the tube fail to be scoured clean of built-up material but the water-jet may be deflected through contacting part of the face plate surrounding the tube opening. The deflected water-jet may seriously injure the operator or cause damage to other objects in the vicinity of the heat exchanger simply because of the pressure under which the water is delivered to the nozzles on the cleaning apparatus.

The tubes in a heat exchanger tube bundle are typically arranged in such a manner that the openings in the face plate tend to form a pattern. The openings are spaced horizontally and vertically from each other and may be offset at an angle relative to each other and to an X-axis and Y-axis. The pattern and spacing of these openings tends to vary from one heat exchanger to another. Additionally, the diameters of the openings in the face plates (and the diameters of the tubes in the shell) may vary from one heat exchanger to the next. It is therefore problematic to set up a water-jet cleaning apparatus to accurately aim the water jets into the tube openings. A lot of time-consuming manual adjustment has to be undertaken to make sure the tubes are all adequately cleaned. It is even more problematic to move a cleaning apparatus from one heat exchanger to another without expending quite a long time in setting-up the cleaning apparatus on both pieces of equipment.

SUMMARY

There is therefore a need in the art for an improved water-jet cleaning apparatus that is able to be quickly and easily setup to accommodate differently patterned tube openings in different heat exchangers and which is capable of adequately cleaning all of the tubes in each heat exchanger with which it is engaged. The indexer system and method disclosed herein are designed to address at least some of the issues with prior art devices.

The indexer system disclosed herein is useful for moving a nozzle of a water-jet cleaning apparatus quickly and precisely from one opening on a tube bundle to another. The system may include an indexer that enables the operator to be located remote, i.e., a distance away, from the nozzles and therefore at a safer distance from the high pressure water-jet utilized for cleaning. Still further, the indexer disclosed herein may be operable via an electronic device such as a tablet or smart phone. Furthermore, the electronic device may be provided with special programming that is used to controlling the operation of the indexer. The operator may perform a number of quick and simple set up maneuvers with the indexer system and the programming stores the relative distance measurements between two adjacent row and column openings on the face plate. The programming maps out the pattern of the openings in the face plate and during a subsequent cleaning operation, the derived relative distance measurements may be used to react to operator position requests. In other words, the stored information aids the operator in progressively moving the cleaning system's nozzles from one opening in the heat exchanger face plate to another until all tubes in the heat exchanger have been cleaned. This may all be accomplished without putting the operator at unnecessary risk.

A system and method for cleaning of heat exchanger tubes including an assembly, an indexer, and a communication device provided with specialized software and programming. The indexer includes orthogonally arranged first and second arms. A trolley and sensors are provided on the indexer arms. One or more lances are provided on the trolley to deliver water jets into the openings. Sensors measure displacement as the trolley is moved relative to the heat exchanger's face plate. An operator controls the system from a distance away using the communication device. During setup, the pattern of the face plate is learned and mapped utilizing information from the sensors as one of the inputs. This information is utilized to help navigate the face plate during a subsequent cleaning operation. The operator uses the communication device to remotely move the trolley from opening to opening delivering high pressure water jets into the same to clean the associated tubes. A kit for retrofitting existing X-Y indexers is also disclosed.

In one aspect, the disclosure may provide an indexer for a water-jet cleaning system, wherein the indexer comprises a first arm; a second arm that is orientable orthogonally to the first arm; wherein the first arm is movable relative to the second arm and wherein the second arm is adapted to be fixedly mounted to a device to be cleaned; a trolley engaged with the first arm; wherein the trolley is movable relative to the first arm; one or more lances engaged with the trolley, wherein each of said one or more lances is adapted to deliver a water jet to the device to be cleaned; and a sensor provided on the indexer, said sensor configured to determine a location of the trolley during operation of the water-jet cleaning system. The sensor may be a distance measurement sensor.

In another aspect, the disclosure may provide a method of cleaning a plurality of tubes in a tube bundle of a heat exchanger, wherein each tube has a bore having an opening thereto defined in a face plate provided at one end of the tube bundle; said method comprising providing a water-jet cleaning system including n X-Y indexer having a first arm and a second arm that are oriented at right angles to each other; a trolley; one or more lances provided on the trolley, and a sensor that measures distance; engaging the X-Y indexer on the heat exchanger so that the one or more lances of the trolley are adjacent the face plate; moving the trolley relative to the face plate; measuring a distance the trolley moves relative to the face plate with the sensor; determining, with the aid of the measured distances, a set of x/y coordinates for at least two horizontally spaced apart openings from a plurality of openings defined in the face plate and for at least two vertically spaced apart openings from the plurality of openings in the face plate; mapping a pattern of the plurality of openings in the face plate; and initiating a cleaning operation using the mapped pattern.

The steps of determining the set of coordinates includes selecting two non-contiguous horizontally spaced apart openings from the plurality of openings; and selecting two non-contiguous vertically spaced apart openings from the plurality of openings. The method may further comprise providing a communication device including programming for operating the water-jet cleaning system; holding the communication device in a hand of an operator; wirelessly connecting the communication device to the indexer; contacting a user interface on the communication device with the hand of the operator to move the trolley relative to the face plate; further contacting the user interface with the hand of the operator to actuate the sensor to measure distance; recording in the communication device the set of x/y coordinates for the at least two horizontally spaced apart openings and for the at least two vertically spaced apart openings; mapping, with the communication device, the pattern of the plurality of openings in the face plate; and initiating the cleaning operation by contacting the user interface with the hand of the operator.

The method may further comprise standing a distance remote from the indexer and the face plate. Furthermore, the measuring with the sensor includes connecting a first end of a draw wire to a sensor provided on the first arm of the indexer; connecting a second end of the draw wire to the trolley; unwinding a first length of the draw wire from a spool adjacent the sensor when the trolley is moved in a first direction; or winding a second length of the draw wire onto the spool when the trolley is moved in a second direction; wherein the measuring of the distance includes using the first length or the second length as the distance measurement; and registering in the communication device the distance measurement.

The method may further comprise providing a magnetostrictive sensor as the sensor that measures distance; providing a magnet on the trolley; measuring a first distance when the magnet is moved along the magnetostrictive sensor.

The method may further comprise actuating, by contacting the user interface on the communication device with the hand of the operator, a flow of water from each of the one or more lances; directing the flow of water from each of the one or more lances and into one or more of the plurality of opening; cleaning material from the bore of the tube associated with each of the one or more of the plurality of openings; progressively moving, by contacting functions on the user interface of the communication device with the operator's hand, the trolley relative to the face plate from the one of the one or more of the plurality of openings to additional openings of one or more openings; and progressively cleaning the tubes in the tube bundle.

In yet another aspect, the disclosure may provide a retrofit kit for an X-Y indexer, said X-Y indexer including a first indexer rail, a second indexer rail; and a trolley engageable with the first indexer rail or the second indexer rail; wherein the trolley positions at least one nozzle for dispensing a water jet therefrom; wherein the retrofit kit comprises a first arm adapted to be engaged with the first indexer rail; and a sensor provided on the first arm; wherein the sensor is a distance measurement sensor.

The retrofit kit may include a slider mounted for movement along the first arm in a first direction or in a second direction. The sensor may be a string potentiometer and the retrofit kit may further comprise a draw wire extending from the sensor to the slider; and a spool positioned between the sensor and the draw wire; wherein when the slider moves in a first direction, a first length of draw wire is unwound from the spool and when the slider moves in a second direction, a second length of draw wire is wound onto the spool.

In other embodiments the sensor is a magnetostrictive sensor and a magnet is provided on the slider to work in conjunction with the sensor.

The retrofit fit kit may further include a cable engaged with the slider and adapted to be engaged with a trolley of the X-Y indexer; wherein the slider is movable by the cable along the first arm in response to movements of the trolley of the X-Y indexer. A pulley assembly may be provided on the first arm a distance from the sensor; and a section of the cable wraps around part of the pulley assembly. A turnbuckle assembly may be engaged with a first region of the cable; and a clamp may be mountable on the slider, said clamp being engaged with a second region of the cable; wherein the turnbuckle assembly and clamp are selectively engaged with each other or disengaged from each other.

The retrofit kit may further include a control device remote from the sensor; and wherein the control device is operatively engaged with the sensor. The retrofit kit may further comprise a second arm; adapted to be engaged with the second indexer rail; and wherein the second arm is oriented at right angles to the first arm when the retrofit kit is engaged with the X-Y indexer. A second sensor may be provided on the second arm; and the second sensor is a distance measurement sensor. The retrofit kit may include a second slider mounted for movement along the second arm in a first direction or in a second direction. The second sensor is a string potentiometer and wherein the retrofit kit may further comprise a second draw wire extending from the second sensor to the second slider; and a second spool positioned between the second sensor and the second draw wire; wherein when the second slider moves in the first direction, a first length of the second draw wire is unwound from the second spool and when the second slider moves in the second direction, a second length of the second draw wire is wound onto the second spool. In other embodiments, the second sensor is a magnetostrictive sensor and a second magnet is provided on the second slider.

In other aspects, the disclosure may provide a method of cleaning a plurality of tubes in a tube bundle of a heat exchanger, wherein each tube has a bore having an opening thereto defined in a face plate provided at one end of the tube bundle; said method comprising providing an X-Y indexer engaged with the heat exchanger; wherein the X-Y indexer has a first indexer rail and a second indexer rail that are oriented at right angles to each other; and wherein the X-Y-indexer includes a trolley having at least one lance that is positionable to direct a water jet into the opening to one of the tubes in the tube bundle; providing a retrofit kit comprising a first arm and a sensor provided on the first arm; wherein the sensor is a distance measurement sensor; engaging the first arm of the retrofit kit with the first indexer rail; moving the trolley on the X-Y indexer relative to the face plate; and determining a location of the trolley relative to the face plate using the sensor.

The method may further comprise providing a second arm and a second sensor as part of the retrofit kit; wherein the second sensor is a distance measurement second; engaging the second arm of the retrofit kit with the second indexer rail; and determining the location of the trolley relative to the face plate using the second sensor. The method may further comprise holding a communication device in an operator's hand; wherein the communication device includes programming for mapping a pattern of openings on the face plate; linking the sensor to the communication device; directing movements of the trolley by contacting a user interface on the communication device; and mapping the pattern of openings on the face plate. The mapping may include determining a center of each of a sample set of openings on the face plate using the sensor. The method may further comprise positioning the operator a distance away from the heat exchanger; contacting a function on the communication device using the operator's hand; initiating a cleaning operating of the tubes of the tube bundle with the indexer using the function; moving the hand of the operator on the user interface of the communication device to move the trolley and thereby the lances from one opening on the face plate to another; initiating the flow of water through the lances by contacting another function on the communication device with the operator's hand; and ceasing the flow of water through the lances by contacting an additional function on the communication device or by breaking contact of the operator's hand with the communication device.

The method may further comprise connecting a hose to a nozzle provided on the trolley; connecting the hose to a remote water supply; delivering high pressure water from the water supply to the nozzle via the hose; initiating a cleaning operation; and delivering a high pressure water jet from the nozzle and into a tube of a heat exchanger. The method may further comprise a step of wirelessly controlling one or more of the delivery of high pressure water; the initiation of the cleaning operation and the delivery of the high pressure water jet from the nozzle; and cleaning the tube of the heat exchanger.

In another aspect, the disclosure may provide a system for location and cleaning of tubes in a heat exchanger, said system comprising: an assembly adapted to deliver a high pressure water jet through a hose; a communication device; and an indexer operatively engaged with the assembly and the communication device; wherein the indexer comprises: a first arm that extends along a Y-axis; a second arm that extends along an X-axis, said first and second arms intersecting each other and being movable relative to each other; engagement assemblies for releasably attaching each of the first and second arms to the heat exchanger; a trolley engageable with the first arm and being movable therealong; a gear mounted for rotation on the trolley; a collar engaged with the gear; wherein the hose from the assembly is engageable with the collar; and a sensor located on the indexer; said sensor being operatively engaged with the trolley and being configured to measure a displacement or an absolute positioning of the trolley during positioning of the trolley over any selected opening in a face plate of the heat exchanger, where the selected opening provides access to a tube to be cleaned.

The system may further comprise software and programming in the communication device for controlling the indexer and assembly, said programming controlling the movement of the trolley of the indexer relative to the face plate.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

FIG. 1B is an enlargement of an alternative tube face showing the openings arranged in an exemplary second pattern;

FIG. 24 is an enlarged front elevation view of a turnbuckle assembly and clamp of the kit engaged with a cable and positioned over a region of the exterior surface of the first indexer rail;

FIG. 25 is front elevation view of the second arm of the kit engaged with the first indexer rail;

Similar numbers refer to similar parts throughout the drawings.

DETAILED DESCRIPTION

Figure 1:
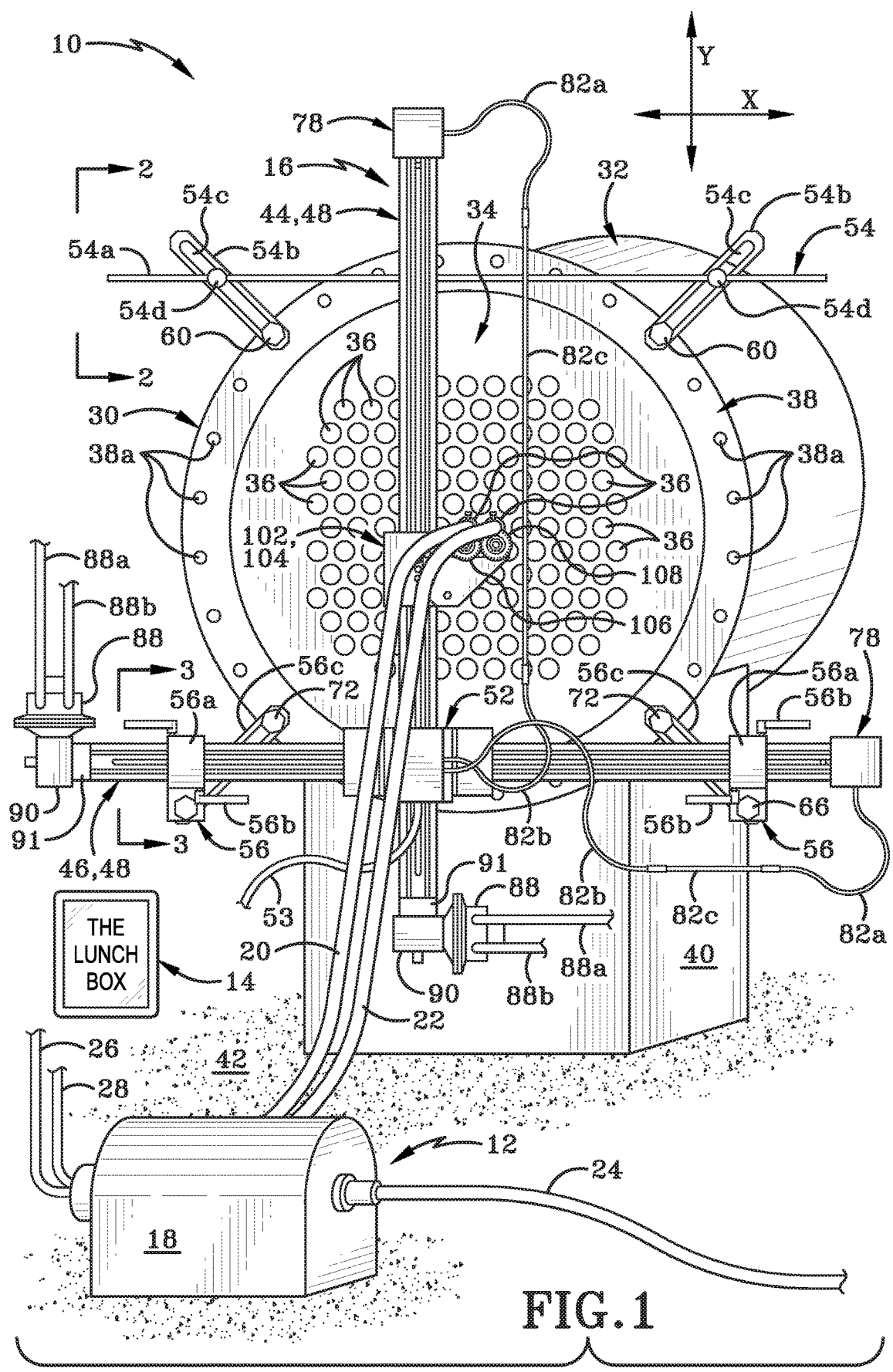
FIG. 1 is a front perspective view of a system for cleaning heat exchanger tubes in accordance with an aspect of the present disclosure, where an indexer of the system is shown engaged with a heat exchanger tube.

FIG. 1 shows, in the upper right hand corner thereof, a symbol to represent directions utilized in the description that follows. The symbol shows an X-axis to represent a horizontal axis or direction and a Y-axis to represent a vertical axis or direction The X-axis and Y-axis are oriented at right angles to each other.

Referring to FIGS. 1-14, there is shown a water-jet cleaning system in accordance with an aspect of the present disclosure, generally indicated at 10. System 10 may include a water delivery system 12 for providing water for a cleaning operation, a communication device 14, and an indexer 16 in accordance with the aspect of the present disclosure. Communication device 14 may be used to control and operate indexer 16 and water delivery system 12. While system 10 is described herein as being useful for cleaning heat exchanger tubes, it will be understood by those skilled in the art that system 10 may be used for a wide variety of other purposes. An operator using communication device 14 may control the various components of the water-jet cleaning system 10.

It should be understood that while the system 10 is named a "cleaning system" in this description, the system 10 may be used for any of a variety of purposes other than "cleaning". Furthermore, while the material moving through and being delivered to a surface by system 10 is named herein as "water", it should be understood that any fluid or liquid other than actual water may flow through system 10. The term "water" should therefore be understood to encompass any fluid or liquid moving through system 10 and should further be understood to include fluids or liquids that may include solids therein. For example, a gas including abrasive particles may flow through and be delivered to a surface by system 10. Such a gas-entrained abrasive should be understood to be encompassed by the term "water".

It should be noted that while water delivery system 12 is illustrated as a hose reel assembly in the attached figures, any other system, device, or method for delivering water or other liquids to be used in a cleaning operation may comprise part of water-jet cleaning system 10. Water delivery system 12 preferably delivers water or cleaning fluid under high pressure to indexer 16. The hose reel assemblies disclosed in U.S. Pat. No. 9,062,921 (Gromes) and in U.S. patent application Ser. No. 14/713,664 filed May 15, 2015 (Gromes) and entitled "Hose Reel Assembly", are examples of a suitable water delivery system 12 that may be utilized in system 10. The illustrated hose reel assembly includes a cover 18 that surrounds and protects a hose reel, one or more motors, pumps, and valves. A first hose 20 and a second hose 22 may connect the hose reel assembly to indexer 16. A third hose 24 may connect the hose reel assembly to a remote water or liquid source (not shown). First and second hydraulic input/output lines 26, 28 extend outwardly from water delivery system 12 and may be operatively engaged with a remote hydraulic fluid source (not shown).

The valves in the hose reel assembly may include shut-off valves that may be actively controlled by the operator using communication device 14 or the shut-off valves may be activated if the operator breaks contact with communication device 14.

Communication device 14 may be any one of a variety of programmable electronic devices. These may include, but are not limited to, a smart-phone, a tablet, a lap-top computer, and a control table. Communication device 14 may be provided with special programming that enables communication device 14 to be used to control and operate water delivery system 12 and indexer 16. A particularly suitable communication device 10 and a program for this purpose may be a tablet that is provided with programming marketed under the tradename "THE LUNCH BOX™" (Terydon Incorporated of Navarre, Ohio, US). A wireless communication device and a method for controlling water cleaning equipment utilizing the communication device and THE LUNCH BOX™ programming is disclosed in several patent applications all commonly owned by Terydon Incorporated. These applications include U.S. patent application Ser. No. 14/204,265 filed Mar. 11, 2014 entitled "Adaptive Control System"; Ser. No. 14/204,350 filed Mar. 11, 2014 entitled "System and Method for Wireless Control using a Deadman Switch"; Ser. No. 14/204,451, filed Mar. 11, 2014, entitled "Mechanism for Remotely Controlling Water-jet Equipment"; Ser. No. 14/204,555 filed Mar. 11, 2014 and entitled "Method and Apparatus for using an Application to Control with a Deadman's Switch; and application Ser. No. 14/997,035 filed Jan. 15, 2015 and entitled "Mechanism for Remotely Controlling Equipment". The entire disclosures of all of these applications are incorporated herein by reference.

Communication device 14 may control water delivery system 12 and indexer 16 wirelessly as wireless communication will permit the operator of system 10 to be located a distance away from indexer 16 and therefore a distance away from the water-jet cleaning operation performed thereby. Wireless operation from a remote distance increases safety for the operator as the high pressure water-jets delivered by indexer 16 could seriously injure the operator if he or she comes into contact therewith.

Communication device 14 may be Bluetooth® enabled and may be paired to multiple devices via a master/slave relationship. For example, the communication device 14 may be connected to THE LUNCH BOX™, pump(s) in water delivery system 12 and/or to other components on indexer 16. A user interface on communication device 14 may include a "Connect button" that allows device 14 to scan for other devices or components of system 10 with which to pair communication device 14. A listing or menu of Bluetooth® enabled devices may appear on the user interface and the operator may then select which devices or components to link with communication device 14. Appropriate security codes may be required to enable the pairing and, once connected, the Bluetooth® connectivity may not be severed from an outside source. If Bluetooth® connection is lost then all operations controlling indexer 16, water delivery system 12 etc. will cease automatically and substantially immediately, i.e., with only the delay required to break communication and shut-off operations (around a few seconds).

Figure 1A:
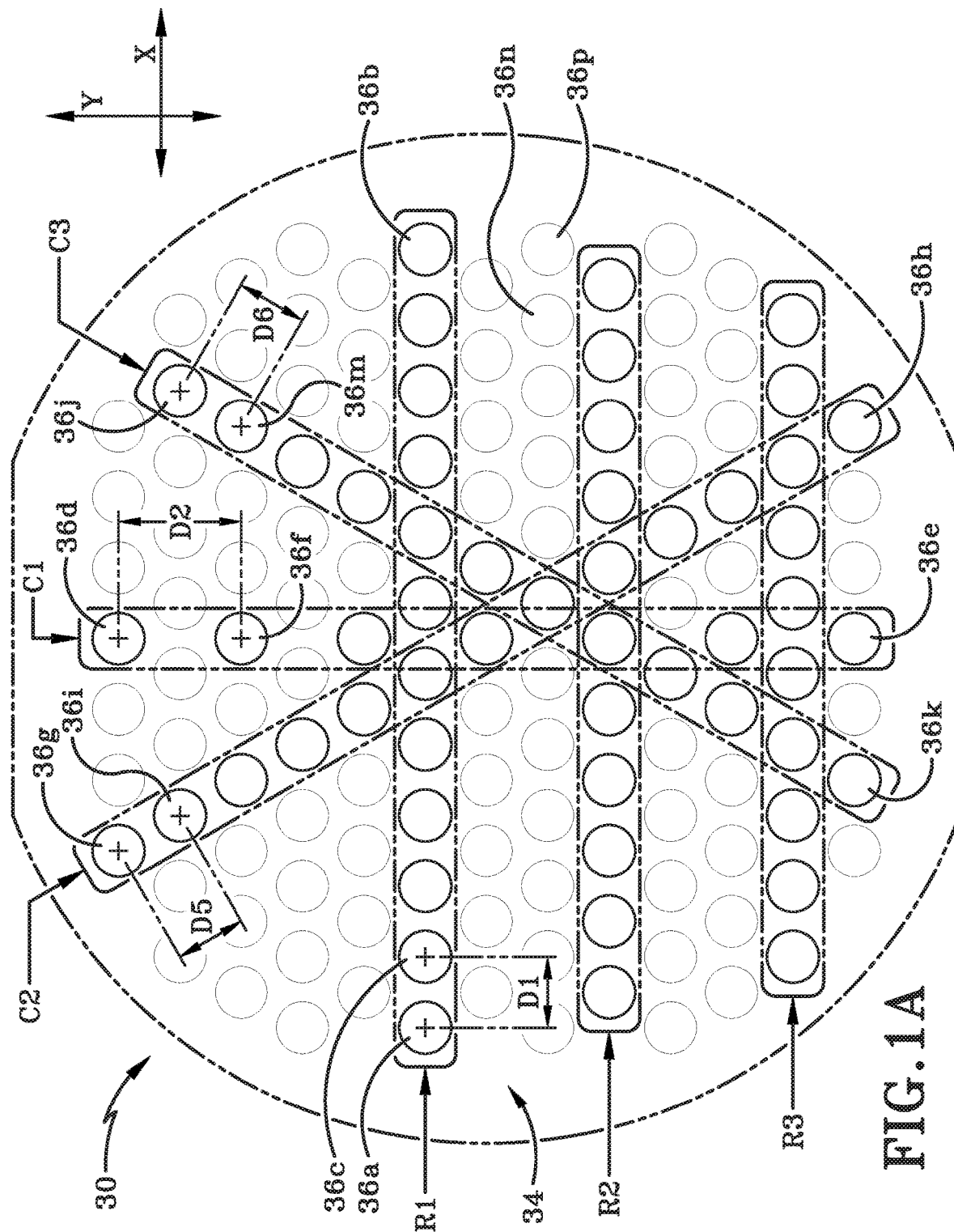
FIG. 1A is an enlargement of the tube face shown in FIG. 1 showing the openings in the tube face arranged in an exemplary first pattern.
Figure 2:
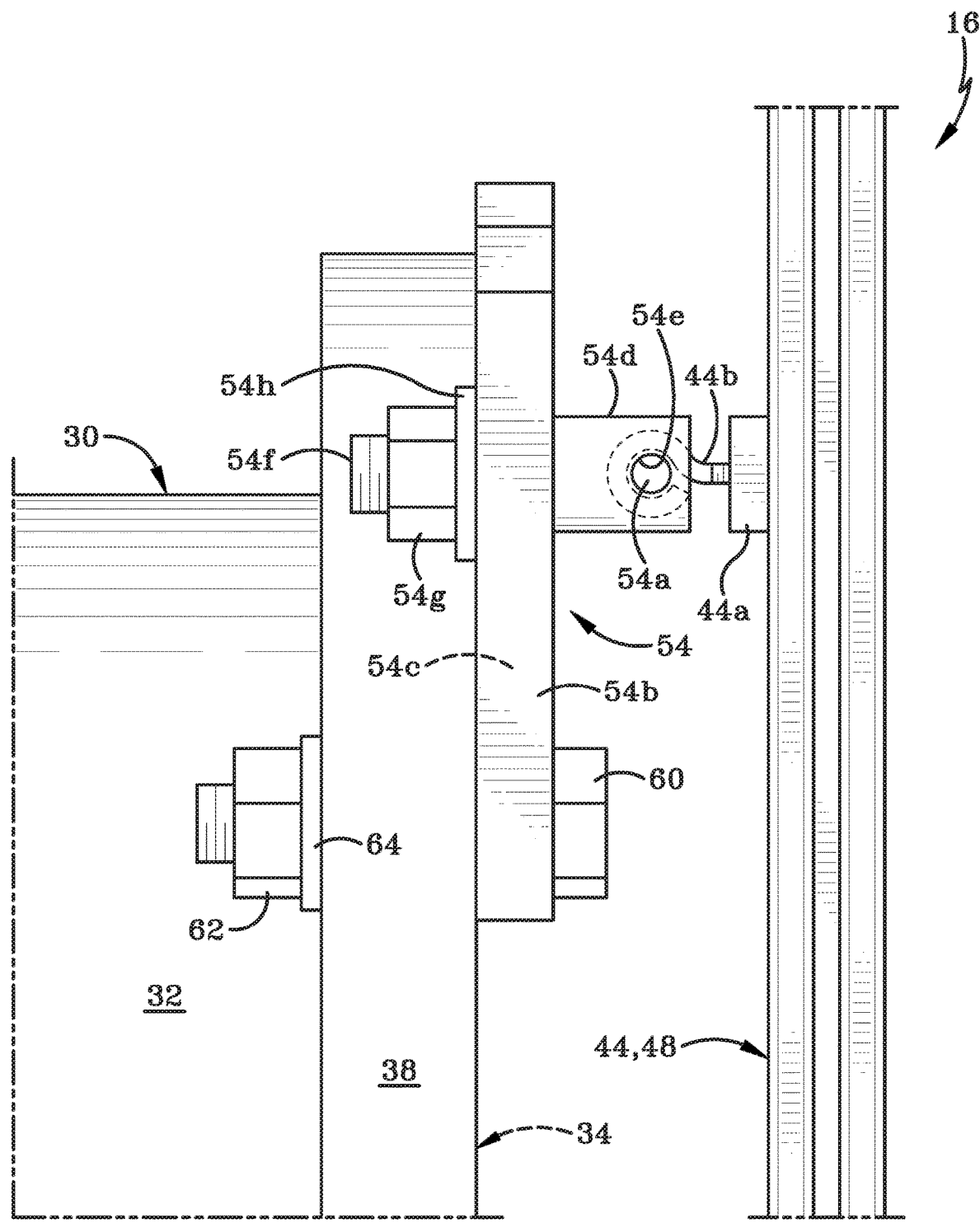
FIG. 2 is a left side view of the heat exchanger taken along line 2-2 of FIG. 1 and showing the indexer engaged with the heat exchanger; several background components have been removed from this figure for the sake of clarity.

FIGS. 1-1B illustrate an exemplary heat exchanger 30 that may be cleaned using system 10. Heat exchanger 30 may comprise a tube bundle (not shown) encased in a hollow cylindrical shell 32. A tube bundle may be comprised of a plurality of individual cylindrical tubes that are arranged side-by-side and one above the other. Each tube in the tube bundle terminates in a face plate 34 that is provided at one end of shell 32. A plurality of openings 36 is defined in face plate 34 and each opening 36 provides access to a bore of one of the tubes in the tube bundle. Because the tubes in the tube bundle of heat exchanger 30 may be arranged in a particular manner relative to each other, the openings 36 in face plate 34 tend to be arranged in a pattern. A first exemplary pattern of openings 36 is shown in FIG. 1A and a second exemplary pattern of openings 36 is shown in FIG. 1B. The pattern shown in FIG. 1A may be termed a "honeycomb" pattern while the pattern shown in FIG. 1B may be termed a "straight line" pattern. It will be understood that other different patterns of openings 36 may be presented on face plate 34 since these patterns are the result of the specific arrangement and configuration of the tubes in the tube bundle of a specific heat exchanger. Typically, however, face plate 34 will tend to show a honeycomb or straight line pattern but the spacing and angle between the various openings may change from heat exchanger to heat exchanger.

Face plate 34 may be secured to one end of shell 32 by a flange 38. Flange 38 may define a plurality of apertures 38a therein that are located at intervals around a circumference of flange 38. Indexer 16 may be selectively engaged with flange 38 or any other part of heat exchanger 30 in any suitable manner. Heat exchanger 30 is shown in FIG. 1 supported on a base 40 that rests upon a surface 42. It will be understood, however, that the base and surface are for the purposes of illustration only.

Indexer 16 may include a first arm 44 and a second arm 46 that may be oriented at right angles to each other. As shown in FIG. 1, indexer 16 may be engaged with flange 38 in such a way that first arm 44 is substantially parallel to the Y-axis and second arm 46 is substantially parallel to the X-axis. It will be understood, however, that indexer 16 may be engaged in a different manner with flange 38 so that first arm 44 may be oriented at an angle relative to the Y-axis and/or second arm 46 may be oriented at an angle to X-axis. The orientation and positioning of first arm 44 and second arm 46 of indexer 16 may be selected to accommodate any pattern of openings 36 in a face plate 34 of any heat exchanger 30.

FIG. 1A shows, by way of example only, a pattern of openings 36 on face plate 34. Openings 36 are shown arranged in rows and columns, such as rows R1, R2, R3, and columns C1, C2 and C3. Rows R1, R2, and R3 may be oriented generally parallel to the X-axis. Row R1 is identified in this figure by a first highlighted region and is shown as including twelve openings. A first opening 36a may be provided at first end of the row R1 and a second opening 36b may be provided at an opposite second end of the row R1. For the operation of system 10, the second opening 36b does not have to be on the opposite second end of row R1 but may simply be spaced some distance laterally away from first opening 36a. Preferably, for the method described herein, second opening 36b should not be adjacent first opening 36a but spaced a distance away therefrom. In other words, first opening 36a and second opening 36b preferably are non-contiguous. Another opening 36c may be located adjacent first opening 36a and openings 36a and 36c may be spaced a distance "D1" apart from each other. The openings along row R1 may be provided at substantially equal intervals from each other, namely, a distance "D1" away from each other.

While the openings in row R1 ideally may be generally parallel to the X-axis, the row of openings may, in reality, be oriented at a slight angle or slope relative to the X-axis. For example, if an imaginary line is drawn from a center of first opening 36a (marked by the + sign) to a center of second opening 36b, that line might be sloped (i.e., oriented at a slight angle) relative to the X-axis instead of being parallel to the X-axis.

FIG. 1A also shows, by way of example only, a plurality of columns of openings such as columns C1, C2, C3. Columns C1, C2 are identified by the second, third and fourth highlighted regions on FIG. 1A. Column C1 is shown as being generally parallel to the Y-axis; column C2 is shown oriented at a first angle relative to the Y-axis and column C3 is shown oriented at a second angle relative to the Y-axis. Column C1, as illustrated, includes seven openings that are spaced at generally equal intervals from each other. A first opening 36d may be provided at a first end of column C1 and a second opening 36e may be provided at an opposite second end of column C1. (The second opening 36e does not have to be on the opposite second end of column C1 but should preferably be spaced remote from first opening 36d, i.e., some distance away therefrom. (Preferably, second opening 36e should not be adjacent first opening 36d.) Another opening 36f may be located adjacent first opening 36e and openings 36d, 36f may be spaced a distance "D2" apart from each other. Openings along column C1 may therefore be spaced at equal intervals from each other, with the interval between adjacent openings being a distance "D2". As with the row R1, if one draws an imaginary line from a center of the first opening 36d to a center of the second opening 36e, there may be an offset between the centers and therefore a slight slope or angle of the line of openings along that imaginary line relative to the Y-axis axis.

Column C2, as illustrated in FIG. 1B, has thirteen openings and includes a first opening 36g at one end and a second opening 36h at an opposite end of the column. Another opening 36i is shown adjacent first opening 36g and openings 36g, 36h are spaced a distance "D5" apart from each other. The openings along the "axis" of column C2 are therefore spaced at generally equal intervals ("D5") from each other and the centers of the openings in this column C2 may be offset from each other and therefore the column C2 may be oriented at a slight slope or angle relative to an axis along which column C2 might extend.

Column C3, as illustrated in FIG. 1A, has twelve openings that are spaced at substantially equal intervals from each other. Column C3 as shown includes a first opening 36j at a first end of the column, a second opening 36k at a second end of the column and another opening 36m adjacent first opening 36j. Openings 36j and 36m are spaced a distance "D6" apart from each other. Adjacent openings along the "axis" of column C3 may be spaced a distance "D6" away from each other and the line of openings may be oriented at an angle or slope relative to that axis.

FIG. 1B shows a different exemplary pattern of openings in face plate 34. The pattern shown in FIG. 1B may be a grid pattern where the rows, such as row R1, R2 and R3 are all oriented generally parallel to the X-axis; and the columns, such as columns C1, C2, C3 are all oriented generally parallel to the Y-axis. Row R1, as illustrated in FIG. 1B, has twelve openings therein including a first opening 36a' at a first end and a second opening 36b' at a second end. Another opening 36c' is located adjacent first opening 36a' and is spaced a distance "D3" therefrom. Column C1, as illustrated in FIG. 1B, has ten openings therein including a first opening 36d' at one end of the column and a second opening 36e' at an opposite end thereof. Another opening 36f' is located adjacent first opening 36d' and is spaced a distance "D4" therefrom.

No matter the specific pattern of openings 36 on face plate 34, indexer 16 may be used to correctly position a nozzle on a lance of the water delivery system 12 in a location relative to each of those openings 36 that is suitable to direct water or cleaning fluid into the bore of the associated tube in the tube bundle. This will be further described herein.

Figure 4:
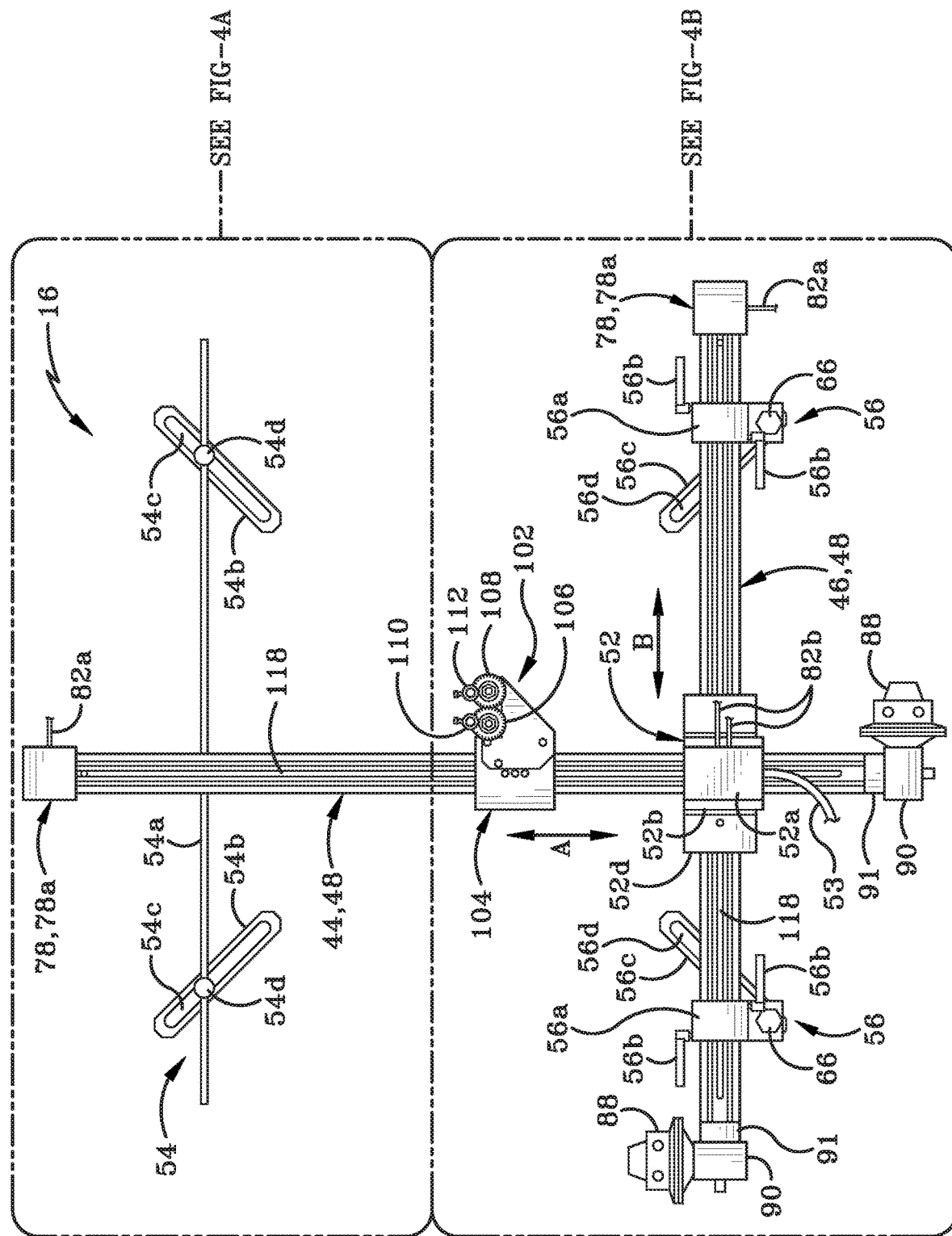
FIG. 4 is a front elevation view of the indexer shown on its own.
Figure 4A:
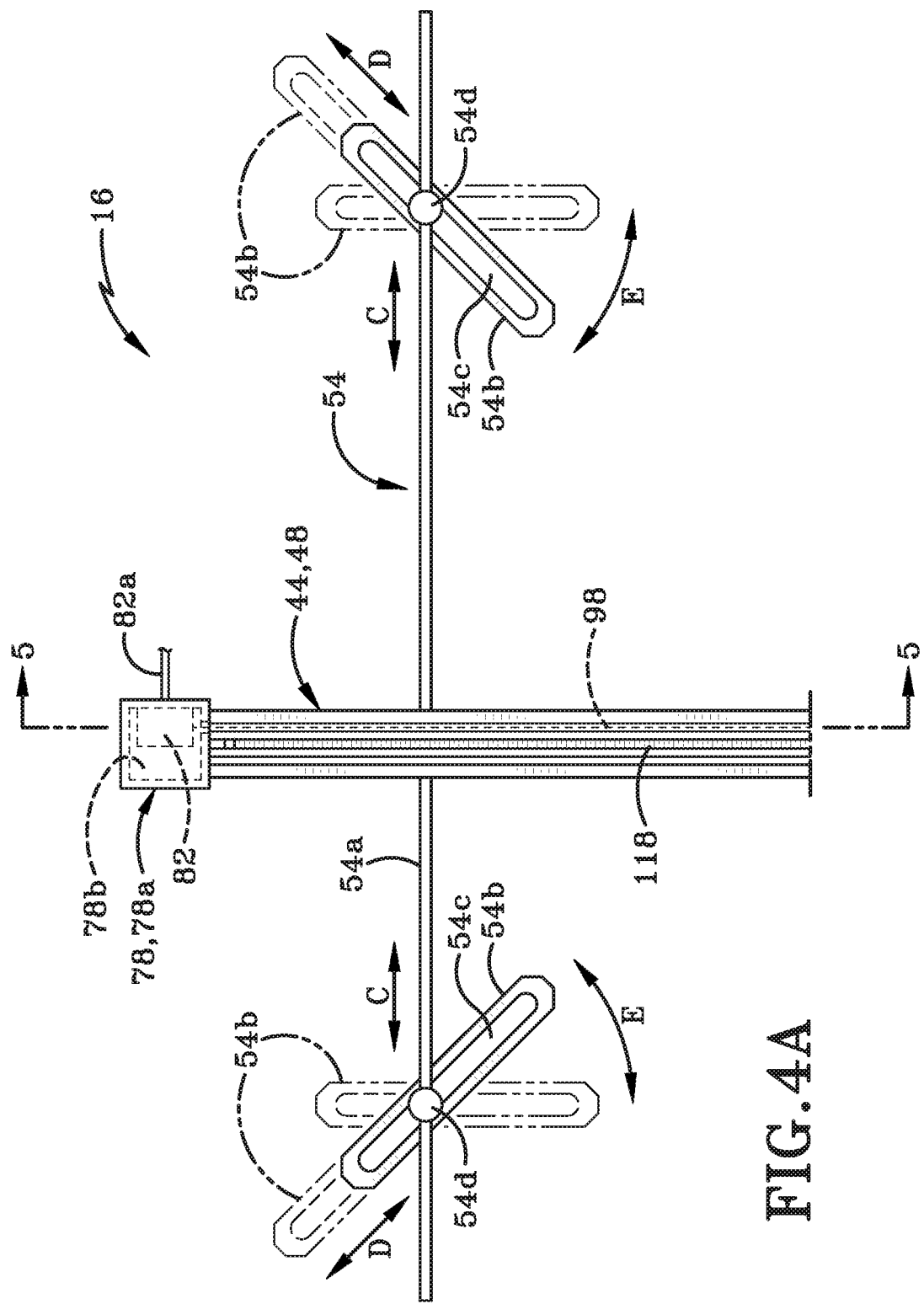
FIG. 4A is an enlarged front elevation view of the upper highlighted region of FIG. 4.
Figure 4B:
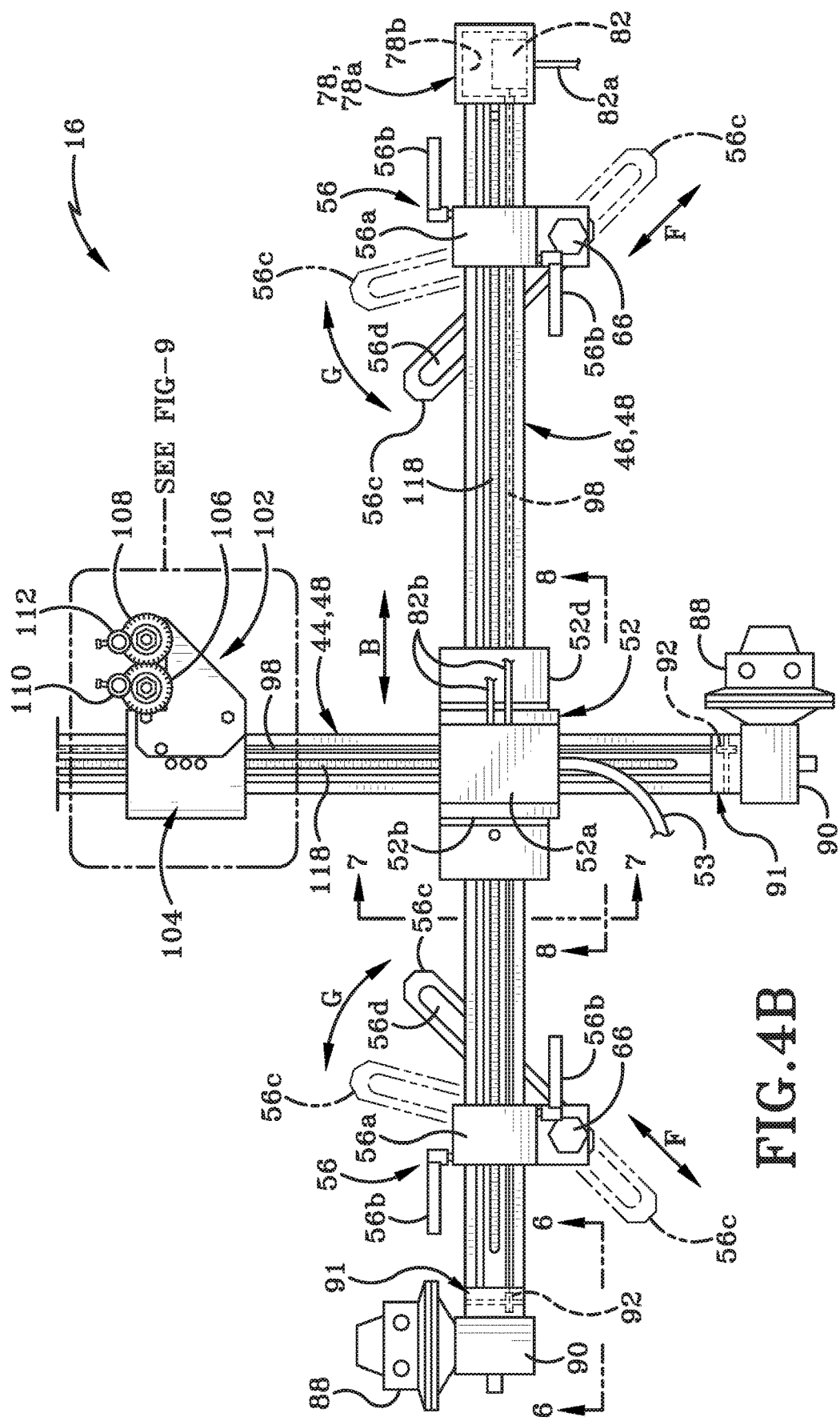
FIG. 4B is an enlarged front elevation view of the lower highlighted region of FIG. 4.

As indicated earlier herein and as shown in FIGS. 1 and 4-4B, indexer 16 may include first arm 44 and second arm 46 that are orthogonally oriented with respect to each other, i.e., oriented at right angles or ninety degrees relative to each other. As illustrated in FIG. 1, first arm 44 may be oriented to so as extend along the Y-axis and second arm 46 may be oriented so as to extend along the X-axis. Because face plate 34 is shown in the figures oriented vertically relative to surface 42, first arm 44 may be considered to be a vertically oriented arm in this instance and second arm 46 may be considered as a horizontally oriented arm. It will be understood that if heat exchanger 30 is oriented differently to what is illustrated in the attached figures, then indexer 16 will be oriented in a complementary fashion.

First and second arms 44, 46 may be fabricated to be substantially identical in structure and function. Each arm 44, 46 may include a channel assembly 48 (FIG. 3) comprising one or a plurality of conjoined X-shaped structures that define various channels or grooves therein and through which other component parts of indexer 16 may be extended (as will be described hereafter.) Channel assembly 48 may be fabricated out of any suitable material, such as a metal.

A plurality of glide pads 50 (FIG. 3) may be interlockingly engaged in one or more of the channels or grooves defined in channel assembly 48. Glide pads 50 may be fabricated out of any suitable material, such as plastic and may be positioned to reduce friction between first arm 44 and components engaged therewith or between second arm 46 and components engaged therewith. Other ways of reducing friction between first and second arms 44, 46 and components engaged therewith may be used instead of glide pads 50.

Referring to FIGS. 1, 4B, 7, and 8, a junction box 52 may be utilized to interlock first arm 44 with second arm 46. These figures illustrate that junction box 52 may be positioned between an outermost surface of second arm 46 and an innermost surface of first arm 44. This positioning places a lowermost surface of second arm 46 closest to face plate 34 of heat exchanger 30 and a outermost surface of first arm 44 the as remote from face plate 34. Additionally, the arrangement also positions second arm 46 below first arm 44. It will be understood that first and second arms 44, 46 may be differently arranged so that first arm 44 may be positioned beneath second arm 46.

Figure 7:
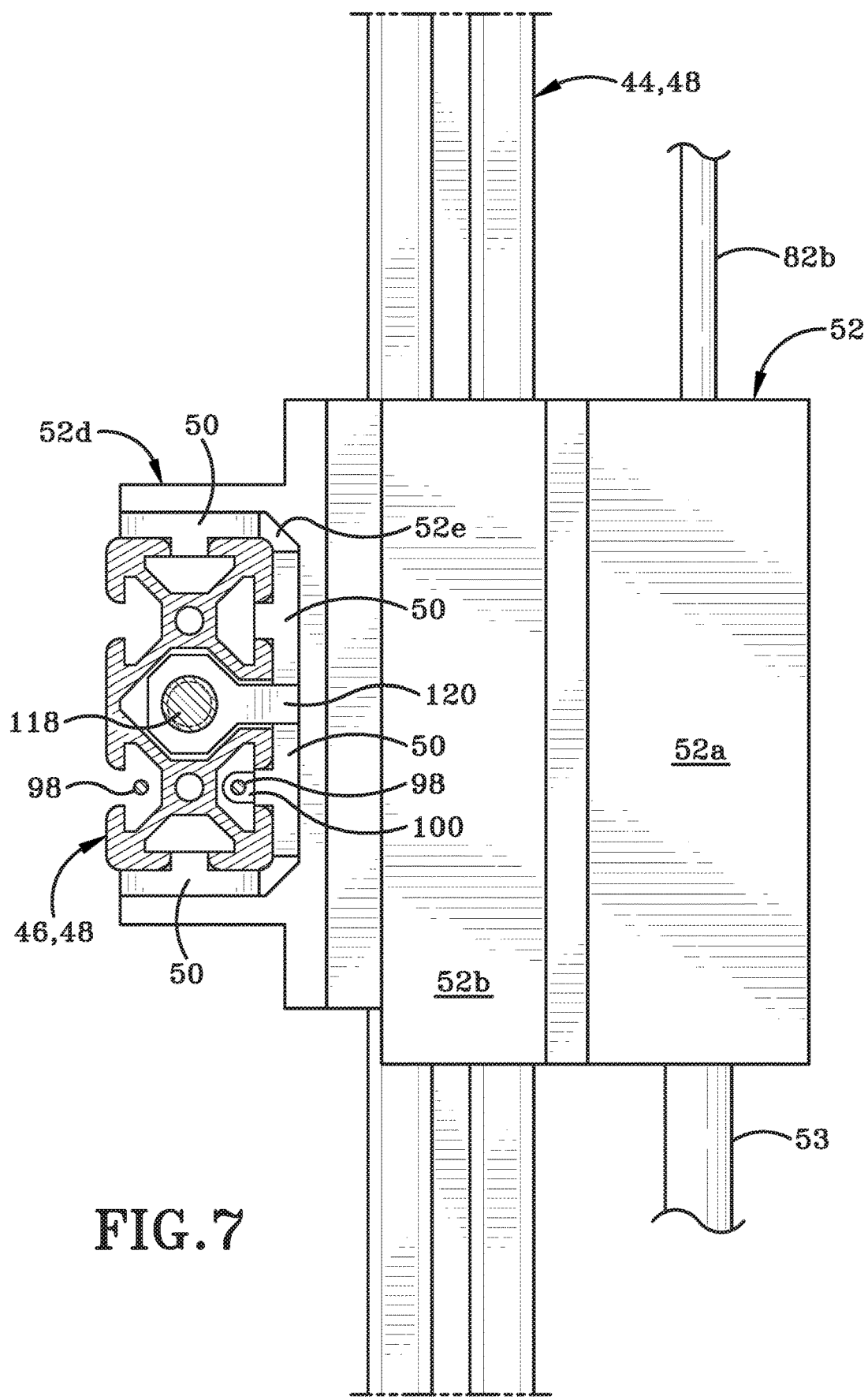
FIG. 7 is an enlarged cross-section of a junction box and the second arm of the indexer taken along line 8-8 of FIG. 4B.
Figure 8:
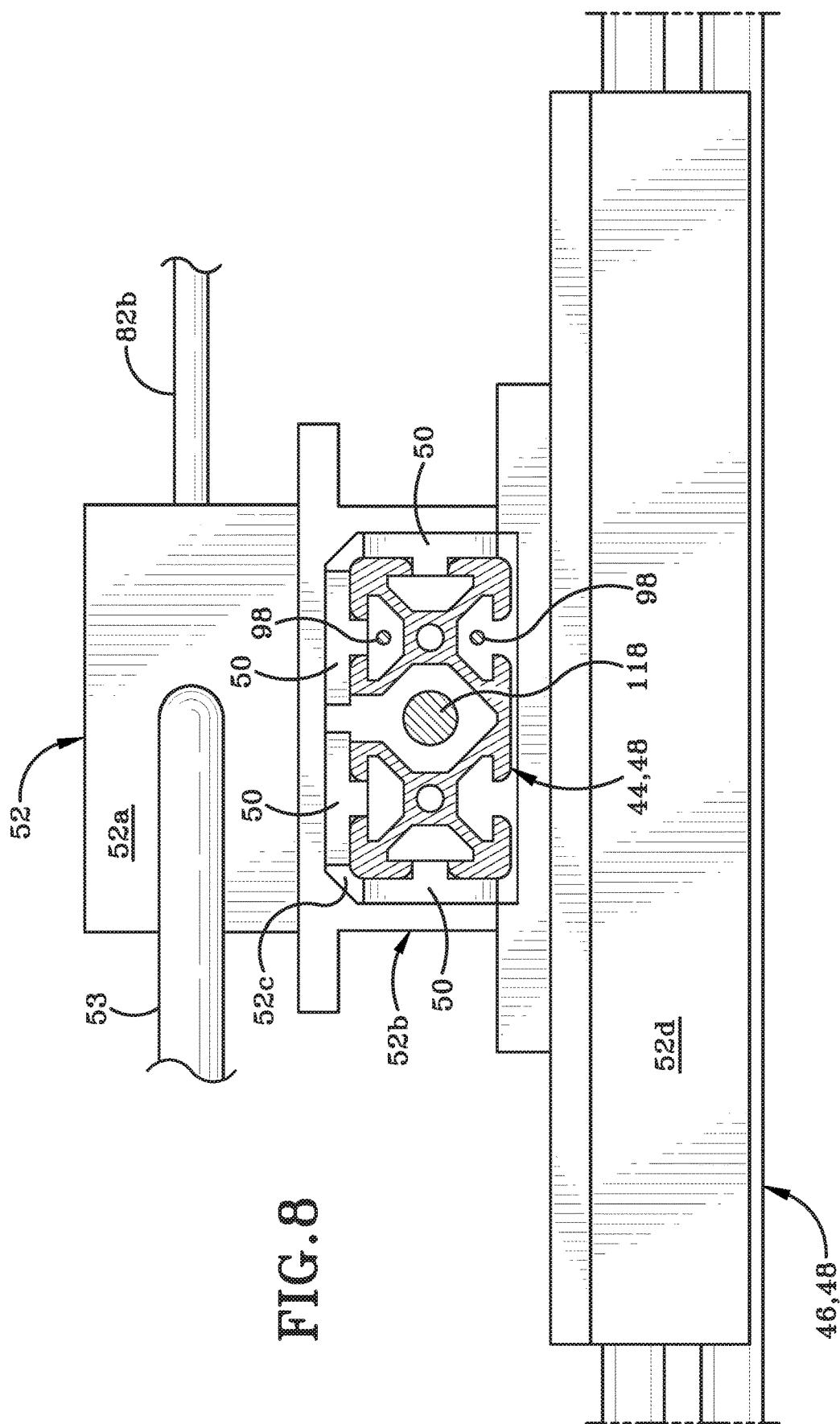
FIG. 8 is an enlarged cross-section of the junction box and the first arm of the indexer taken along line 8-8 of FIG. 4B.

Junction box 52 may be of any desired configuration. As shown, junction box comprises a first region 52a, a second region 52b that defines a cavity 52c therein, and a third region 52d that defines a cavity 52e therein. First region 52a may be electronically operatively engaged with other components in system 10. Cavity 52c of second region 52b may interlockingly receive and engage first arm 44 therein (as is illustrated in FIG. 8); and cavity 52e of third region 52d may interlockingly receive and engage second arm 46 therein (as shown in FIG. 7). Glide pads 50 engaged with each of the first and second arms 44, 46 aid in ensuring that junction box 52 is able to move relative to each of first arm 44 and second arm 46. Movement of junction box 52 relative to first arm 44 in either of a first vertical direction or a second vertical direction is indicated by arrow "A" in FIG. 4. Movement of junction box 52 relative to second arm 46 in either of a first horizontal direction or a second horizontal direction is indicated by arrow "B" in FIG. 4.

When junction box 52 moves along first arm 44 in either direction indicated by arrow "A", the entire second arm 46 and components engaged therewith may travel in unison with junction box 52. This is because of the interlocking engagement of junction box 52 and second arm 46. When junction box 52 moves along second arm 46 in either direction indicated by arrow "B", the entire first arm 44 and the components engaged therewith may travel in unison with junction box 52. This is possible because of the interlocking engagement of junction box 52 and first arm 44. The aforementioned movements in the directions indicated by arrows "A" and "B" are possible when indexer 16 is not fixedly secured to flange 38 of heat exchanger 30. These motions may be utilized to move first and second arms 44, 46 relative to each other prior to engaging indexer 16 on flange 38 and so that first and second arms 44, 46 may be correctly positioned relative to face plate 34. Once indexer 16 is secured to flange 38, however, the motion of junction box 52 in the direction of arrow "A" is substantially prevented but the motion of junction box 52 in the direction of arrow "B" may be possible. This restriction in the motion of second arm 46 is due to the fact that second arm 46 is directly secured to flange 38 (as will be later described herein) while first arm 44 is only indirectly secured to flange 38.

In some embodiments, a cable 53 (FIG. 1) may be used to connect first region 52a of junction box 52 to a remote control table (not shown in the attached figures but illustrated in the applications to the same inventor referenced earlier herein). The control table may, in turn, be wired to or wirelessly connected to communication device 14. Alternatively the control table itself may be communication device 14 that is programmed to operate indexer 16 and water delivery system 12. The operator may use the control table or communication device 14 to operate indexer 16.

In order to secure indexer 16 to flange 38 of heat exchanger 30, a connection assembly may be provided. Connection assembly may comprise a connector 54 that is used to indirectly secure first arm 44 to flange 38; and a first and a second clamping member 56 that may be used to directly secure second arm 46 to flange 38. (It will be understood that in other embodiments, the first arm 44 may be directly secured to flange 38 via clamping members 56 and the second arm 46 may be indirectly secured to flange 38 via connector 54.)

Referring to FIG. 4A, connector 54 may comprise a rod 54a and a pair of connector brackets 54b. Each connector bracket 54b may define a slot 54c therein and an adjustment member 54d may be used to secure rod 54a and brackets 54b together. Adjustment member 54d may define an aperture 54e (FIG. 2) therein and through which rod 54a passes. Adjustment member 54d may include a threaded shaft 54f (FIG. 4) that passes through slot 54c and a nut 54g and washer 54h that lock adjustment member 54d to bracket 54b. Adjustment member 54d may be slidable along rod 54a in the directions indicated by arrow "C" (FIG. 4A) before nut 54g is tightened. Adjustment member 54d may also be slidable along slot 54c in the directions indicated by arrow "D" before nut 54g is tightened. Brackets 54b may pivot about adjustment member 54d as is indicated by arrows "E". Because of this adjustability, brackets 54b may be moved towards or away from each other and may be pivoted so that they are oriented at any one of a variety of different angles relative to each other. A mounting bracket 44a and eyelet screw 44b may be engaged with rear wall 44c of first arm 44. Rod 54a may pass through an aperture defined by eyelet screw 44b and thereby securing rod 54a to first arm 44. Because rod 54a may pass through eyelet screw 44b, relative movement between rod 54a and first arm 44 along the length of rod 54a may be possible, as will be later described herein. In order to secure first arm 44 to flange 38 on heat exchanger 30, a bolt 60 may be inserted through slot 54c of each bracket 54b and then through a selected one of the apertures 38a defined in flange 38. A nut 62 and washer 64 may be used to lock each bolt 60 to flange 38; thereby securing rod 54a to flange 38.

Figure 3:
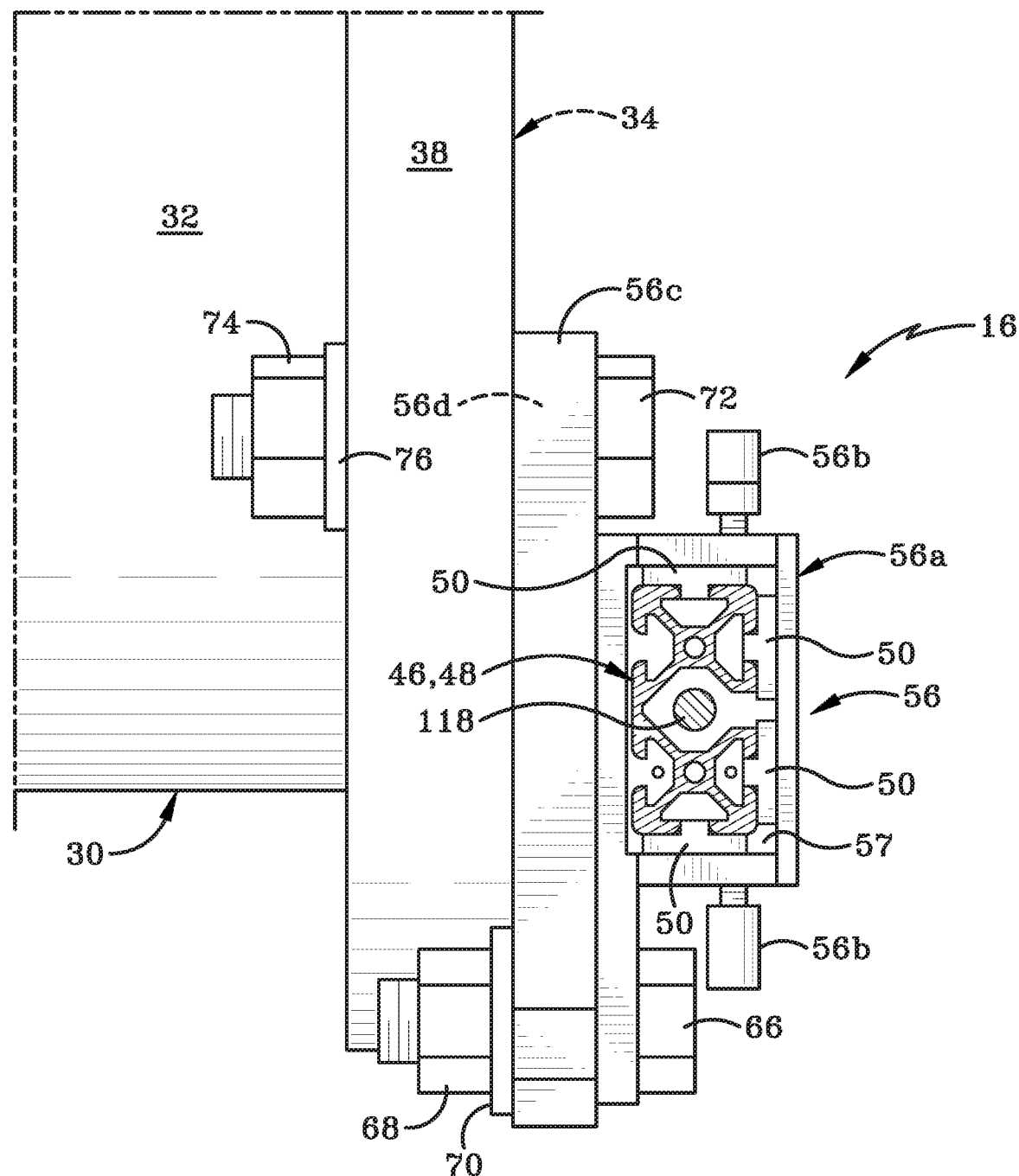
FIG. 3 is a left side view of the heat exchanger taken along line 3-3 of FIG. 1 and showing the indexer engaged with the heat exchanger; several background components have been removed from this figure for the sake of clarity.

Referring to FIG. 3, first and second clamping members 56 may each include a housing 56a that defines a cavity 57 therein and into which a portion of second arm 46 may be interlockingly received and engaged. Glide pads 50 may be provided on channel assembly 48 of second arm 46 so that relative movement between each first and second clamping member 56 and second arm 46 is possible. Housing 56a may include a pair of crank arms 56b that may be rotated in a first direction to lock housing 56a to second arm 46 or may be rotated in a second direction to unlock housing 56a from second arm 46. When in an unlocked position, relative movement between housing 56a and second arm 46 may be possible. When crank arms 56b are rotated in the first direct to lock housing 56a to second arm 46, then relative movement between housing 56a and second arm 46 may not be possible. Each of the first and second clamping members 56 may also include a bracket 56c that defines a slot 56d therein. A bolt 66 (FIGS. 3 & 4B) may extend outwardly from housing 56a and through slot 56d. A nut 68 and washer 70 may lock bolt 66 to bracket 56c at any desired position along slot 56d.

Bracket 56c may be adjusted relative to housing 56a by loosening nut 68 and sliding bracket 56c in either direction along slot 56d, as indicated by arrow "F" (FIG. 4B). When bracket 56c is in the desired location relative to housing 56a, nut 68 may be tightened. Bracket 56c may also be pivoted about bolt 66 when nut is loosened and this pivotal motion is indicated by the arrows "G" (FIG. 4B). Housings 56a may be moved towards or away from each other along second arm 46 and this movement is indicated by the arrows "B" in FIG. 4B. When the desired distance between housings 56a is attained, crank arms 56b may be rotated to lock housings 56a in the relevant positions on second arm 46. Housings 56a may be spaced a suitable distance apart from each other and brackets 56c thereon may be pivoted and slid along slots 56d to match the spacing between selected apertures 38a on flange 38. When suitably positioned, bolts 72 (FIGS. 1 & 3) may be inserted through slots 56d in brackets 56c and into the selected apertures 38a on flange 38. Nuts 74 and washers 76 may then be engaged to lock brackets 56c to flange 38.

As indicated earlier herein, junction box 52 may secure first and second arms 44, 46 together. Junction box 52 may be able to travel in the direction of arrow "B" (FIG. 4B) between the first and second clamping members 56. Since junction box 52 may be engaged with first arm 44, when junction box 52 moves along second arm 46, first arm 44 may be carried therewith. Thus, by moving junction box 52, the relative positions of first and second arms 44, 46 may be changed. (Before engaging first and second clamping members 56, junction box 52 may be moved along first arm 44 to change the relative positions of first arm 44 and second arm 46.) Changing the relative positions of first and second arms 44, 46 may be useful for accessing different openings 36 in face plate 34 as will be described later herein.

In accordance with an aspect of the present disclosure, a sensor may be provided on one or both arms 44, 46 of indexer 16. The sensor may be utilized in a process of determining a center of a tube opening to be cleaned. A sensor housing 78 may be located proximate one end of each of first arm 44 and second arm 46. It will be understood that, in other instances, sensor housings 78 may be located elsewhere along the length of the associated arm 44 or 46. Sensor housing 78 provided on first arm 44 is shown in greater detail in FIG. 5 and will be described in greater detail herein but it should be understood that the illustration and description applies equally to the sensor housing 78 on second arm 46.

Sensor housing 78 may comprise an exterior wall 78a that bounds and defines an interior compartment 78b. Wall 78a may define a first opening 78c and a second opening 78d in one side thereof and each of the first and second openings 78c, 78d may be in communication with compartment 78b. A first cable guide pulley 80, a sensor 82 and a first spool 84 may be provided within compartment 78b. Each of the first cable guide pulley 80 and first spool 84 may be mounted for rotation within compartment 78b. A bolt 86 may extend through opening 78d and secure sensor housing 78 to a first end of first arm 44. Sensor 82 may be any sensor capable of measuring distance. For example, sensor 82 may be a string potentiometer or a draw wire displacement sensor, the purpose of which will be described later herein. In other embodiments, the sensor may be a magnetic sensor.

Sensor 82, communication device 14, and junction box 52 may be operatively engaged with each other either wirelessly or non-wirelessly. FIG. 1 shows sensor data cables 82a with connectors 82b, 82c extending between each sensor housing 78 and a first region 52a of junction box 52. FIG. 4A shows one end of sensor data cable 82a being connected to sensor 82.

A motor 88 and associated gear housing 90 may be provided on each of first arm 44 and second arm 46. As illustrated in FIG. 1, motor 88 and gear housing 90 may be located on the opposite end of the sensor housing 78 associated with that arm 44, 46. Hydraulic lines 88a, 88b (FIG. 1) may connect motors 88 to a remote hydraulic source (not shown). It should be noted that these lines 88a, 88b, the wiring and various other components not necessarily associated with indexer 16 may be omitted from some of the attached figures for clarity of illustration.)

Figure 6:
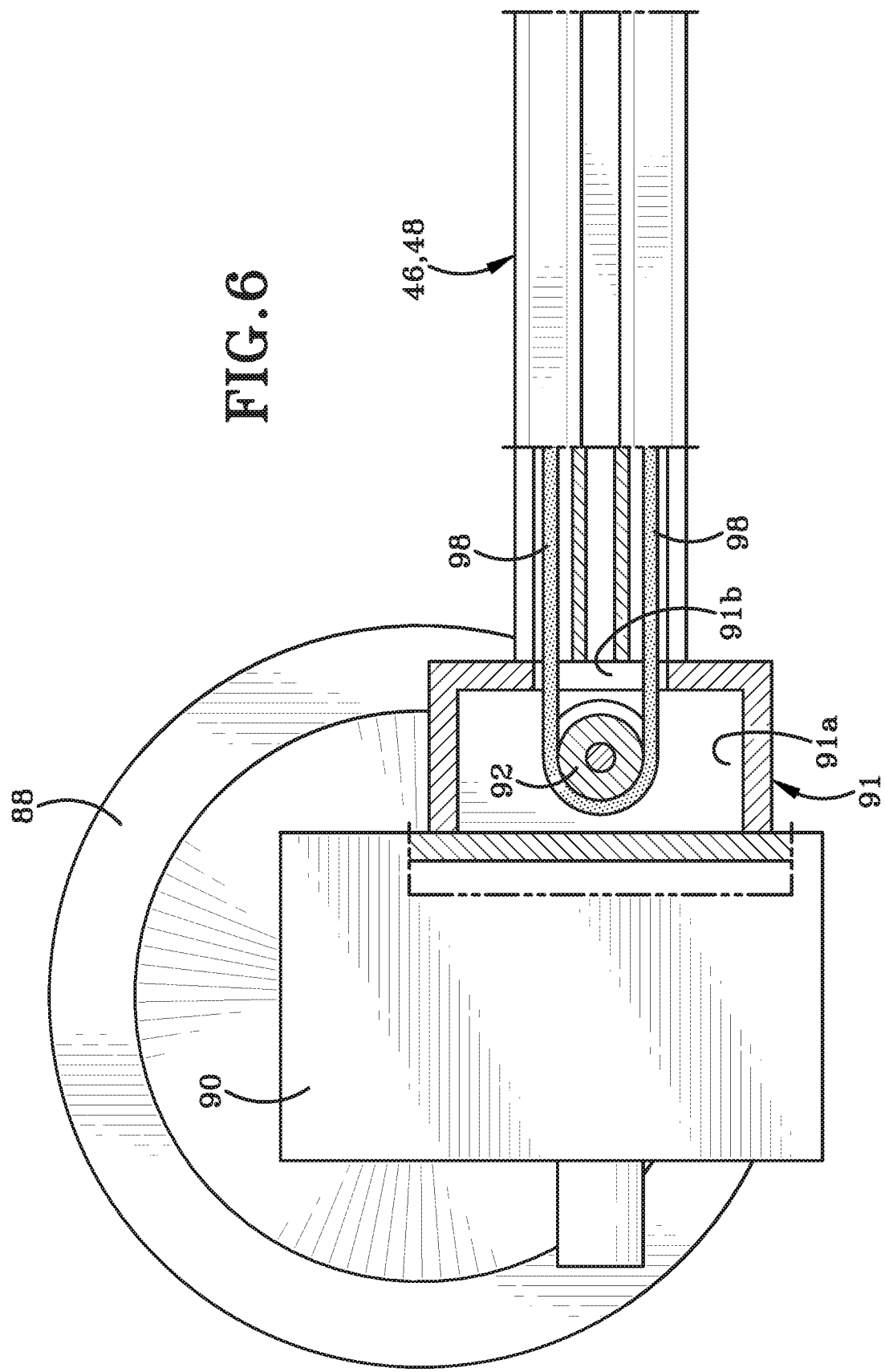
FIG. 6 is an enlarged cross-section of a motor, a gear housing and a second arm of the indexer taken along line 6-6 of FIG. 4B.

The motors 88 and gear housings 90 on each of the first and second arms 44, 46 may be substantially identical in structure and function. The motor 88 and gear housing 90 provided on second arm 46 are shown in greater detail in FIG. 6. Although not illustrated herein, it should be understood that gears are provided within an interior of gear housing 90 and these gears are operatively engaged with and are driven by a drive shaft of motor 88 which extends into gear housing 90. FIG. 6 also shows a secondary housing 91 associated with gear housing 90. Secondary housing 91 has an exterior wall that bounds and defines a compartment 91a within which a second cable guide pulley 92 is mounted for rotation. The exterior wall of secondary housing 91 may define an aperture 91b therein that is in communication with compartment 91a.

Figure 5:
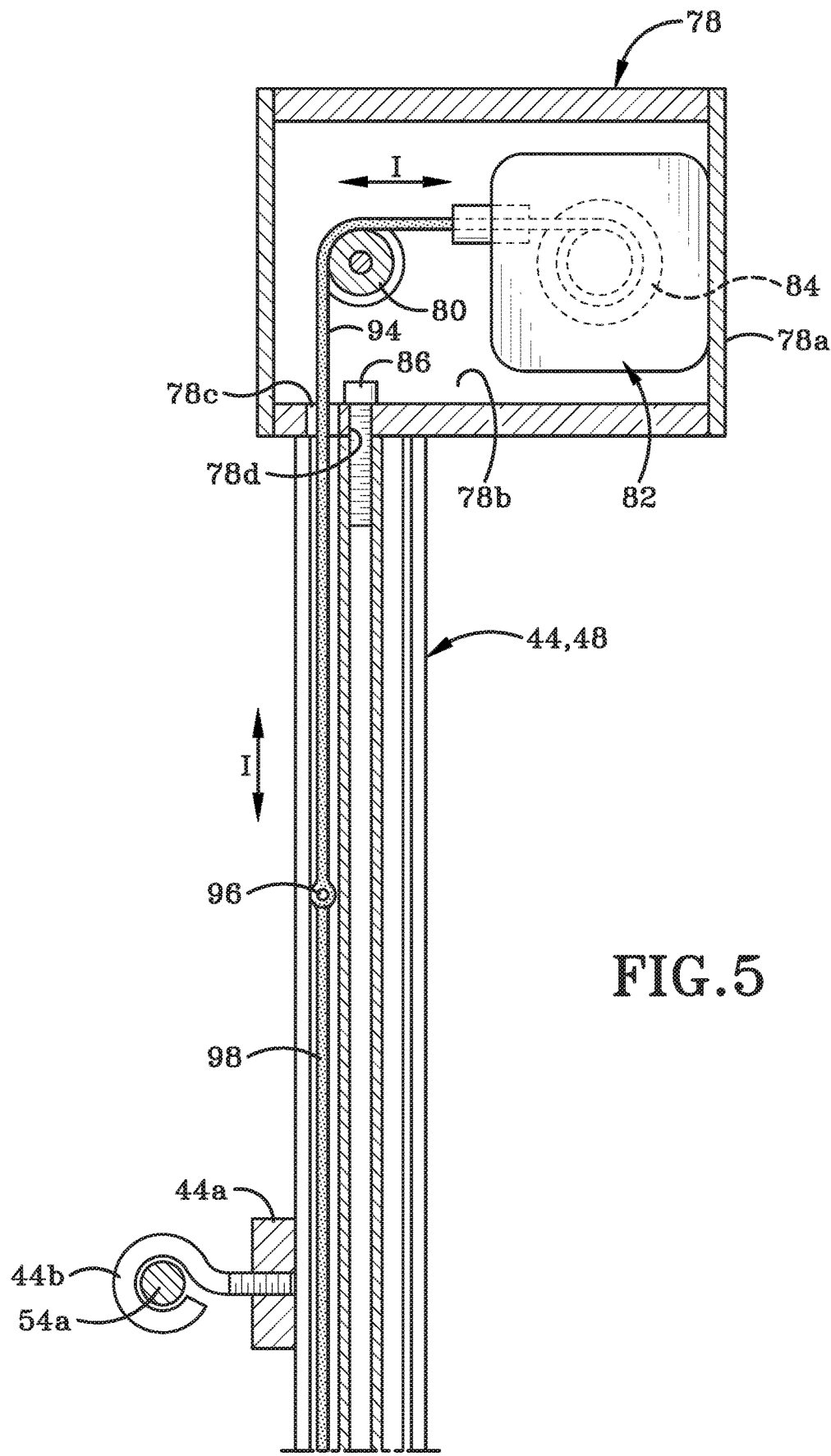
FIG. 5 is an enlarged cross-section of a sensor housing and a first arm of the indexer taken along line 5-5 of FIG. 4A.

Referring to FIGS. 5 and 6, the sensor 82 is illustrated as a string potentiometer. One end of a draw wire 94 extends from the sensor 82 and is wrapped around first spool 84 in sensor housing 78 of first arm 44. Draw wire 94 may extend from first spool 84, wrap around first cable guide pulley 80, and exit sensor housing 78 through first opening 78c. Draw wire 94 may be passed through a first region of channel assembly 48 defined in first arm 44. A first connector 96 may be provided at a second end of draw wire 94. First connector 96 may connect the second end of draw wire 94 to a cable 98 that may then extend along the length of channel assembly 48 and enter into secondary housing 91 through aperture 91b. Cable 98 may wrap around second cable guide pulley 92 and, exiting through aperture 91b, extend along a different channel or groove of channel assembly 48 and extend back towards sensor housing 78 on first arm 44. A second connector 100 may be provided at a second end of cable 98 associated with first arm 44. Second connector 100 (FIG. 11) may secure the second end of cable 98 to a trolley 102 (FIG. 11) that may be movably engaged with first arm 44.

A first end of the cable 98 associated with second arm 46 may be operatively engaged with the sensor housing 78 on second arm 46 in an identical manner to what has been described above with respect to the cable 98 and sensor housing 78 on first arm 44. A second connector 100 (FIG. 7) provided on cable 98 on second arm 46 may secure a second end of cable 98 to junction box 52.

As trolley 102 or junction box 52 move along their associated first arm 44 or second arm 46, a length of the associated draw wire 94 may unwind from spool 84 in the associated sensor housing 78. When trolley 102 or junction box 52 moves in the opposite direction, some of the draw wire 94 may be wound back onto spool. Movement of draw wire 94 is indicated by the arrow "I" in FIG. 5. The length of draw wire 94 wound off of spool 84 may therefore be used to measure the distance of travel of trolley 102 or junction box 5.

Figure 28:
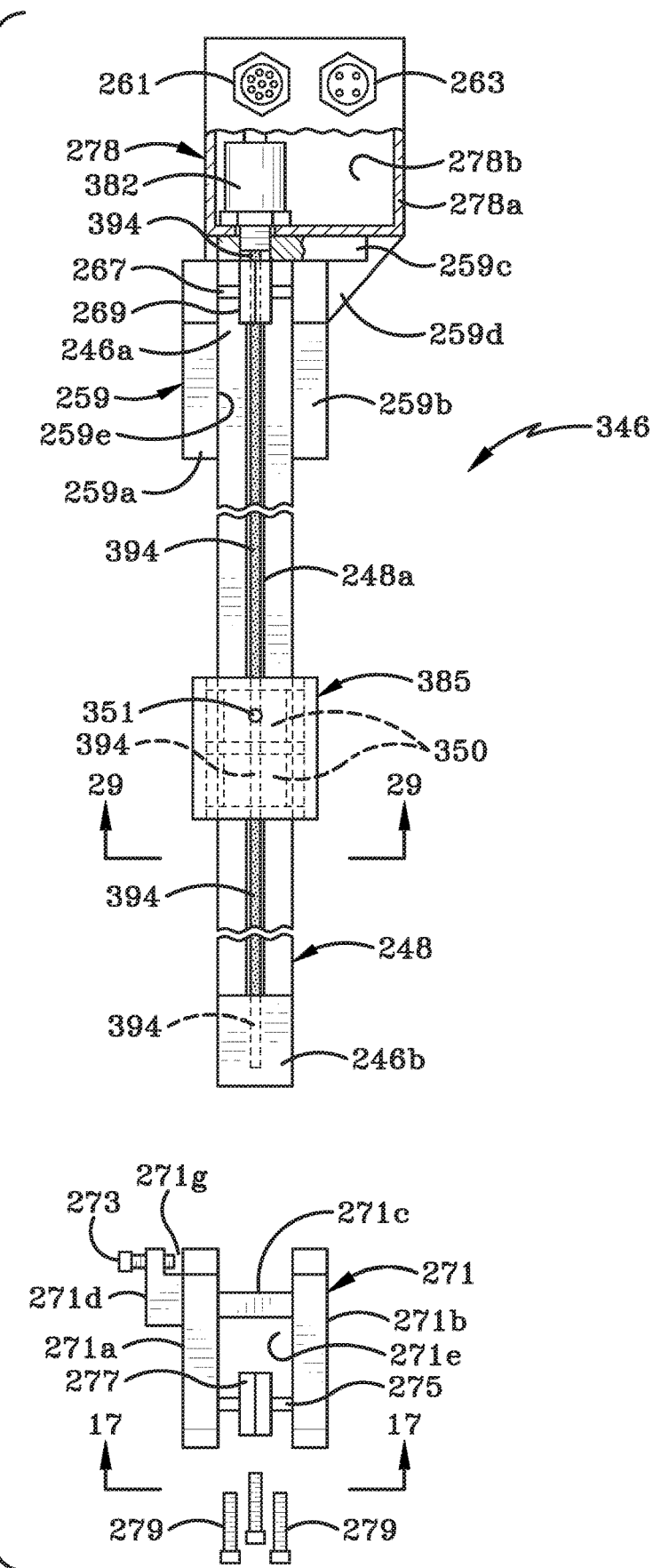
FIG. 28 is an enlarged front elevational view of a second embodiment of the kit in accordance with an aspect of the current disclosure shown in partial cross-section and showing a magnetostrictive sensor utilized thereon instead of a string-pot type sensor.
Figure 29:
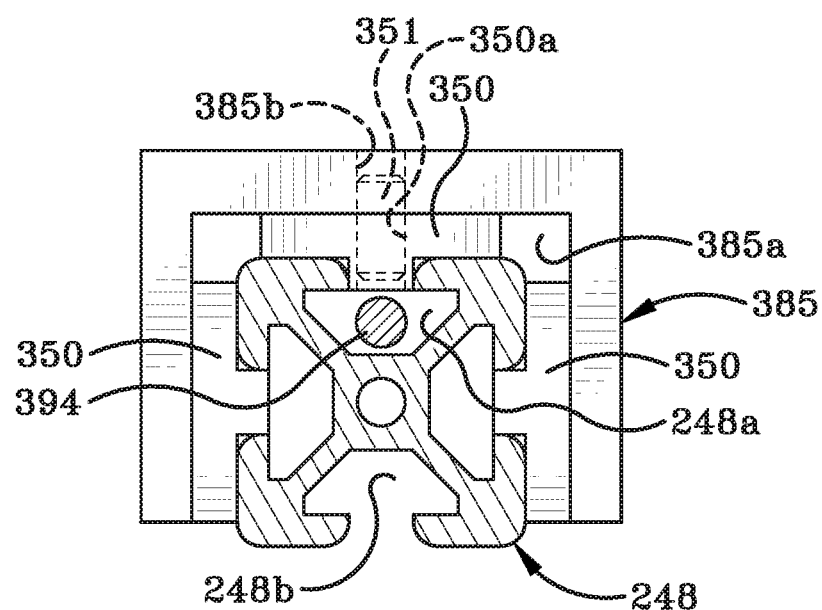
FIG. 29 is a bottom view of the second arm taken along line 29-29 of FIG. 28.
Figure 30:
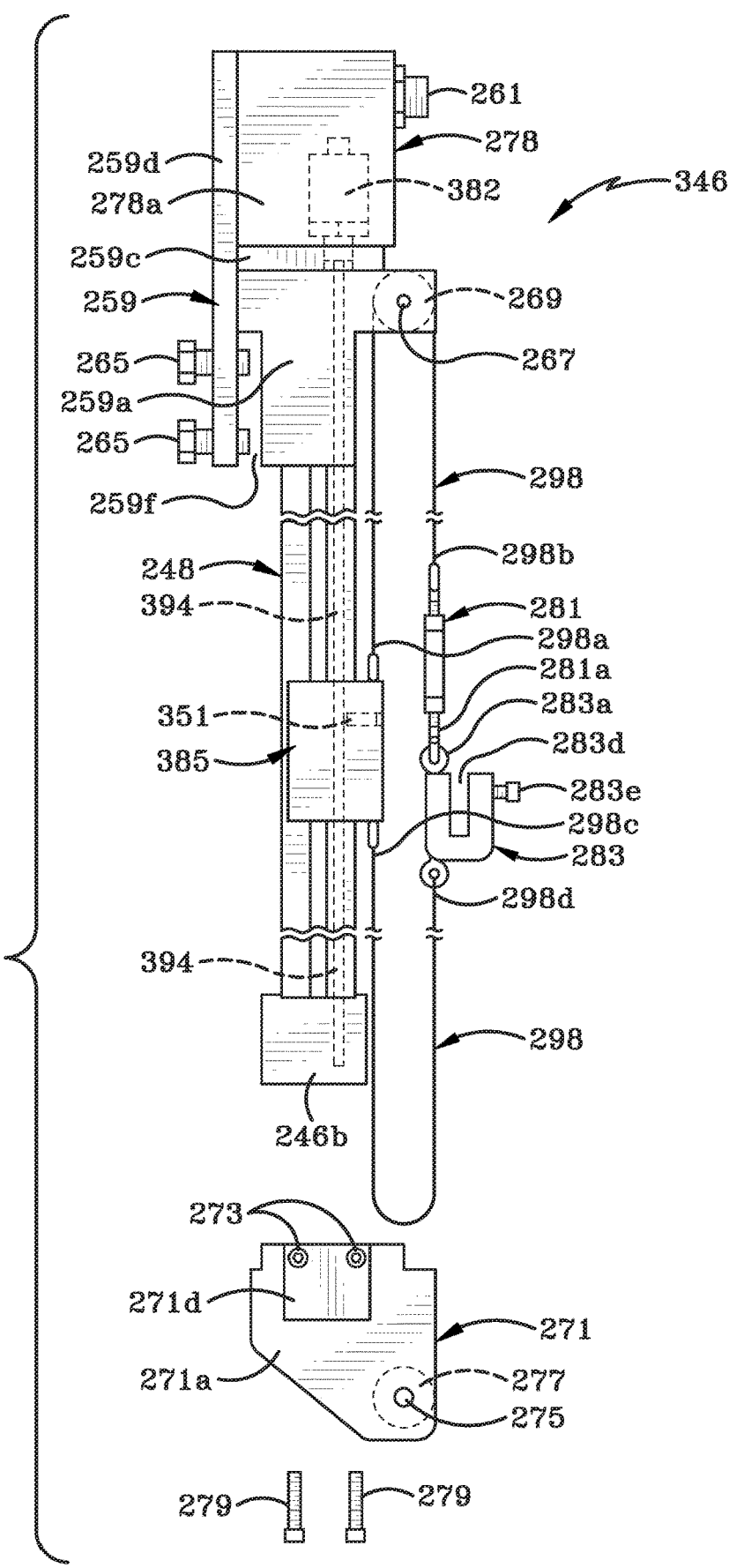
FIG. 30 is a left side view of the second arm shown in FIG. 28.

In other embodiments, the sensor utilized in indexer 16 may be a magnetic sensor such as the magnetostrictive sensor 382 shown in FIGS. 28-30 to determine distances that trolley 102 travels. In this instance trolley 102 may have to be equipped with a magnet similar to magnet 351 shown in FIGS. 28-30.

Figure 9:
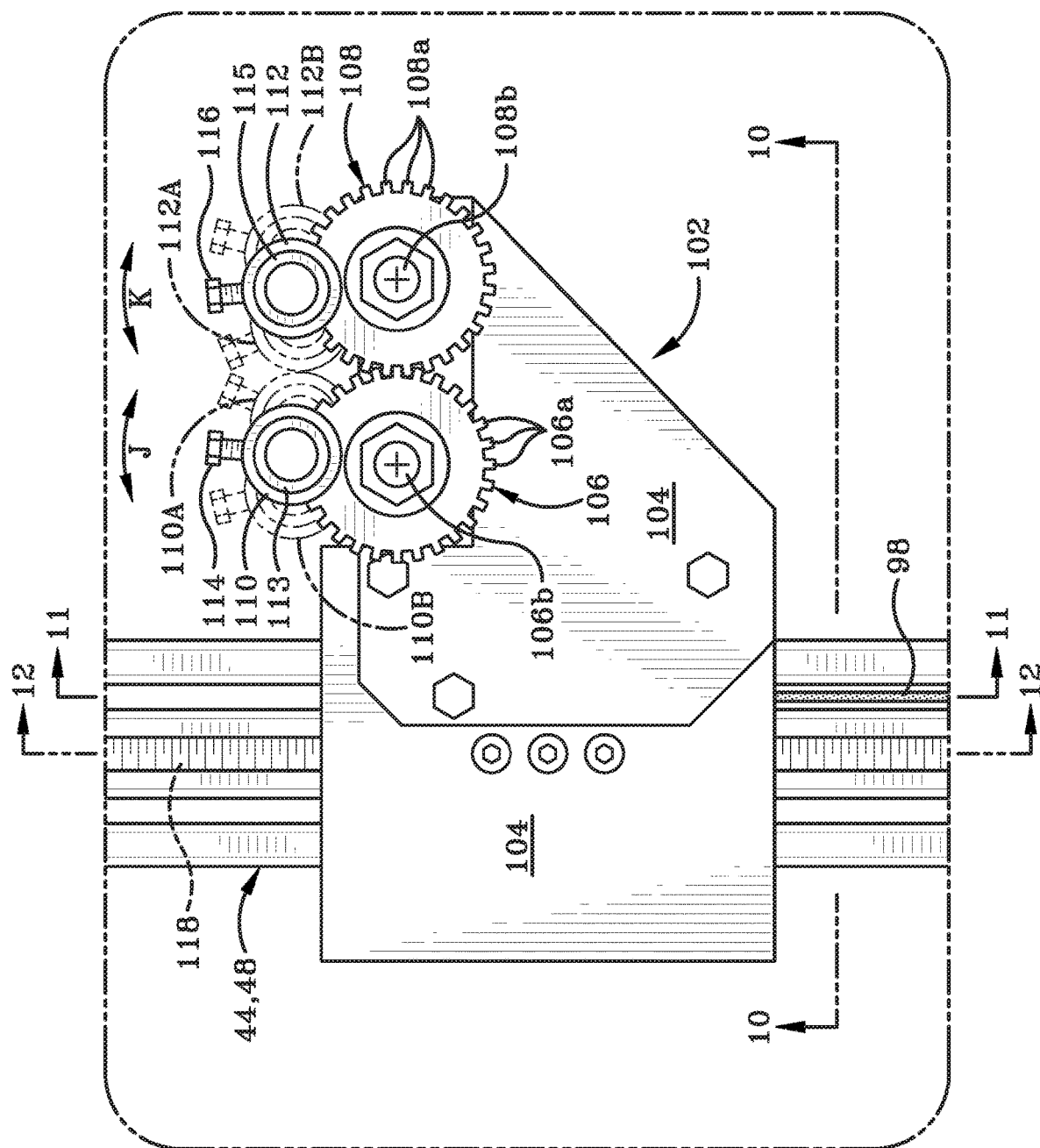
FIG. 9 is an enlarged front elevation view of the highlighted region of FIG. 4B showing a trolley engaged with the first arm of the indexer.

Trolley 102 is shown in greater detail in FIGS. 9-12. Trolley 102 may include a housing 104 that defines a compartment 104a (FIG. 10) in a first region thereof and in which a portion of first arm 44 may be interlockingly received and engaged. Glide pads 50 may be engaged with channel assembly 48 of first arm 44 to ensure that relative movement between housing 104 and first arm 44 is possible. A first gear 106 having teeth 106a and a second gear 108 having teeth 108a may be mounted on trolley 102 by way of bolts 106b, 108b, respectively. First and second gears 106, 108 may be mounted for rotation about axes that extend along the shafts of the associated bolt 106b, 108b. Teeth 106a, 108a may be configured to interlock with each other as shown in FIG. 9.

Still referring to FIGS. 9-12, a first collar 110 may be fixedly engaged to first gear 106 and may move in unison therewith as first gear 106 rotates between a first position where first collar 110 is indicated as 110A and a second position where first collar 110 is indicated as 110B. First collar 110 may have a first end 110c (FIG. 10) and a second end 110d (FIG. 11) and a bore 111 may be defined by an exterior wall of first collar 110. Bore 111 may extend between first end 110c and second end 110d.

Figure 11:
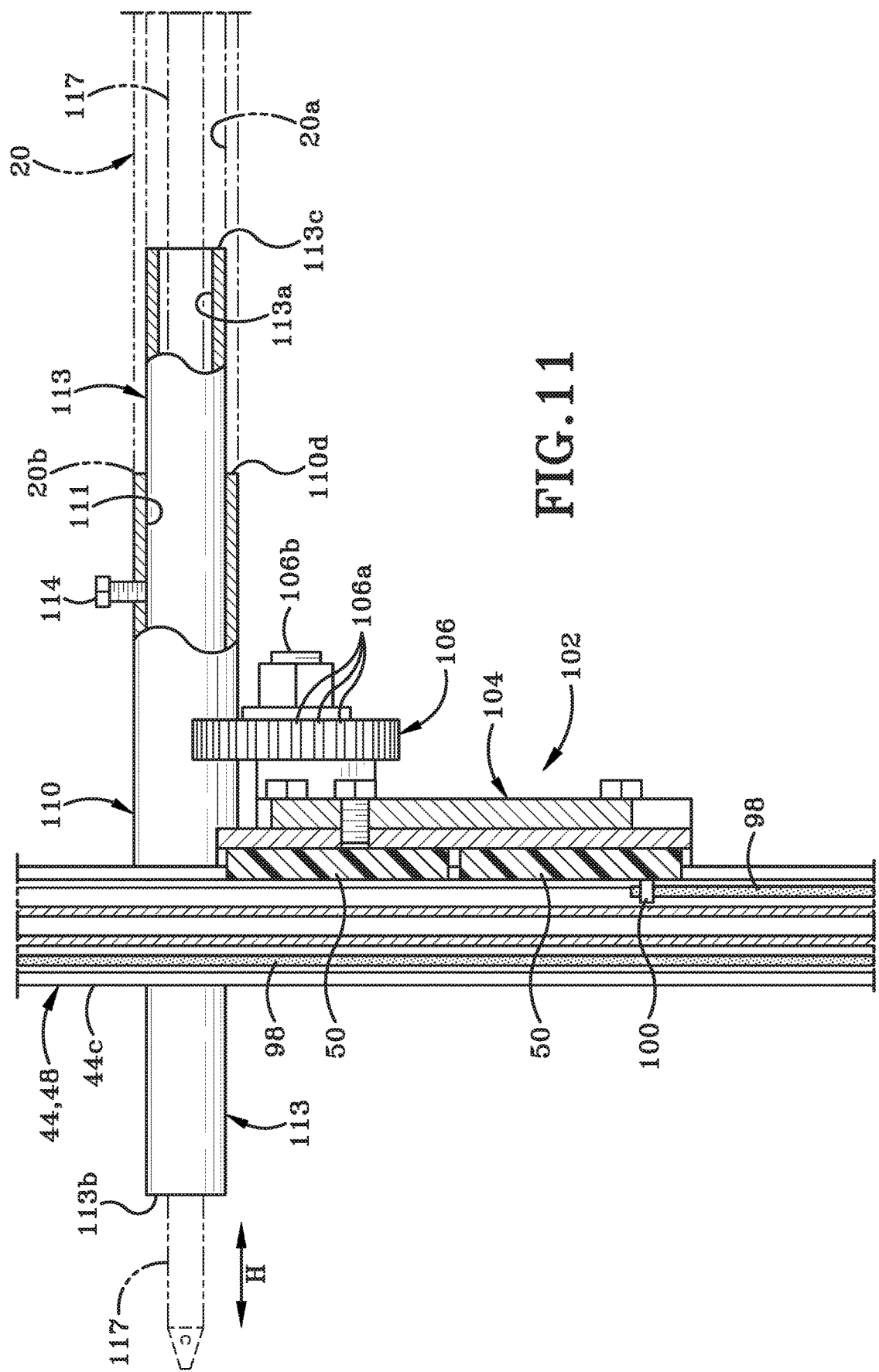
FIG. 11 is an enlarged cross-section of the trolley and the first arm taken along line 11-11 of FIG. 9 and showing a nozzle on a lance that is engaged with and extends downwardly from the trolley.

A secondary collar 113 may be telescopingly received in bore 111 of first collar 110 and may be movable relative to first collar 110 as indicated by arrows "H" (FIG. 11). An exterior wall of secondary collar 113 may define a bore 113a (FIG. 11) therethrough; where the bore 113a extends between a first end 113b and a second end 113c of secondary collar 113. A bolt 114 may extend through an opening defined in the exterior wall of first collar 110. When bolt 114 is rotated in a first direction an end of the shaft of bolt 114 may engage the exterior wall of secondary collar 113 and lock the secondary collar 113 in a particular position within bore 111 and relative to first collar 110. When bolt 114 is rotated in a second direction, the end of the shaft of bolt 114 may no longer engage the exterior wall of secondary collar 113 and collar 113 may therefore be able to slide through bore 111 in either direction indicated by arrow "H". The operator may select a degree to which secondary collar 113 should extend outwardly beyond rear wall 44c of first arm 44. Bolt 114 may be rotated into a position where the end thereof does not contact secondary collar 113. Secondary collar 113 may be moved by the operator in bore 111 and relative to first collar 110 until the end 113b of collar 113 is positioned the selected distance away from rear wall 44c. Bolt 114 is then rotated in the first direction to lock secondary collar 113 in the selected position relative to first collar 110. The location of end 113b of secondary collar 113 is therefore selected by the operator to regulate a distance between rear wall 44c of first arm 44 and an exterior surface of face plate 34.

Figure 12:
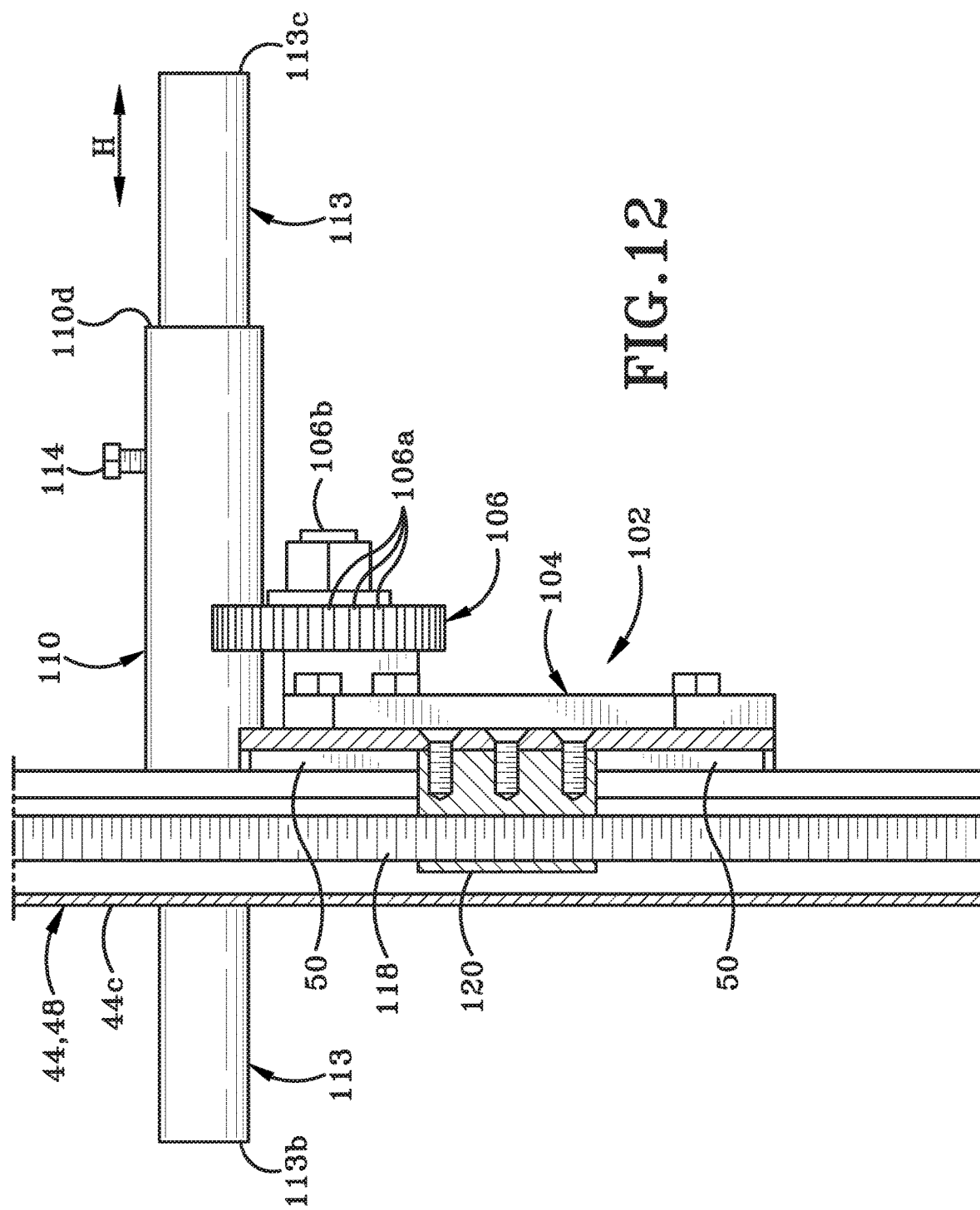
FIG. 12 is an enlarged cross-section of the trolley and the first arm taken along line 12-12 of FIG. 9.
Figure 13:
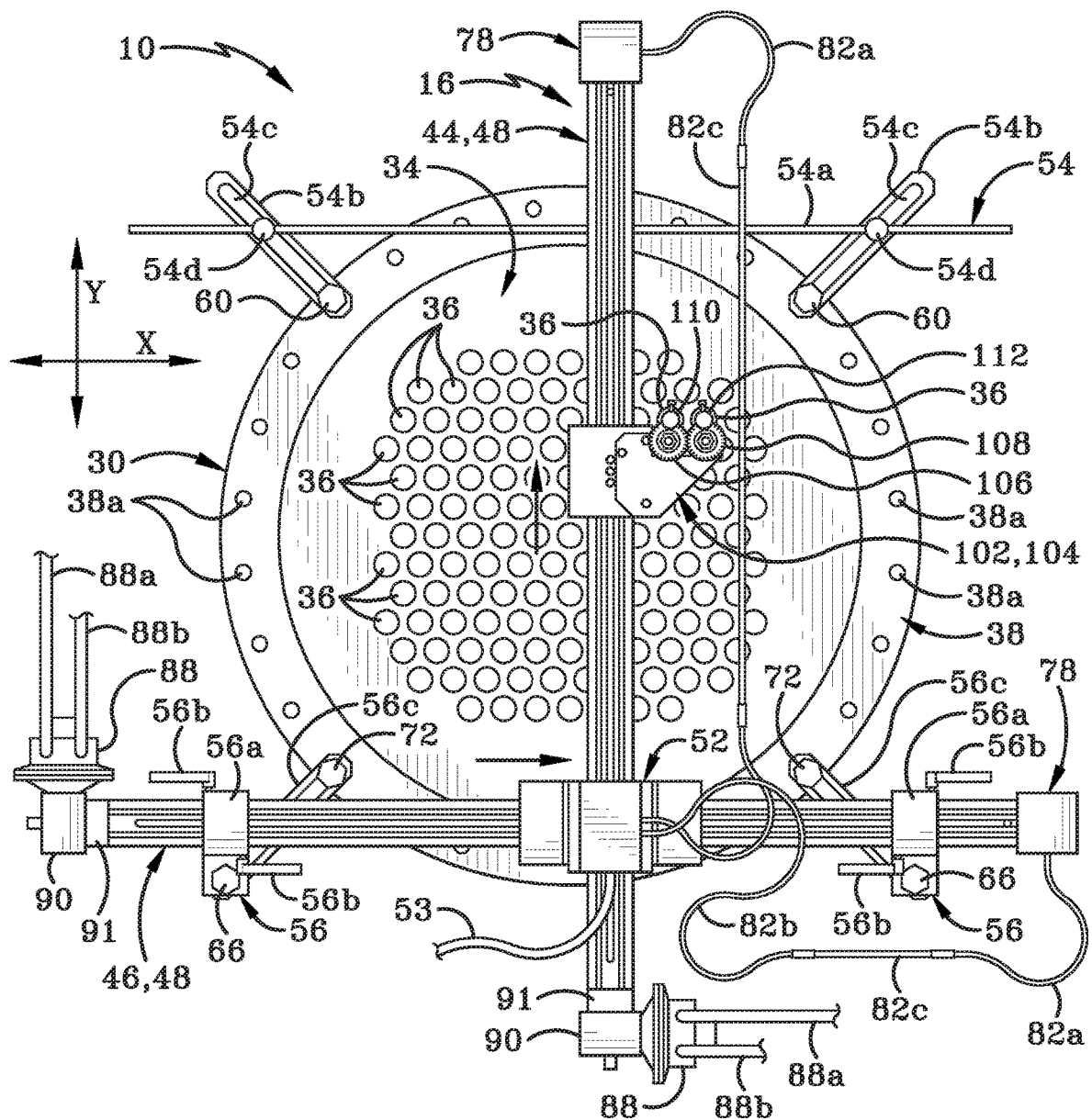
FIG. 13 is a front elevation view of the indexer engaged in a different position on the heat exchanger relative to the position of the indexer shown in FIG. 1.

As shown in FIGS. 11 and 12, first hose 20 extending from water delivery system 12 may define a bore 20a therethrough. Second end 113c of secondary collar 113 may be received into bore 20a of first hose 20 and an end 20b of hose 20 may be moved to a position where end 20b may abut an end 110d of first collar 110. A first lance 117 may extend through bore 20a of first hose 20 and into bore 113a of secondary collar 113. First lance 117 may be selectively movable relative to secondary collar 113 in either of a first or second direction, indicated once again by the reference character "H" in FIG. 11. A nozzle may be provided on an end of first lance 117 and the nozzle may be selectively moved outwardly beyond first end 113b of secondary collar 113 in order to insert the nozzle within any selected opening 36 in face plate 34 of heat exchanger 30. The nozzle of lance 117 may be inserted into any selected opening 36 when a cleaning operation is about to be undertaken. When that particular tube has been cleaned then lance 117 and therefore the nozzle thereon may be withdrawn from opening 36 and moved back into bore 113a of secondary collar 113.

In a similar fashion, a second collar 112 (FIGS. 9-11) may be fixedly engaged with second gear 108 and may move in unison therewith as second gear 108 rotates between a first position where second collar 112 is indicated as 112A and a second position where second collar 112 is indicated as 112b. Second collar 112 may be substantially identical in structure and function to first collar 110 and may define a bore therethrough and into which a secondary collar 115 may be received. Second hose 22 may be positioned around an exterior wall of secondary collar 115 in the same manner as first hose 20 is engaged with secondary collar 113. An end of second hose 22 may abut an end of collar 112. Secondary collar 115 may be movable relative to collar 112 so that an end of secondary collar 115 may be positioned a distance beyond rear wall 44c of first arm 44. A bolt 116 may be utilized to lock secondary collar 115 in a desired position relative to collar 112 in much the same manner as bolt 114 is utilized with secondary collar 113 and first collar 110. A second lance similar to lance 117 may extend through the bore of second hose 22 and subsequently through the bore of secondary collar 115. This second lance may be movable relative to secondary collar 115 in either of the directions indicated by arrow "H" (FIG. 11) in the same manner as has been described with reference to lance 117 and secondary collar 113. Collars 110, 112, secondary collars 113, 115, hoses 20, 22 and the lances associated therewith (such as lance 117) may move in unison with the associated one of the first gear 106 and the second gear 108.

FIG. 9 shows that first gear 106 may be selectively rotatable in the directions indicated by arrow "J" and second gear 108 may be rotatable in the directions indicated by arrow "K". The relative horizontal distance required between the nozzles of the lances may be linked to the distances "D1", "D2" or "D5" or "D6" (FIG. 1A) or "D3" or "D4" (FIG. 1B) between openings 36 on face plate 34. In order to move the nozzles from one pair of openings 36 to another or from openings on one heat exchanger 30 to another heat exchanger, the lances may have to be moved further apart from each other or be moved closer together. In other words, the lances 117 may need to be located an appropriate distance apart from each other so that the distance between them is complementary to the distance between adjacent openings 36 on the face plate 34 of heat exchanger 30.

In order to move the lances (117) closer to each other, one or both of first gear 106 and second gear 108 may be rotated in such a way as to cause first and second collars 110, 112 to move closer to each other. The closest positioning of first and second collars 110, 112 and thereby the closest positioning of the nozzles on the lances 117 is indicated in FIG. 9 by the phantom first and second collars 110A and 112A.

In order to move the nozzles on the lances (117) further apart from each other, one or both of first and second gears 106, 108 may be rotated in the appropriate direction to increase the distance between first collar 110 and collar 112. An increased distance between first and second collars 110, 112 is shown by the position of the phantom first and second collars 110B and 112B in FIG. 9.

The movement of junction box 52 or trolley 102 is described hereafter. FIGS. 3, 4A, 4B and 9, as well as other figures, show a threaded screw 118 that may extend through a central region of each channel assembly 48 of the first arm 44 and the second arm 46. Each screw 118 may be operatively engaged with motor 88 at the second end of that particular arm 44 or 46. A screw follower 120 (FIG. 7) may be provided on junction box 52 and another screw follower 120 (FIG. 10) may be provided on trolley 102. Each screw 118 may pass through a threaded aperture defined in the associated screw follower 120 on junction box 52 or trolley 102. When the associated motor 88 is actuated, the screw 118 engaged therewith may be caused to rotate about an axis that runs along that screw's length. Because screw follower 120 may be threadably engaged with the threads on screw 118, as screw 118 rotates, screw follower 120 may be caused to move along the length of screw 118. Since the screw followers 120 may be fixedly engaged to either the junction box 52 or trolley 102, movement of screw follower 120 may cause a corresponding movement in junction box 52 or trolley 102. If screw 118 is rotated in a one direction about its axis, then screw follower 120 and the associated junction box 52 or trolley 102 may move in a first direction along the length of the associated first arm 44 or second arm 46. If screw 118 is rotated in the opposite direction about its axis, then the direction of travel of screw follower 120 and thereby of the associated junction box 52 or trolley 102 may be reversed.

As described earlier herein, each sensor 82 may be engaged with draw wire 94 that is connected to cable 98 running along the associated first or second arm 46, 46. The other end of cable 98 may be secured to trolley 102 (in the case of first arm 44) or to junction box 52 (in the case of second arm 46). As screw 118 rotates and junction box 52 or trolley 102 moves along the associated arm 44 or 46, the draw wire 94 may be at least partially unwound off spool 84 or may be partially wound onto spool 84 (depending on the direction of rotation of screw 118). Spool 84 may be a spring loaded spool that is operatively engaged with sensor 82. The length of draw wire 94 wound off spool 84 or wound onto spool 84 may be measured by sensor 82 as the associated screw 118 is rotated. A change in length of draw wire 94 is determined by sensor 82 and is transmitted as a signal from sensor 82 to communication device 14

Figure 10:
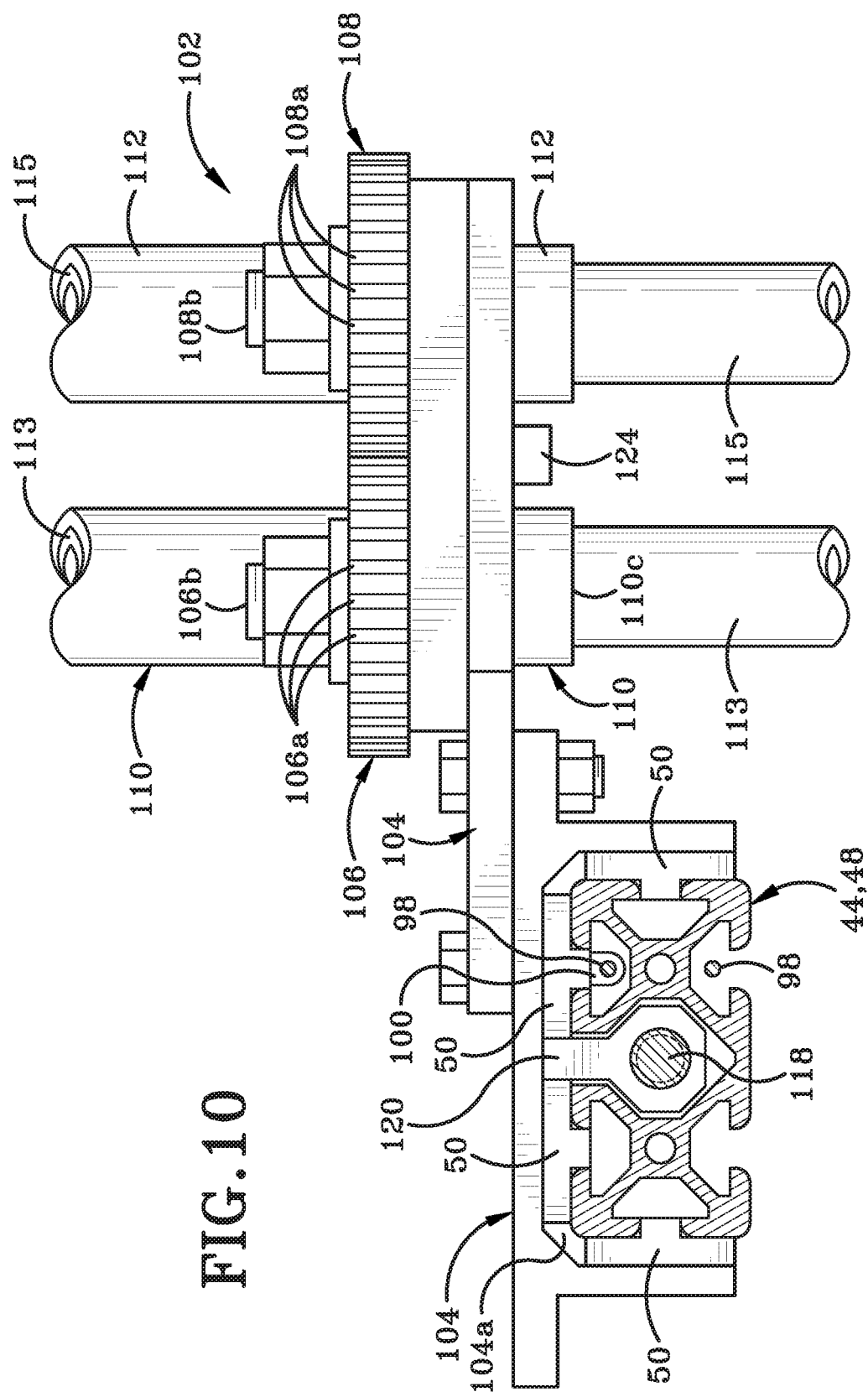
FIG. 10 is an enlarged cross-section of the trolley and the first arm of the indexer taken along line 10-10 of FIG. 9.

It will be understood that no two sensors 82 may be fabricated to be exactly the same. The length of draw wire 94 may be slightly different or the tension on spool 84 may be slightly different. Consequently, the particular physical structure of the sensors 82 provided on first arm 44 and second arm 46 may affect the movement of junction box 52 or trolley 102. Furthermore, indexer 16 is designed to be used multiple times and the draw wires 94 may stretch slightly or the spring on the spool 84 may become less resilient over time. The present disclosure may readily and inexpensively be able to accommodate these differences and changes in the sensors 82 for the indexer 16 that will be described later herein. The system may also be able to readily and inexpensively accommodate differences in heat exchangers 30 with which it is engaged as the setup procedure may be such that variations in the location of openings 36 in the rows and columns on the face plate 34 are taken into consideration prior to beginning the cleaning operation. It will further be understood that additional sensors (although not illustrated herein) may be provided on any part of trolley 102 and/or junction box 52 or anywhere else on indexer 16 to gather information that will help trolley 102 to navigate between openings 36 in face plate 34. An exemplary possible additional sensor 124 is shown illustrated on trolley 102 (FIG. 10).

Communication device 14 may be a handheld communication device that an operator of the water-jet cleaning system 10 may utilize to setup and then clean equipment such as the heat exchanger discussed earlier herein. As briefly discussed above, the communication device 14 may be programmed with THE LUNCH BOX™' The operator will switch on the communication device 14 and following prompts on a user interface will perform a setup procedure for the program to learn about the specific heat exchanger to be cleaned. Once the setup procedure is completed, the operator will follow prompts on the user interface and will perform a cleaning procedure.

System 10 may use a hardware and/or a software based approach to determine the relative distances and the slope between openings 36 in face plate 34 using a Cartesian coordinate system. The term "Cartesian coordinate system" denotes a system where each point in a plane may be identified by a pair of x and y coordinates. These x and y coordinates are the distances to a particular point in the plane from each of the fixed X and Y axes. In system 10, the X and Y axes are the second arm 46 and first arm 44, respectively.

In system 10, the x/y coordinates of a sample of the openings 36 in face plate 34 are determined and are then used to learn the pattern of the openings 36. Once the pattern is learned, these x/y coordinates are then able to be used to navigate face plate 34 and correctly position trolley 102 and thereby the one or more lances 17 and nozzles carried by trolley 102 over one or more openings 36. Communication device 14 may then be utilized to deliver water under high-pressure through hoses 20, 22 to clean built-up material from within the bores of the tubes of heat exchanger 30.

The programming provided in communication device 14 (or control table) may also provide data logging feedback to the operator holding communication device 14. Such feedback may include keeping track of a total number of tubes in heat exchanger 30 that are to be cleaned, the percentage of tubes that have been cleaned, the average number of tubes cleaned per hour; a total time of forward movement (or forward feed) per individual opening in feet/minutes (or any other desired units of measurement); the total time of reverse motion (or reverse feed) per individual opening in feet/minutes (or other); the average speed of forward feed, the average speed of reverse feet; the location in changed feed rate per opening; the total number of openings the automated indexing located; the total time of automated opening to opening location in minutes and seconds; the depth of lance travel in feet and inches (or other desired units of measurement); the location of detected plugs (or blockages) in the tubes of heat exchanger; the depth of any plug. All of this data may be computed and stored and may then be later retrieved for analysis. All of the data may be stored under specific job titles and dates of inspection/cleaning.

The programming may also be operatively engaged with any other sensors in water delivery system 12 or indexer 16, such as a gravity sensor, that detects irregular motion of trolley 102 and automatically turns off the high pressure water. Such a gravity sensor may also automatically lock and sever communications with communications device 14.

THE LUNCH BOX™ may provide application-based capabilities to move trolley 102 and thereby lances 17 to openings 36 above, below, to the left, or right of the last targeted opening 36. Sensor verification of the intended target opening 36 and adjustments in target calculations, if necessary, may help to create a learning system based upon observed results.

In summary, after indexer 16 is engaged with a new heat exchanger 30, system 10 has to "learn" the pattern of openings 36 on face plate 34 before a cleaning operation can begin. This learning is accomplished through performing the setup procedure. The setup procedure is utilized to identify a relative slope and distance between any two adjacent openings 36 on face plate 34. Once the pattern is learned then, in a second step of the process, a system calibration is performed. The calibration may determine the variance in a requested location movement and the actual, observed movement location in all four directions of the x/y coordinate system. The resultant variances may be used during movement requests to accurately locate any desired target opening 36

System 10 may be used in the following manner. When an operator arrives on a jobsite, he or she will engage indexer 16 on the flange 38 surrounding face plate 34 in the manner previously described herein. The operator may move through the setup procedure (described below), which may be followed by a calibration procedure and finally is followed by the actual cleaning operation.

Figure 14:
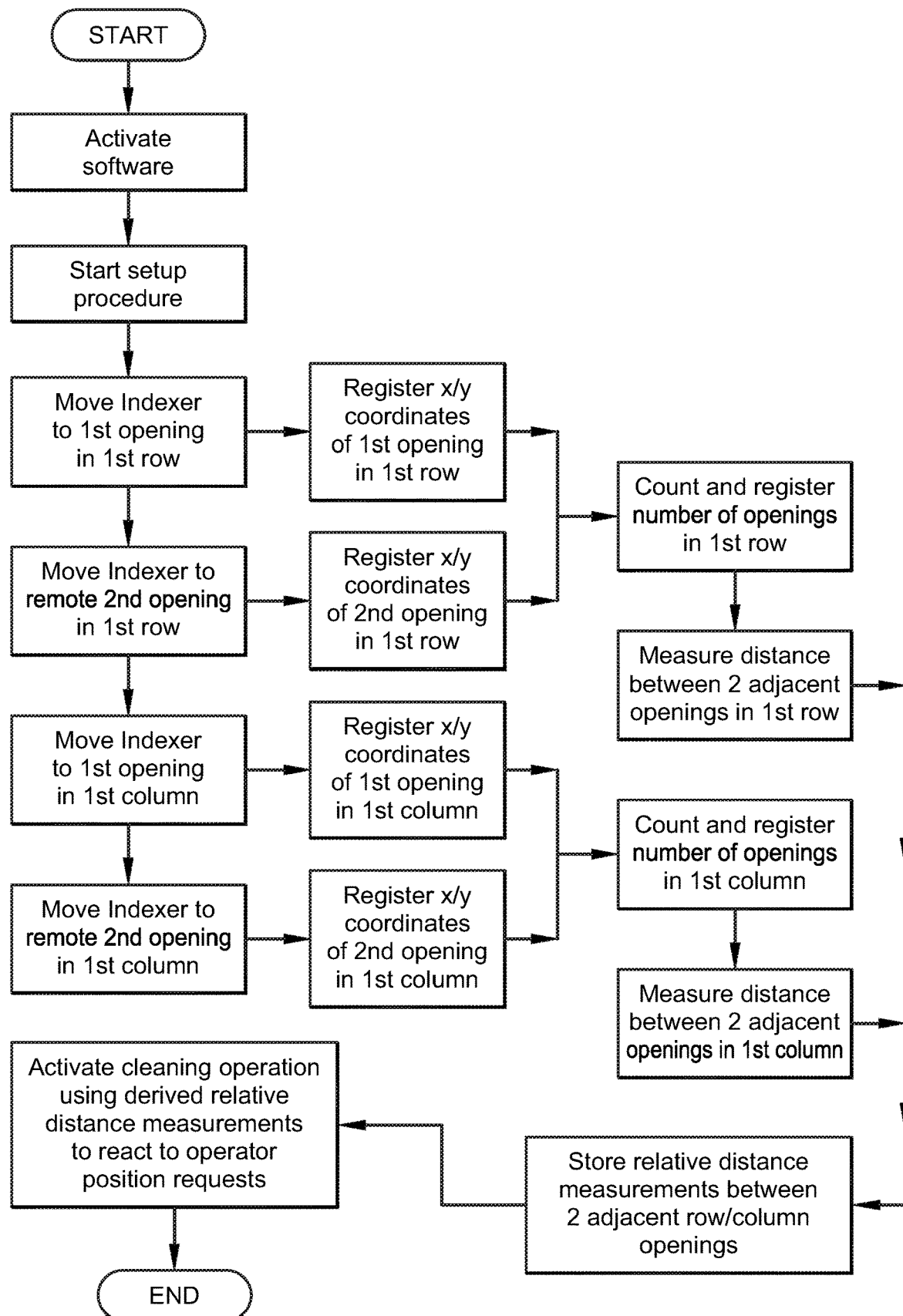
FIG. 14 is a flowchart showing an exemplary process for locating heat exchanger tube openings using the system illustrated in FIGS. 1-13.
Figure 15:
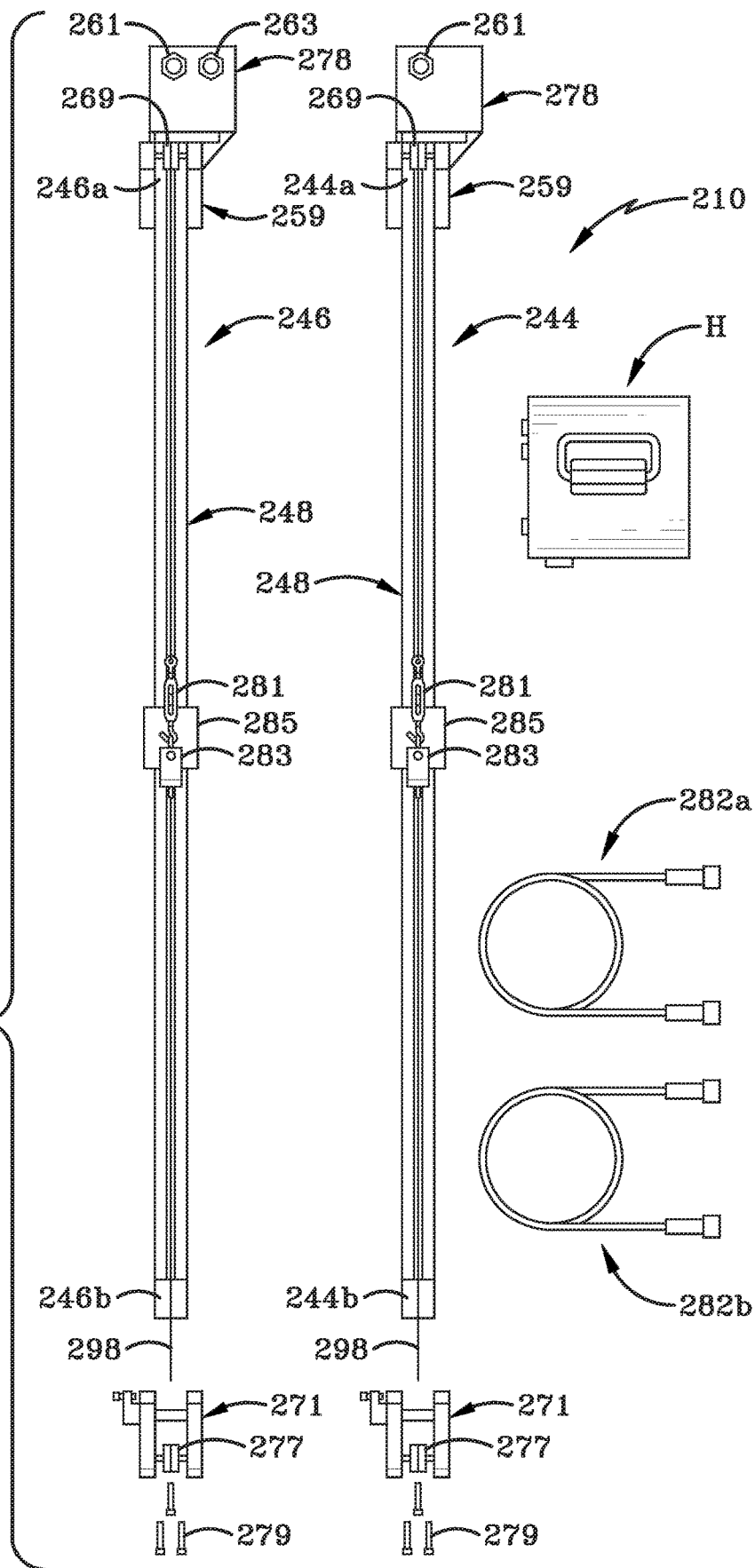
FIG. 15 is a diagrammatic front elevational view of a retrofit indexer kit in accordance with an aspect of the present disclosure.

FIG. 14 is a flow-chart showing an exemplary setup procedure. Referring to FIGS. 1A, 1B, and FIG. 14, a first step may require the operator to activate the specialized software, i.e., THE LUNCH BOX™ provided in communication device 14. The activated software may enable the operator to activate and deactivate components of water-jet cleaning system 10, to move first arm 44 on indexer 16 relative to second arm 46 and to start and stop water flow amongst other tasks. All of this may be accomplished by simply inputting commands on a user interface provided on communication device 14. The inputting of commands may be as simple as contacting arrows displayed on a touch screen of device 14. The operator may 'tap" icons or functions displayed on the user interface or may hold his or her fingertip for a period of time on the icon or function. When moving first arm 44 for example, tapping the appropriate function on the user interface (e.g., on a touch screen) will tend to cause the first arm 44 to "inch" across face plate 34 in small motions. When the operator holds his or her fingertip on the user interface, a continuous movement of the first arm 44 across face plate 34 for a longer distance will occur.

By way of example only, the setup procedure may include selecting "Settings" on a first display screen, then selecting "Indexer Setup. The operator will then need to input particular information into the system. In order to input this information, in a first step the operator will select "Horizontal tubes to move" in which the operator enters a number of openings 36 to teach on the X-axis moving left to right. The operator will type in the appropriate number, such as "12" for example. The screen display will return to the previous page and the operator will select "Vertical tubes to move". Using the touch screen or keypad, the operator will enter the number of rows to teach on the Y-axis moving in direction up to down. In many instances this number should be an even number of rows. The screen display will return to the previous page and the operator will select "Bundle Face Hole Configuration". The following screen will over the operator the option of "honeycomb" or "straight line". The operator will select the dedicated honeycomb or straight line pattern of the tube bundle to be cleaned. This selection will determine the movement of indexer 16 when moving up and down. The screen display will return to the previous page and the operator will use the user interface and from the setting menu locate the tab for "Number of Tubes/Pipes". The following screen displays the option to enter the number of lances 117 being used on indexer. The operator will use the user interface and enter the appropriate number such as "1" or "2" or some other number in keeping with the configuration of trolley 102. This entry into communication device 14 tells the indexer 16 how many holes to move with each click of the button.

Once the aforementioned information is entered, the operator will click the option of "Smart Indexer Set up" and will select "Go" at step 1 to perform system calibration. This process will take two readings on each axis movement by moving on first arm 44 to measure any accumulated error of indexer 16. The accumulated error that is measured will then be calculated by the program and will be eliminated from measurements of future movements in order for indexer 16 to remain accurate. The aforementioned calibration step could also be considered to be optimizing the system for accurate performance. After each movement of trolley 102 to a new target opening, such as 36*n* or 36*p*, a reading from sensor 82 may be taken and the actual and expected locations of the target openings 36*n*, 36 may be registered by communication device 14 and compared by the software therein. Any variation in the two numbers is used in a smoothing routine that is performed by the software and may be applied to future movements of trolley 52 in that particular direction. The smoothing routine may account for any mechanical or external variables which may be non-uniform from indexer to indexer or job to job.

In step 2, the operator will contact user interface and select the step "Locate initial Hole for Horizontal Set up". The operator may tap or hold arrow keys provided on the screen (i.e., on the user interface) to navigate trolley 102 across face plate 34. The operator will press and hold one of the direction arrows for a constant rate longer movement across face plate 34 or will tap arrow for shorter bursts of movement of trolley 102 across face plate 34. The operator will select a first target opening 36 and will select a point of reference on trolley 102. Using the direction arrows on the user interface, the operator will move trolley 102 across face plate 34 until the selected point of reference is aligned over the first target opening 36. Sensors may be utilized to accurately align trolley 102 with the selected first target opening 36. Once trolley 102 is aligned with the center of the first target opening 36, the operator will click "Go" on the user interface.

Step 2 above, is described in greater detail as follows. The operator may select a first opening in a first row of face plate 34, such as first opening 36*a* (FIG. 1A) or 36*a*' (FIG. 1B) in row R1. Using the direction arrows (up, down, left and right arrows) on the user interface of communication device 14, the operator will move first arm 44 so as to position first collar 110, secondary collar 113, and lance 117 over that first opening 36*a* or 36*a*'. (For the sake of simplicity of description, lance 117 will be described further herein as the component used as a reference point for the operator.) More particularly, using the user interface on communication device 14, the operator will move lance 117 to a position where lance 117 is centered over first opening 36*a* or 36*a*'. So, for example, the direction arrows, if provided on the user interface, will be utilized by the operator to move trolley 102 up, down to the left or to the right on face plate 34. For example, the operator may tap the direction arrow on the user interface to "inch" the indexer 16 up, down, to the left, or to the right. If the operator presses and holds the desired direction arrow, then the indexer 16 may move at a constant feed rate in the selected direction. The user interface may provide digital feedback to the operator by displaying an image on the user interface. The image may be graphics generated by the software program or, if a camera is provided on indexer 16, the image may be an actual view of face plate 34. The user interface may further display distance measurements (in inches per minute, for example) or as a percentage. The operator is thereby able to change the position of trolley 102 on indexer 16 in real time and may be able to see that change in real time.

Sensor technology on indexer 16 may then be utilized to determine a center of first opening 36*a* and the operator may utilize this sensor technology to locate lance 117 in the desired centered position. The operator may contact the user interface on communication device 14 by touching a displayed prompt, for example, to register the position of lance 117 relative to the x/y axes. It should be noted that sensors 82, which may each be operatively engaged with spring-loaded first spool 84 on the associated first arm 44 and second arm 46 may be used to determine a length of draw-wire 94 that has been wound off of or onto each spool 84 when trolley 102 is moved in response to commands from communication device 14. These length measurements may be transmitted from sensors 82 to communication device 14 and the actual position of the first opening 36*a*, 36*a*' relative to the X-axis and to the Y-axis may be determined from these measurements. The length measurements may be registered, stored or recorded by communication device 14 as the x/y coordinates for first opening 36a, 36a'. In some instances the operator may need to enter information about the x/y coordinates and in other instances communication device 14 may automatically record the x/y coordinate information In step 3, the operator will select the function "Move 12 holes to the left or right". It should be noted that the number "12" is the number selected during setup for the number of openings 36 in the horizontal row. (If the entered number is different from "12" then that different number will appear in the function on user interface.) The operator will move the trolley 102 using the direction arrows on the user interface and, using sensors, will accurately align trolley 102 with the second target opening 36 that is located 12 openings away from the first target opening 36. Once the trolley 102 is accurately aligned with the center of the second target opening 36, the operator will click "Go" on the user interface.

Step 3 may be described in greater detail as follows. The operator may select a second opening that may be located some distance away from first opening 36a, 36a' in row R1. The greater the distance between first opening 36a, 36a' and the selected second opening, the better, as a greater distance may help to minimize any variance in the slope between the two openings (36a, 36a' and the selected second opening) relative to the X-axis. So for example, the operator may select second opening 36b (FIG. 1A) or 36b' (FIG. 1B) and using direction arrows on the user interface of communication device 14, may move lance 117 to be positioned over second opening 36b, 36b'. Then, utilizing sensor technology, the operator may locate a center of second opening 36b or 36b' and position lance 117 thereover. The x/y coordinates of second opening 36b, 36b' may then be registered, stored or recorded by communication device 14.

The operator may then physically count the number of openings 36 that are in row R1 and enter that information into communication device 14. The operator may also physically measure the distance between the centers of two adjacent openings located in row R1; such as the distance between first opening 36a and the adjacent opening 36c (FIG. 1A) or 36a' and the adjacent opening 36c' (FIG. 1B). This measurement may be undertaken in many ways such as by using a micrometer or tape measure. The measured distance "D1" (FIG. 1A) or "D3" (FIG. 1B) may be entered by the operator into communication device 14 and is thereby recorded or stored in communication device 14. The operator may also enter the number of rows of openings 36 present on face plate 34 (such as R1, R2, R3 etc.) and may also enter the number of openings 36 in each row.

The programming in communication device may then calculate the relative x/y distance and slope between first openings 36a, 36a' and the associated second openings 36b, 36b', respectively. The programming may also map out the location of all of the openings located along row R1 between openings 36a and 36b (FIG. 1A) and between openings 36a' and 36b' (FIG. 1B). The mapped locations are stored in the communication device 14.

In step 4, the operator will contact user interface and select the step "Locate initial Hole for Vertical Set up". The operator may tap or hold arrow keys provided on the screen (i.e., on the user interface) to navigate trolley 102 across face plate 34. The operator will press and hold one of the direction arrows for a constant rate longer movement across face plate 34 or will tap arrow for shorter bursts of movement of trolley 102 across face plate 34. The operator will select a first target opening 36 and will select a point of reference on trolley 102. Using the direction arrows on the user interface, the operator will move trolley 102 across face plate 34 until the selected point of reference is aligned over the first target opening 36. Sensors may be utilized to accurately align trolley 102 with the selected third target opening 36. Once trolley 102 is aligned with the center of the third target opening 36, the operator will click "Go" on the user interface.

Step 4 above is described in greater detail as follows. The operator may select a first opening in a first column of face plate 34, such as first opening 36d (FIG. 1A) or 36d' (FIG. 1B) in column C1. Using the arrows on the user interface of communication device 14, the operator may move first arm 44 so as to center lance 117 over that first opening 36d or 36d'. Utilizing the system's sensor technology, the center of first opening 36d or 36d' may be determined. The operator may then register the location of lance 117 and the software will record the x/y coordinates of the first opening 36d, 36d' in column C1.

In step 5, the operator will select the function "Move 8 holes up or down". It should be noted that the number "8" is the number selected during setup for the number of openings 36 in the vertical column. The operator will move the trolley 102 using the direction arrows on the user interface and, using sensors, will accurately align trolley 102 with a fourth target opening 36 that is located 8 openings away from the third target opening 36. Once the trolley 102 is accurately aligned with the center of the forth target opening 36, the operator will click "Go" on the user interface.

Step 6 above is described in greater detail as follows. The operator may then select a second opening that may be located some distance away from first opening 36d, 36d' in column C1. The greater the distance between first opening 36d, 36d' and the selected second opening the better, as this distance may help to minimize any slope between the two openings relative to the Y-axis. So for example, the operator may select second opening 36e (FIG. 1A) or 36e' (FIG. 1B) and using the arrows on the user interface of communication device 14, move lance 117 to a position where lance 117 may be positioned over second opening 36e or 36e' and sensors may determine the center of said second opening 36e, 36e'. The operator may then use the user interface to register the position of lance 117 and the software will record, register or store the x/y coordinates of second opening 36e, 36e'.

The operator may physically count the number of openings 36 that are in column C1 and enter that information into communication device 14. The operator may also physically measure the distance between the centers of two adjacent openings located in column C1, such as the distance between first opening 36d and the adjacent opening 36f (FIG. 1A) or 36d' and the adjacent opening 36f' (FIG. 1B). The measured distance "D2" (FIG. 1A) or "D4" (FIG. 1B) may be entered by the operator into communication device 14 where it is then recorded and/or stored.

The programming in communication device 14 may utilize the entered data to map the relative distance and slope between first opening 36d, 36d' and second opening 36e, 36e'. The communication device 14 may determine the x/y coordinates for all of the openings 36 located along column C1 between openings 36d and 36e (FIG. 1A) and between openings 36d' and 36e' (FIG. 1B). The x/y coordinates may be stored in communication device 14.

The operator may also enter the number of columns of openings 36 present on face plate 34 (such as C1, C2, C3 etc.) and may also enter the number of openings in each column. The programming may map out the x/y coordinates of each opening 36 located in the columns, which are parallel to the Y-axis, and the information may be stored in communication device 14.

In some instances because of the pattern of openings 36 in a particular face plate 34, it may be easier for the operator to perform the setup step for the columns of openings on an angle relative to the Y-axis instead of selecting a column such as column C1 that is parallel to the Y-axis. This variation is shown in FIG. 1A in the selection of column C4 or C5. The same procedure is followed as has been previously described, namely, selecting a first opening 36g (column C4) or 36k (column C5), moving and centering lance 117 over the selected first opening 36g or 36k, registering the first opening's x/y coordinates in communication device 14; selecting a remote second opening 36h (column C4) or 36m (column C5), moving and centering lance 117 over that second opening and then registering the second opening's x/y coordinates into communication device 14; measuring the distance between two adjacent openings in the selected column, such as the distance "D5" between openings 36g and 36j (column C4) or the distance "D6" between openings 36k and 36n (column C5); counting the number of openings in the column and entering the distance and number of openings into communication device 14. Using this information, the programming in communication device 14 may calculate the relative distance and slope between the first and second openings 36g, 36k and may therefore determine and store the locations of all of the openings in columns C4 or C5.

It may also be possible in some embodiments to engage indexer 16 on face plate 34 in such a manner that each of the first and second arms 44, 46 is oriented at an acute angle relative to the configuration illustrated in FIG. 1. This different engagement of first and second arms 44, 46 on face plate 10 may ensure that system 10 may clean rows and columns of openings that are not positioned parallel to the X-axis or Y-axis, and where the rows and columns are oriented at an angle of about 45° relative to the X-axis or Y-axis.

The programmed automated hole location in communication device 14 may therefore predictably map out the pattern of the tube bundle of heat exchanger 32. Mapping the tube bundle may not turn system 10 into a fully automated system. The operator may still be responsible for the performance of system, including but not limited to avoiding traveling beyond the edges of the tube bundle pattern, maneuvering around obstructions, operating hose feeding devices, etc. The programming provided in communication device 14 may aid in eliminating human error of navigating from one tube opening 36 to the next.

Once the pattern of the tube bundle has been mapped out by the programming, the operator may utilize communication device to initiate and control a cleaning operation with water-jet cleaning system 10. The user may manually actuate water delivery system 12 using communication device 14 and, subsequently, water directed into openings 36 from nozzles on the two lances 117 will blast away material from the bores of the associated heat exchanger tubes. The user may control the movement of trolley 102 via communication device 14. The operator may contact the arrow keys on communication device 14 and progressively move trolley from one opening 36 to the next, initiating a jet of water from the one or more lances 117 and directing the same into each opening, one or more at a time (depending on the number of lances on trolley 117. The operator will also cause the cleaning of any particular tube to cease by contacting appropriate controls on user interface. In other words, the programming calculates and thereby "learns" the location and pattern of the openings 36 on face plate 34. Once the pattern is learned and stored, the operator should be able move from one opening 36 to the next on face plate 34 using a single click left/right or up/down on the user interface of communication device 14 to move lances 117 to the next openings to be cleaned.

In other embodiments, indexer 16 or communication device 14 may be programmed to automatically move trolley 102 over face plate 34 from one opening 36 to the next utilizing the recorded x/y coordinates and the slope calculated by the programming. Communication device 14 may also include a deadman's switch that requires the operator to keep part of his or her hand or finger on a particular region of the user interface at all times. If contact is broken, then spraying of water from lance(s) 117 ceases substantially immediately. This will be discussed in greater detail below.

In some embodiments, using the user interface on communication device 14, the operator may initiate an automated cleaning operation. After the operator has contacted the appropriate prompt on user interface, the programming on communication device 14 may move trolley 102 to a first opening 36 or to a pair of openings if two lances 117 are located on trolley 102. Because the x/y coordinates are recorded by the programming, when the operator uses communication device to move from one opening 36 to another on the face plate 34, the stored coordinates may assist the operator to move lances 117 to the correct location where they are positioned over the centers of the openings 36. Once lances 117 are correctly positioned, the operator will contact the appropriate function or prompt on the user interface of communication device, and a jet of water may be delivered under high pressure from lance 117 into the openings 36

Lances 117 may be moved downwardly into openings 36 to be cleaned (either manually by the operator or automatically by communication device 14), may switch the water flow on or off, and may move lances 117 out of the openings after cleaning has finished. One or more sensors, cameras, or lasers provided on trolley 102 or elsewhere on indexer 16 may be utilized to verify any particular opening is adequately cleaned.

The programming in communication device 14 or indexer 16 may be set up so that if lances 117 are not withdrawn from one set of openings 36 then the operator cannot move lances 117 to the next set of openings to be cleaned. This arrangement prevents accidental damage to indexer 16, to heat exchanger 30, to the operator or to other people or objects in the vicinity of indexer 16. The programming in communication device 14 may also include an option to select an outermost perimeter on face plate 34 beyond which trolley 102 cannot move. This option may prevent damage to heat exchanger 30 or indexer 16 or to the operator or others in the vicinity if the operator accidentally initiates cleaning where no opening exists.

A user interface on communication device 14 may also include a capacitive screen that recognizes electric current from the operator's body in order for control functions to appear on the user interface. This capacitive screen may be used to control functions that appear on the user interface. Once this capacitive screen is engaged by the operator (i.e., physically contacted), the operator's engagement therewith acts as a potential emergency stop switch or dead-man switch. As soon as the operator's contact with the capacitive screen is broken, then all functions of indexer 16 and water delivery system 12 cease substantially immediately (i.e., within a second or two).

The user interface of communication device 14 may also display battery life of device 14 and may issue a warning if the battery life is low. If communication device 14 shuts down because the battery is out of power, then the indexer 16 and cleaning apparatus 12 will automatically shut down.

The operator may be able to select, from a menu provided on the user interface, the flow rate of liquid into the tubes of heat exchanger 30. He or she may also select a speed of rotation of a nozzle on lance 117 by adjusting the RPM of motors provided on water delivery system 12. The operator may also be able to select, on the user interface, other operating parameters for system 10, including setting a pre-determined time for liquid to flow through hoses 20, 22.

If two (or more) lances 117 are provided on indexer 16 then during setup, the operator will indicate this fact and that will mean system 10 will be prepared to clean two laterally spaced apart tubes in the tube bundle at the same time. The programming therein will adjust the lateral positioning of lances 117 relative to each other on trolley 102. This may be done by moving first and second gears 106, 108 towards each other or away from each other to match the distance between two selected openings 36 in a row that is parallel to the X-axis (i.e., second arm 46), e.g. distance "D1" or "D3" (FIGS. 1A and 1B, respectively). Alternatively, the first and second gears 106, 108 may be moved to match the distance between openings 36 that are in columns which are parallel to the Y-axis (i.e., first arm 44), e.g. distances "D2" or "D4" (FIG. 1A or 1B, respectively. Still further, the operator may contact the user interface to move the lances to a distance between openings in columns that are angled relative to the Y-axis or X-axis, such as distances "D5" or "D6" (FIGS. 1A and 1B, respectively).

The programming in communication device may generate a communication to the operator if openings 36 over which lance(s) 117 are moved have already been cleaned. In some instances the trolley 102 may automatically skip openings 36 to cleaned tubes and may automatically move to the opening 36 of the next uncleaned tube. If, at any point, the user interface freezes on communication device, all cleaning operations or other activities controlled by communication device 14 will be immediately halted and the wireless connection between communication device 14 and indexer 16 will be immediately severed. Communication device 14 will then have to be reset to proceed with the cleaning operation.

It will be understood that in some embodiments certain openings 36 may require the operator to manually move lance 117 into position even if the rest of the tubes having openings 36 on face plate 34 are cleaned automatically. Openings that are located on the outermost perimeter or edge of the region of openings in face plate 34 may be some of the openings that the operator has to cause the indexer 16 to clean manually.

In order to moved lances 117 in a forward direction, the operator may contact an on/off function on the user interface and taps the appropriate control "button' on the user interface to move the trolley and thereby the lances in a forward direction. Because the operator is tapping the user interface, the lances 117 will tend to "inch" forward. If the operator contacts the appropriate control button on the user interface, and presses and holds that control button, the lances 117 will advance forward over the face plate at a substantially constant feed rate. The operator may receive a digital feedback via communication device's display screen, for example, showing the feed forward movement as a distance over time or as percentage changes. For example, the forward movement may be displayed in inches per minute or as a percentage. The feed forward may occur in real time.

In order to move lances 117 in a reverse direction (i.e., opposite direction to moving forward), the user may contact the on/off function on the user interface. The operation will tap the appropriate feed reverse control function on the user interface to "inch" the lances 117 in a desired rearward direction. The reverse control button may be pressed and held for a constant feed rate. The digital feedback via communication device's display screen may show movement in inches per minute or as percentage. The change in feed reverse may occur in real time.

Other functions of indexer 16, such as rotation of nozzles may be initiated by the operator contacting the on/off function on the user interface of communication device 14 and then contacting the appropriate control button in a similar fashion as described with respect to feed forward or feed reverse functions. The digital feedback may be displayed in inches per minute or as a percentage and any change in revolutions per minute (RPM) may occur in real time.

User interface may also include control buttons for sending on/off signals to remote safety valves on pumps on water delivery system 12 so that the operator may remotely switch water on or off during a cleaning operation. Communication device 14 may be manually operated by the operator who may touch the user interface and tap left, right, up and down functions on the user interface to gradually inch the trolley 16 in the respective directions. Alternatively, the user may maintain constant contact with a particular function on the user interface to move the trolley 16 in a particular direction at a constant rate.

The automated opening location described earlier herein may be particularly helpful in situations where heat exchanger 30 or indexer 16 is off camber, i.e., perhaps sitting at an angle of 30 degrees off the vertical, for example. In such a situation, system 10 may still be able to locate all of the heat exchanger tube openings 36 and clean out the associated tubes.

Referring to FIGS. 15-27 there is shown an indexer retrofit kit in accordance with an aspect of the present disclosure, generally indicated at 210. Retrofit kit 210 is designed to be selectively engageable with the rails of any pre-existing indexer system. Retrofit kit 210 may comprise a Y-axis retrofit assembly or first arm 244, an X-axis retrofit assembly or second arm 246 and one or more sensor cables 282a, 282b.

First arm 244 and second arm 246 may be substantially identical in structure and function with the exception of one or two components that will be discussed later herein. Second arm 246 will be described in greater detail hereafter but it will be understood that the description applies equally to first arm 244.

Second arm 246 comprises an elongate member having a first end 246a and a second end 246b. A channel assembly 248 of second arm 246 may be generally X-shaped in cross-section and is received in a recessed region 285a of a slider 285. Glide pads 250 may be engaged with channel assembly 248.

A sensor housing 278 is engaged with first end 246a of second arm 246 by a first clamp assembly 259. Sensor housing 278 may comprise an exterior wall 278a (FIG. 16) that bounds and defines an interior compartment 278b. A sensor 282 may be provided within compartment 278b. A first cable connector 261 and a second cable connector 263 may be provided on wall 278a. First and second cable connectors 261, 263 may be operatively engaged with sensor 282. One end of a draw wire 294 (FIG. 16) may be operatively engaged with the sensor 282 and extend outwardly from the sensor housing 278 through a hole in the wall 278a. Draw wire 294 extends outwardly away from sensor housing 278, wraps around a pulley 295 (FIG. 19) and is engaged with slider plate 285.

Figure 19:
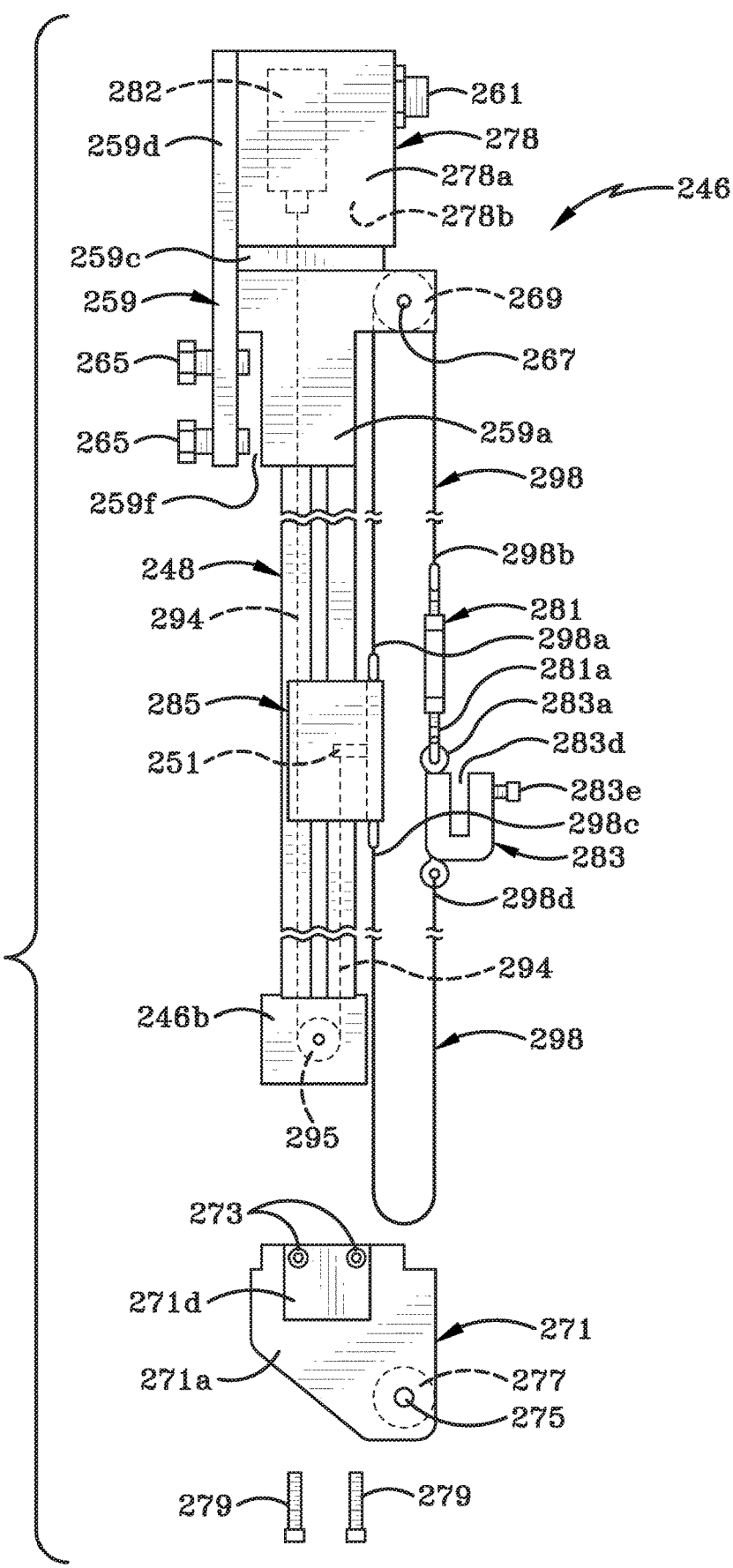
FIG. 19 is a left side view of the second arm shown in FIG. 16.

First clamp assembly 259 may comprise a first plate 259a; a second plate 259b, a third plate 259c, and a fourth plate 259d that are engaged with each other. First plate 259a and second plate 259b are laterally spaced from each other and are separated by a gap 259e. Gap 259e is sized to receive first end 246a of second arm 246 therein. Third plate 259c may be welded or otherwise secured to a first end of each of the first and second plates 259a, 259b. Third plate 259c may additionally be fixedly secured to a first region of sensor housing 278 by any suitable means such as by welding. Fourth plate 259d extends from proximate a second end of each of the first and second plates 259a, 259b and for a distance outwardly beyond third plate 259c. Fourth plate 259d is welded or otherwise secured to a second region of sensor housing 278 as shown in FIG. 19. A gap 259f is defined between a region of fourth plate 259d and first plate 259a. Fourth plate 259d defines one or more holes therein that each receive a threaded bolt 265 therein; the purpose of which will be described later herein. The ends of the shafts of bolts 265 extend into gap 259d. A rod 267 extends between an interior surface of first plate 259a and an interior surface of second plate 259b and a pulley 269 is mounted on rod 267. Pulley 269 is mounted for rotation about an axis extending along rod 267.

Figure 16:
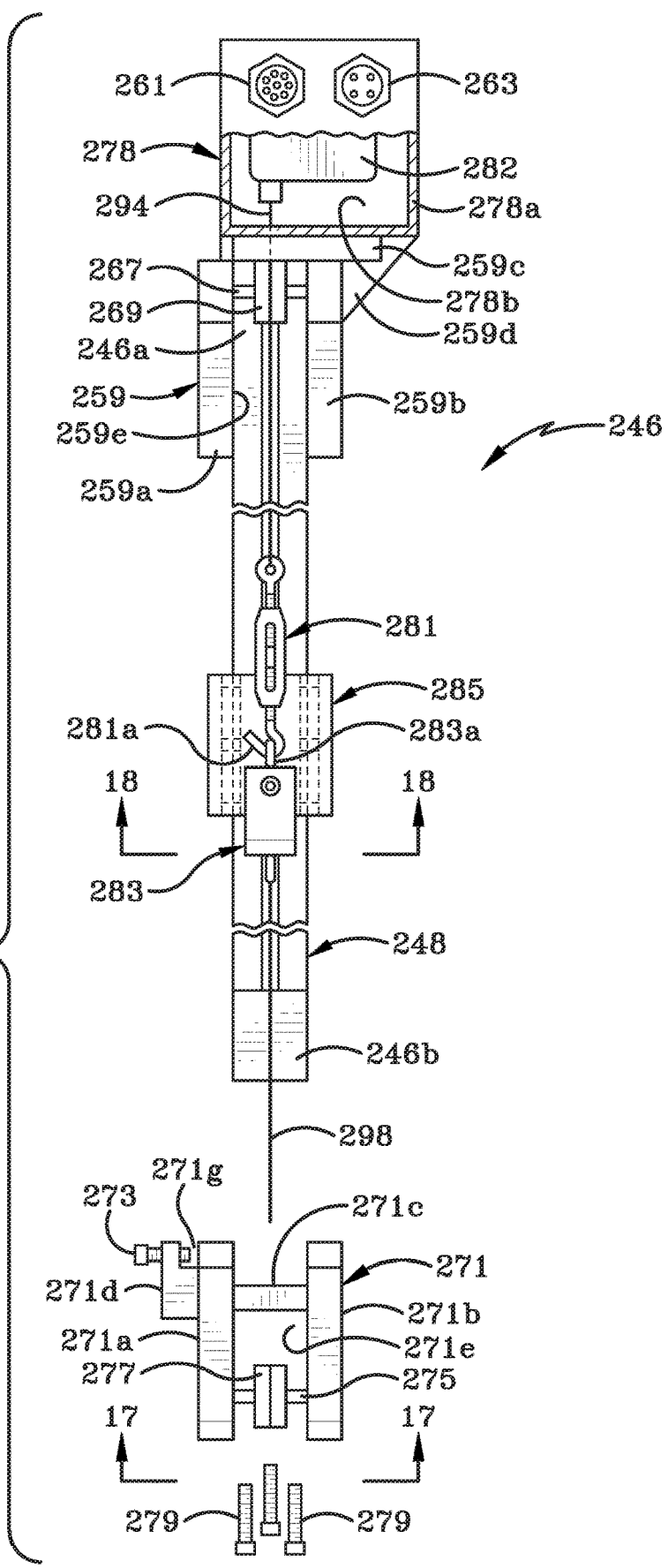
FIG. 16 is an enlarged front elevational view of a second arm of the kit showing a sensor housing thereon in partial cross-section.
Figure 17:
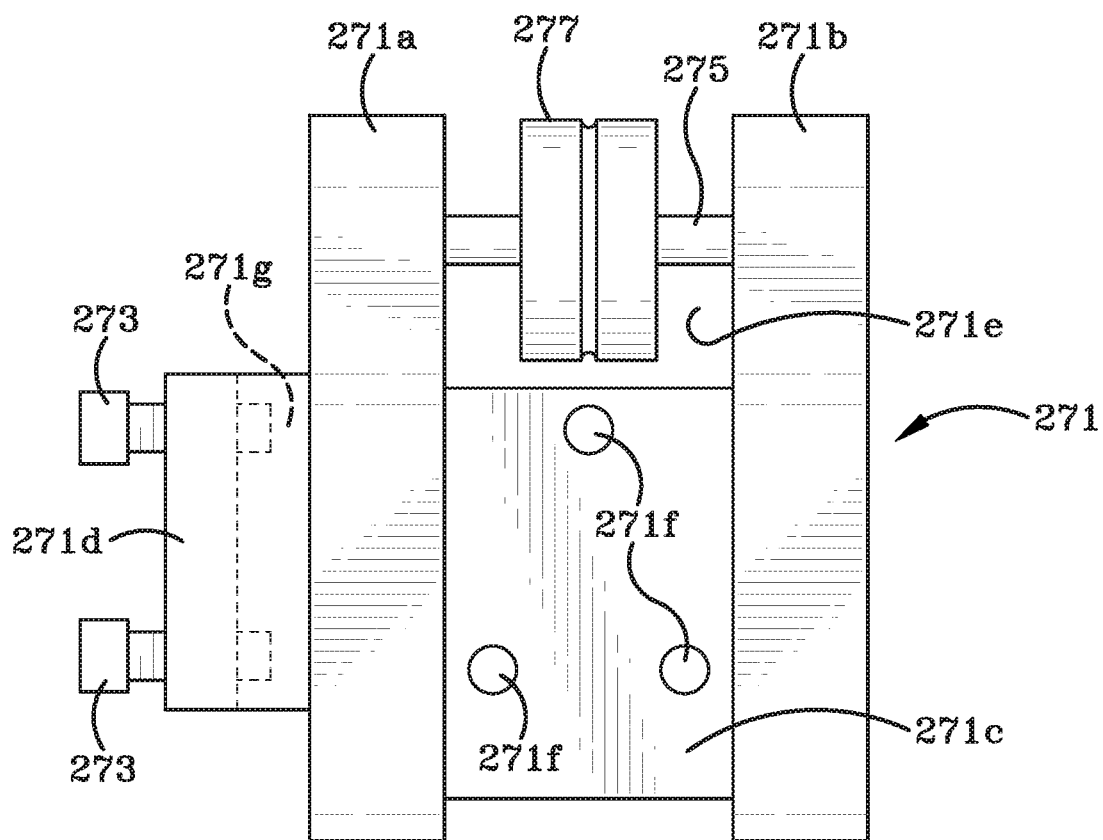
FIG. 17 is a bottom view of a second clamp assembly of the kit taken along line 17-17 of FIG. 16.

A second clamp assembly 271 is detachably engaged with second end 246b of second arm 246. Second clamp assembly 271 is shown in detail in FIG. 17. Second clamp assembly 271 comprises a first plate 271a; a second plate 271b, a third plate 271c, and a fourth plate 271d. First and second plates 271a, 271b are spaced a distance laterally apart from each other and define a gap 271e between them. Third plate 271c is welded to each of first and second plates 271a, 271b but does not extend all the way from the first ends of the plates to the second ends thereof. Third plate 271c defines one or more apertures 271f therein. As illustrated in FIG. 17, third plate 271c may define three apertures 271f therein. Fourth plate 271d may be generally L-shaped when second arm 244 is viewed from the front or back (as shown in FIG. 16). One leg of the L-shape may be welded or otherwise secured to an exterior surface of second plate 271b. The other leg of the L-shape is located a distance away from the exterior surface of second plate 271b such that a gap 271g is defined between the other leg and the second plate 271b. One or more holes are defined in this other leg and a threaded bolt 273 may extend through each hole and towards the exterior surface of second plate 271b.

In a region beyond third plate 271c but between first and second plates 271a, 271b, a rod 275 extends between the interior surfaces of first and second plates 271a, 27b. A pulley 277 is mounted on rod 275. Pulley 277 is mounted for rotation about an axis that extends along rod 275.

Second cable assembly 271 may be selectively secured to second end 246b of second arm 246 by inserting one or more bolts 279 (FIG. 16) through the one or more holes 271f defined in second cable assembly 271 and into aligned apertures 246c (FIG. 21) defined in an end wall at the second end 246b of second arm 246.

As shown in FIGS. 16 and 19, second arm 246 further includes a turnbuckle assembly 281, a clamp 283, a slider 285, and a cable 298. Slider 285 defines a recess 285a (FIG. 18) therein and is operatively engaged with channel assembly 248 of second arm 246. Cable 298 may be provided in two sections. A first end 298a of a first section of cable 298 is secured to slider 285 and extends outwardly therefrom wrapping around pulley 269 of first clamp assembly 259. A second end 298b of the first section of cable 298 is secured to turnbuckle assembly 281. A first end 298c of a second section of cable 298 is secured to slider 285 and extends outwardly therefrom and a second end 298d of the second section of cable 298 is secured to clamp 283. Clamp 283 is selectively engageable with or disengageable from turnbuckle assembly 281 as will be discussed hereafter.

Figure 20:
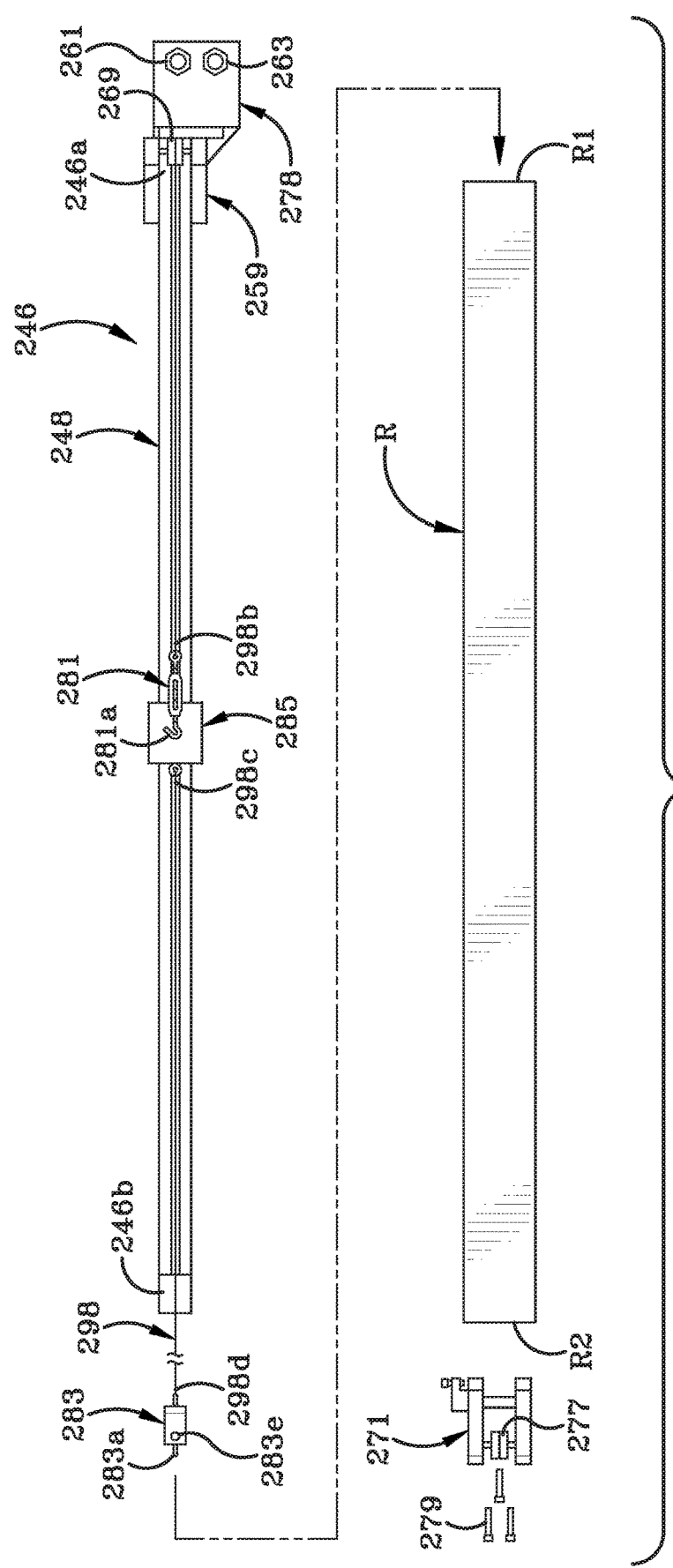
FIG. 20 is a front elevational view showing the second arm being engaged with a first indexer rail of a pre-existing indexer.

FIG. 20 shows second arm 246 being engaged with a tubular rail "R" of a pre-existing indexer system. The rail "R" does not comprise part of the kit 210 but is rather one of the components with which kit 210 is selectively engaged. Rail "R" may be an elongate member having a first end "R1" and a second end "R2" and defining a bore "R3" therein.

Figure 21:
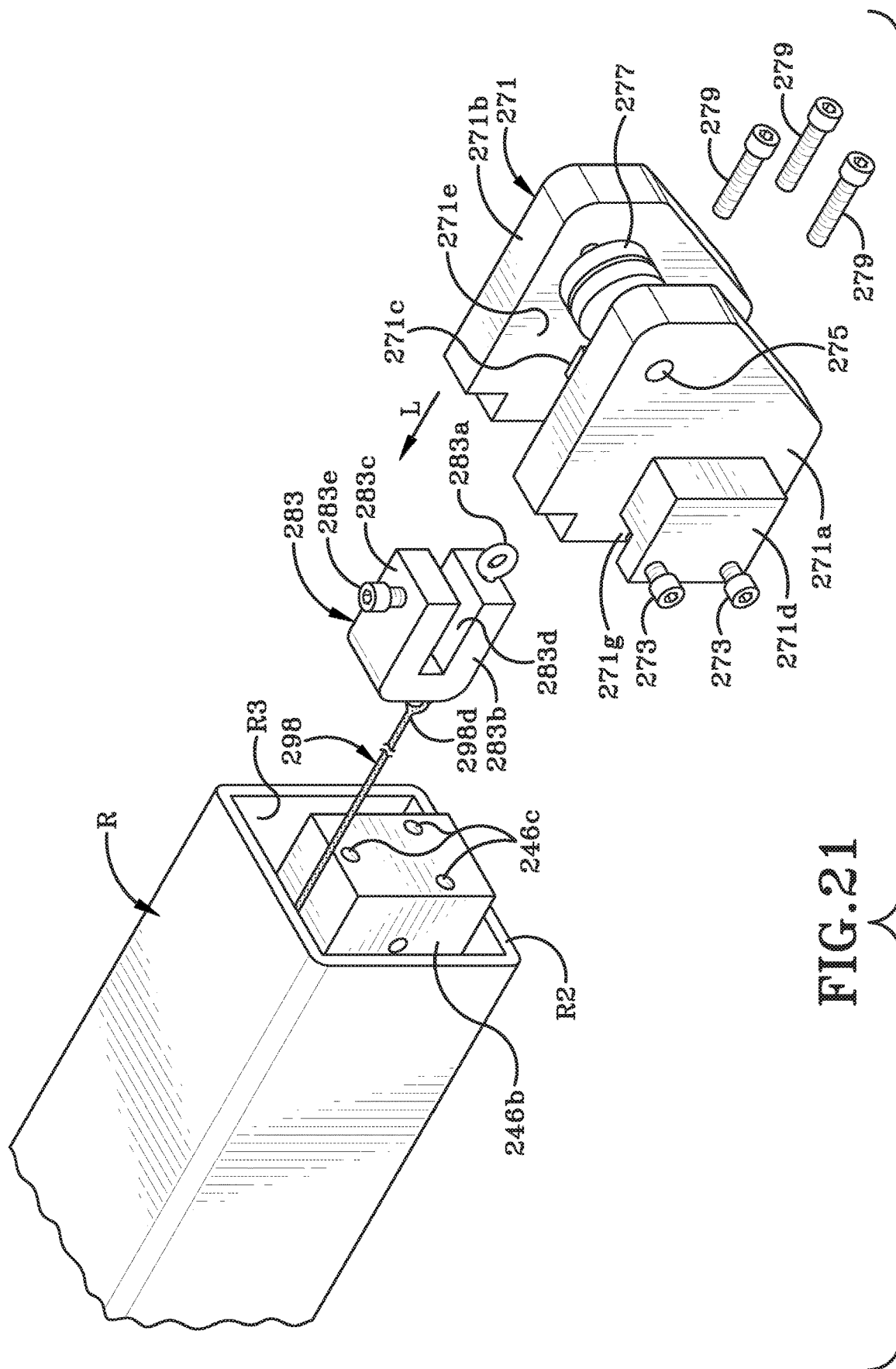
FIG. 21 is a perspective view of the end of the first indexer rail of the pre-existing indexer showing a region of a second end of the second arm positioned within a bore of the first indexer rail and the second clamp assembly positioned to be engaged with the first indexer rail.

As shown in FIGS. 20 and 21, when it is desired to engage second arm 246 with rail "R", clamp 283 is disengaged from turnbuckle assembly 281 and second end 246b of second arm 246 is inserted into an opening in first end "R1" of rail "R". Second arm 246 is moved into bore "R3" until second end 246b of second arm 246 is proximate second end "R2" of rail "R" as shown in FIG. 21. During this insertion, care must be taken to ensure that cable 298 and clamp 283 are fed through bore "R3" before second end 246b and to ensure that turnbuckle assembly 281 is not fed into bore "R3". Clamp 283 and cable 298 are fed around pulley 277 of second cable assembly 271 and then second cable assembly 271 is moved in the direction of the arrow "L" shown in FIG. 21 and into a position where the first ends of first and second plates 271a, 271b abut second end "R" of rail "R". At this point, at least a portion of the fourth plate 271d overlaps a side wall of rail "R". Additionally, the holes 271f in third plate 271c are moved into alignment with apertures 246c in second end 246b of second arm 246. Bolts 279 are inserted through the aligned holes and apertures and second cable assembly 271 is secured to second arm 246. Bolts 273 on second cable assembly 271 are rotated in a direction that will cause the ends of bolts 273 to contact the exterior surface of rail "R" and thereby detachably secure second cable assembly 271 to rail "R".

Figure 22:
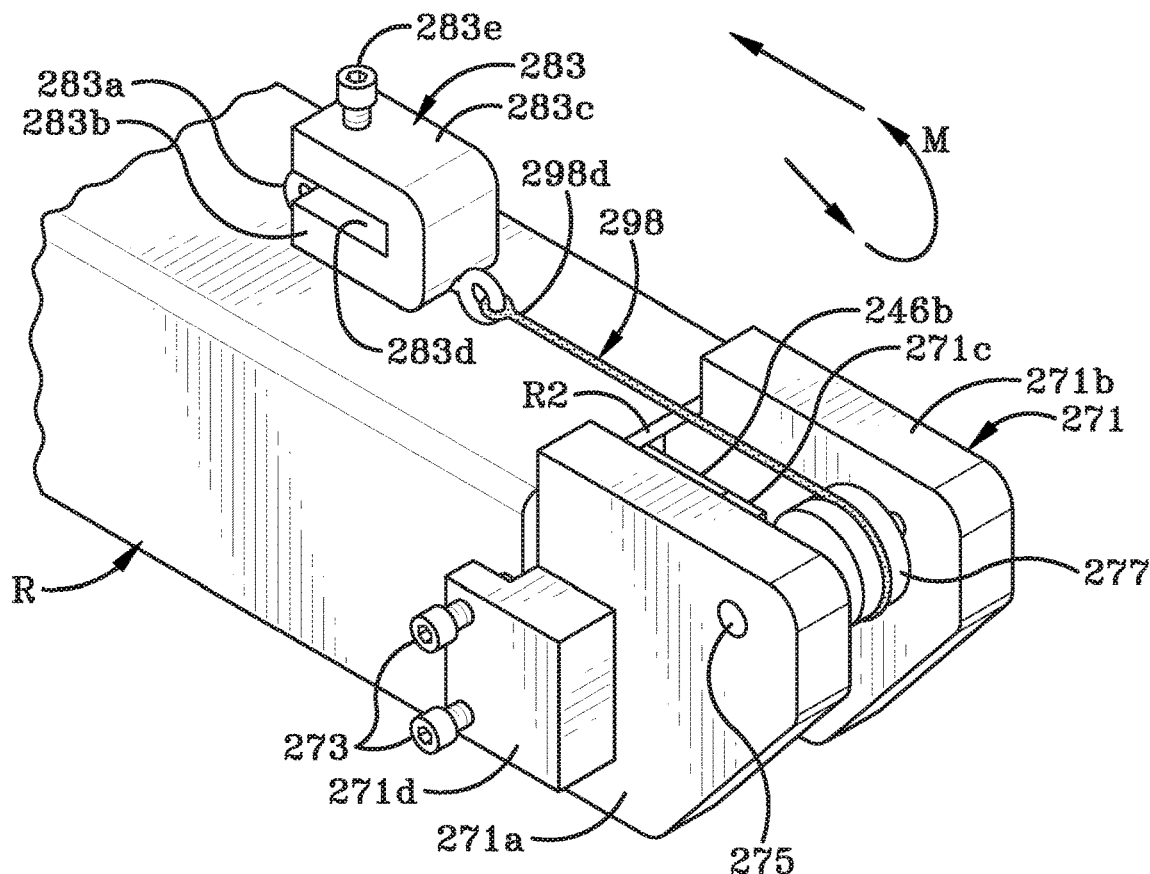
FIG. 22 is a perspective view of a portion of the first indexer rail with the second clamp assembly engaged therewith and the clamp and cable being moved away from the pulley of the second clamp assembly.
Figure 23:
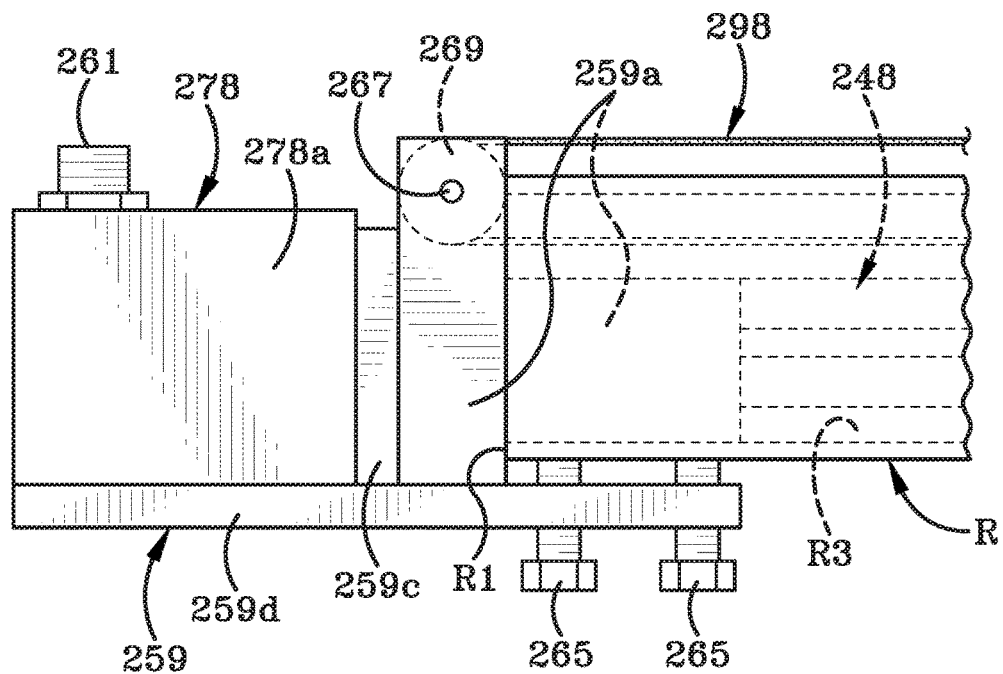
FIG. 23 is a left side view of a portion of the first indexer rail with a sensor housing and first clamp assembly engaged therewith.
Figure 26:
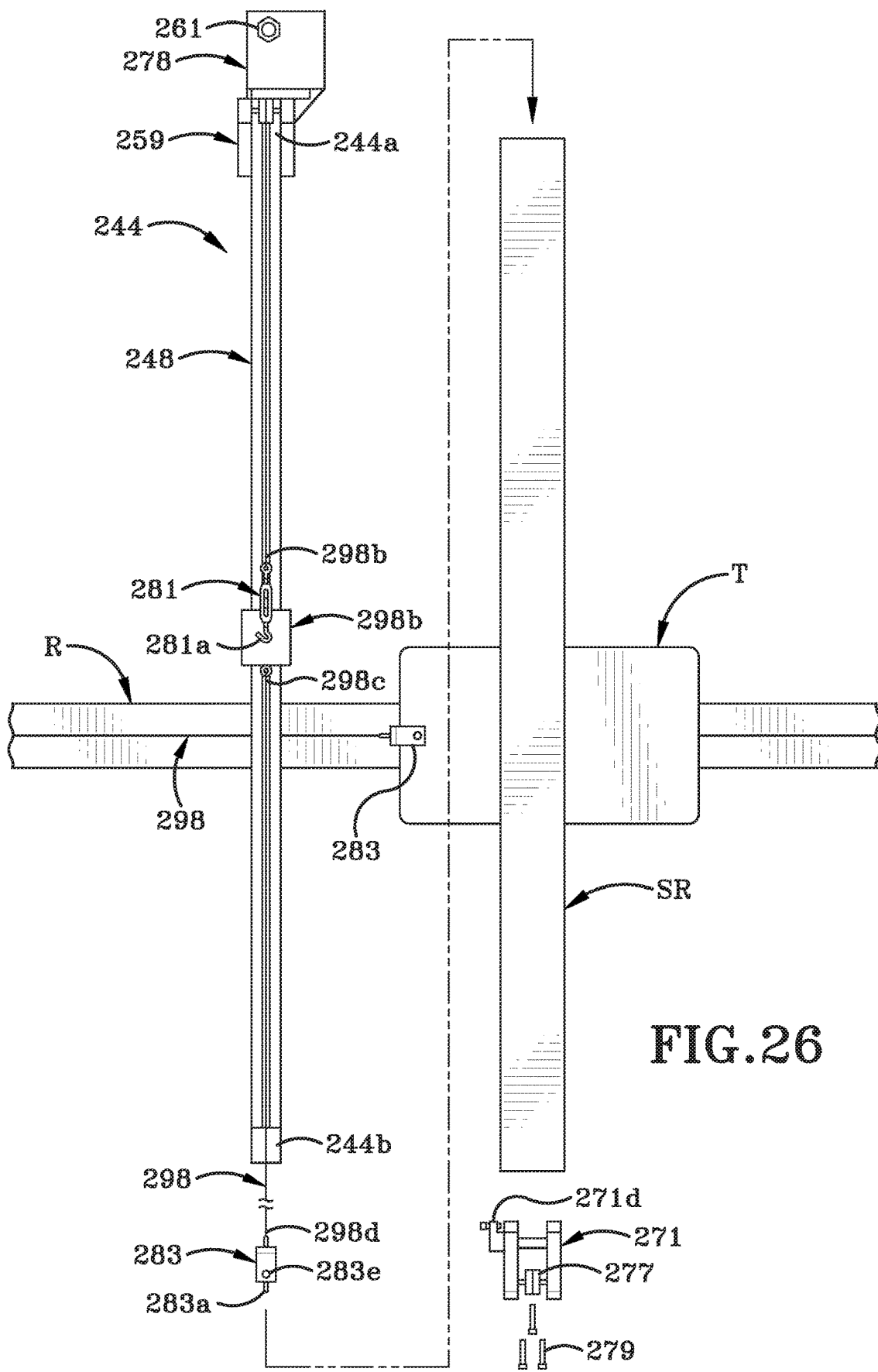
FIG. 26 is a front elevation view showing a first arm of the kit being engaged with a second indexer rail and showing the first indexer rail with the second arm engaged therewith and a trolley engaged with the first indexer rail.

Clamp 283 and cable 298 are moved in the direction of the arrow "M" in FIG. 22 along the exterior surface of rail "R" and towards first end "R1" of rail "R". At the same time, turnbuckle assembly 281 is moved towards clamp 283 along the exterior surface of rail "R"; where turnbuckle assembly 281 is being moved towards second end "R2" of rail "R". Turnbuckle assembly 281 includes a hook 281a that is captured in a ring 283a of clamp 283. The turnbuckle of turnbuckle assembly 281 is then rotated in a direction (such as is illustrated by the rotational arrow "N" in FIG. 24) that will draw the two sections of cable 298 towards each other in the directions indicated by "P1" and "P2", thereby pulling the cable taut. As the turnbuckle is rotated it will pull first clamp assembly 259 partially into the opening defined by first end "R1" of rail "R". FIG. 23 shows part of first plate 259a of first clamping assembly 259 received within bore "R3" of rail "R". Pulley 269 is positioned so that part of cable 298 enters into bore "R3" and part of cable 298 extends over the exterior surface of rail "R". A portion of fourth plate 259d of first clamping assembly 259 extends for a distance along the exterior surface of rail "R" and bolts 265 may be rotated in a direction that causes the ends of the bolts 265 to contact the exterior surface of rail "R" and thereby retain first clamping assembly 259 to rail "R". The second arm 246 is shown fully engaged with rail "R" in FIG. 25.

By engaging second arm 246 to rail "R" in this manner, rail "R" is effectively provided with a sensor 282 that can be subsequently used in the same manner as the sensor 82 provided on second arm 46 of indexer 16.

In other embodiments, the retrofit kit is engaged with a pre-existing indexer system by providing a clamping mechanism on the first arm 244 of the retrofit kit or on the pre-existing rail "R" and then clamping or clipping the first arm 244 to the rail "R". In other suitable system for engaging the arms of the retrofit kit to the rails of the pre-existing indexer system may be utilized.

As indicated previously herein, first arm 244 is substantially identical to second arm 246 except that instead of having two cable connectors 261, 263 on the sensor housing 278, first arm 244 only has a single cable connector 261 thereon. First arm 244 has a first end 244a (FIG. 26) and a second end 244b and is engaged with a second rail "SR" of the pre-exiting indexer in the same manner as second arm 246 is described as being engaged with rail "R". Once first arm 244 is engaged with a second rail "SR" that second rail "SR" is also provided with a sensor 282 that can be subsequently used in the same manner as the sensor 82 provided on first arm 44 of indexer 16.

Figure 18:
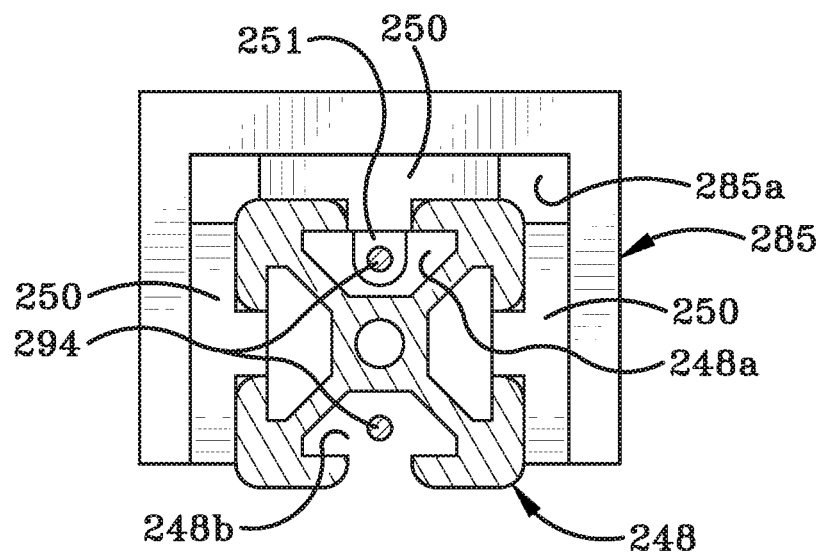
FIG. 18 is a bottom view of the second arm taken along line 18-18 of FIG. 16.

The pre-exiting indexer's trolley "T" (FIG. 25) is then engaged with rail "R" in the usual manner for that pre-existing indexer. Clamp 283 is a U-shaped member as can be seen in FIG. 22 and this U-shaped member has a first arm 283b and a second arm 283c that define a gap 283d between them. Second arm 283c defined a hole therein and through which a threaded bolt 283e is received. Clamp 283 may be engaged with the trolley "T" by receiving a portion of trolley "T" into gap 283d of clamp 283. Bolt 283e may then be rotated in a direction that will cause clamp 283 to be secured to trolley "T". When the pre-existing indexer is actuated, trolley "T" may be moved along rail "R" because clamp 283 is engaged with trolley "T", when trolley "T" moves, clamp 283 will move in unison therewith. Trolley "T" may be selectively moved in either direction indicated by arrows "Q1" or "Q2" in FIG. 25. Clamp 283, turnbuckle assembly 281 and therefore cable 298 will move in unison with trolley "T". The movement of cable 298 will cause slider 285 (which is located in the associated rail ("R" or "SR") to move along the associated first arm 244 or second arm 246. Referring to FIGS. 18 and 19, the draw wire 294 extends out of sensor 282, wraps around a pulley 295 (FIG. 19) and is then fixedly secured to slider 285 by way of a tab 251. Consequently, as slider 285 moves along the channel assembly 248 of the associated arm 244 or 246, the draw wire 294 is reeled onto or off of a spool provided in sensor 282 (as has been described with respect to sensor 82). Sensor 282 functions in the same manner as sensor 82. Consequently, the change in length of draw wire 294 is determined by sensor 282 and is transmitted as a signal from sensor 282, via connectors 261, 263 (for second arm 246) and connector 261 (for first arm 244) and sensor cables 282a, 282b (FIG. 15) to hub 211 (FIG. 27) and/or to a communication device 14 in the same manner as has been described before.

Retrofit kit 210 can therefore enable a pre-existing indexer to "learn" a pattern or configuration of a plurality of openings in a faceplate of a heat exchanger in the same manner as has been described with respect to indexer 16.

Hub 211 (FIG. 27) may include a plurality of receptacles such as "H1", "H2", "H3" and "H4" that may be utilized to connect sensor cables 282a, 282b, air sources, lubricants etc. Some of the receptacles, such as "H1" may be dedicated 8-pin cable receptacles that can only accept a specific sensor cable 282a that is secured to an 8-pin connector 261, 263 on second arm 246. First arm 244 lacks the 8-pin connector and therefore does not and cannot be connected to the 8-pin receptacle on hub 211. Hub 11 may also include a handle "H5" so that it may be easily lifted and moved.

In addition to or instead of the components disclosed herein, system 10 may include a camera that is mounted on trolley 102 or on any other part of indexer 16 and is directed toward face plate 34. This camera may be used to photograph or video the face plate as the indexer moves thereacross and the image so produced may be utilized by system 10 to determine the location of the indexer relative to the face plate. Alternatively, system 10 may utilize a laser that is directed toward the face plate, with or without sensors, to determine the location of the indexer relative to the face plate. THE LUNCH BOX™ programming may utilize an image captured by the camera or the laser to virtually locate the centers of a plurality of openings in the face plate. The programming may then perform the required calculations to determine the relevant distances between openings and the slopes therebetween and to thereby "learn" the pattern of openings 36 on face plate 34. Once the pattern of openings on the photograph has been learned by the programming, communication device 14 may be activated to use the learned pattern to move trolley 102 across the actual physical face plate 34 on heat exchanger 30 and to direct water jets into the actual openings 36 to clean the associated tubes in the heat exchanger.

A photographic or video image or a laser may be used by system 10 to locate the openings in a face plate and then to drive a screw or rack and pinion as a mechanical way to operate indexer.

Referring to FIGS. 28-30 there is shown a second embodiment of the retrofit kit, generally indicated at 346. Kit 346 is substantially identical in structure and function to kit 246 shown in FIGS. 15-27 except for a number of differences that will be described hereafter.

Kit 346 includes a magnetostrictive sensor 382 instead of a string-pot like sensor such as those illustrated In FIGS. 1-27 and described above as sensors 82 and 282. Magnetostriction is the condition where ferromagnetic materials change their shape or dimensions during magnetization. Sensor 382 is placed within sensor housing 278 instead of sensor 82 or 282. One end of sensor 382 is threadably engaged in a threaded aperture defined in third plate 259c of first clamp assembly 259.

Instead of the draw wire 294 that extends out of sensor 282, wraps around pulley 295 (FIG. 19) and is secured to slider 285 by way of a tab 251, a sensor rod 394 is engaged with the end of sensor 382 which is threadably engaged with third plate 259c. Rod 394 extends outwardly from sensor 382 and along a groove 248a (FIGS. 28 and 29) defined in channel 248, finally terminating in second end 246b of second arm 246. This can be seen in FIG. 30 which shows rod 394 extending between sensor 382 and second end 246b. Rod 394 thus runs the length of second arm 246 and may be used to identify the location of a magnet 351 on slider 385.

Because retrofit kit 346 includes a first arm 246 and a second arm 244 each having a sensor 382 and associated rod 394, when the trolley and associated lances are moved in the up/down, left/right directions during operation of the pre-existing indexer, the magnet 351 on slider 385 of retrofit kit 346 will be moved parallel to one or the other of rods 394 and will provide an X or Y position reading (depending on the rail/axis). The x/y coordinates are therefore determined by the sensor 382 on the X-axis (i.e., second arm 244) giving an x coordinate reading and the sensor 382 on the Y-axis (i.e. first arm 246) giving a y coordinate reading. The combined sensor readings therefore provide the x/y coordinates for a selected opening on the face plate.

Slider 385 is also different from slider 285. This can be seen by comparing slider 285 shown in FIG. 18 with slider 385 shown in FIG. 29. FIG. 29 shows that draw wire 294 is omitted from groove 248a and is replaced with rod 394. Groove 248b (FIG. 18) shows a section of draw wire 294 received therein but groove 248b (FIG. 29) does not include a length of draw wire or a rod. Slider 385 is generally U-shaped in cross-section like slider 286. However, a middle leg of the U-shaped slider 385 defines a hole 385b therein that extends from an outer surface of the middle leg of the slider 385 to an interior surface thereof. Slider 385, like slider 285, includes one or more glide pads 350, one of which is located in recessed region 385a of slider 385 adjacent the middle leg. This glide pad 360, unlike a similar glide pad 250 in slider 285, defines a hole 350a therein that is positioned to align with hole 385b. A set-screw magnet 351 is received through these aligned holes 385a, 350a. It should be noted that magnet 361 is oriented at right angles to rod 394. It should further be noted that magnet 36a does not need to be a set-screw magnet but may be of any other suitable type and configuration of magnet.

Kit 346 includes one other change relative to kit 346 and that is that the pulley 295 (FIG. 19) is omitted from second end 246b of second arm 246b. Pulley 295 is no longer required because draw wire 294 is omitted from kit 346 and is instead replaced by rod 394.

Figure 27:
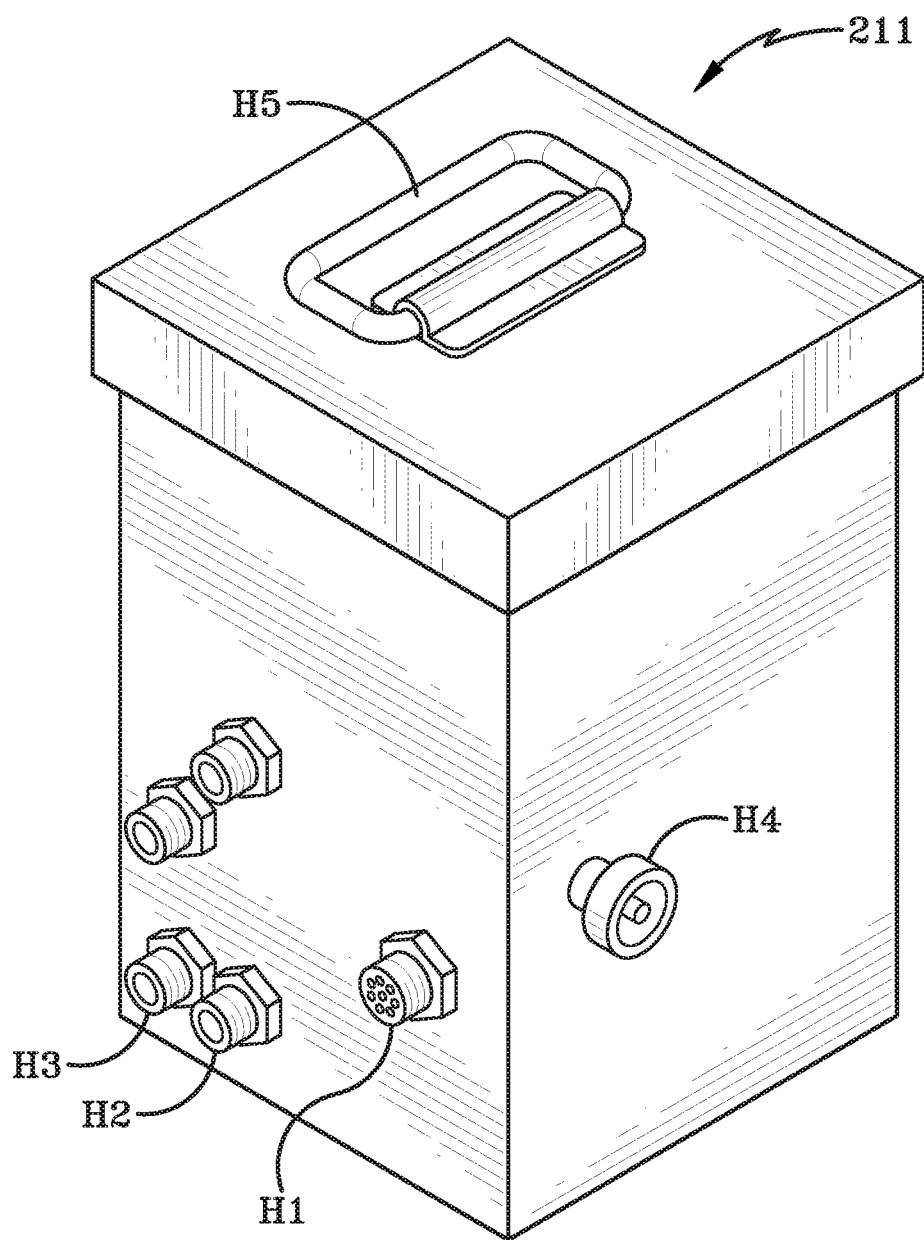
FIG. 27 is a perspective view of a control hub that may be used with indexer retrofit kit.

As slider 385 moves toward sensor housing 278 and away therefrom, the magnetostrictive sensor 382, either directly or indirectly through rod 394, detects the location of magnet 351 on slider 385, and particularly detects the magnetic field thereof. Sensor 382 may be operatively engaged with one or both of first and second cable connectors 261, 263 which in turn are operatively engaged with hub 211 (FIG. 27). Sensor 382 is utilized to determine the position or change in position of slider and therefore provides information that is useful to determine the positioning of the nozzles relative to the tubes to be cleaned as has been described previously herein.

It will be understood that while magnetostrictive sensor 382, rod 394 and magnet 351 have been described with respect to their inclusion in the retrofit kit 346, it will be understood that sensor 382, rod 394, and magnet 351 may be used in indexer 10 in the place of sensor 82. Appropriate changes to indexer 10 may be made to use sensor 382 instead of sensor 82 such as omitting draw wire 94 and the various pulleys that are required to work with draw wire 94. Two magnetostrictive sensors 382 may be utilized (one on each of the indexer's arms) along with their associated rods 394. Additionally, a magnet 351 may be engaged with trolley 102 so that the position of trolley 102 may be accurately determined by sensor 382. Another magnet 351 may be engaged with the junction box 52.

It will further be understood that various types of magnetic sensors other than magnetostrictive sensor 382 could be utilized in retrofit kit 346 or in the indexer 10.

It will be understood that apart from the components described above, the cleaning system 10 may be provided with one or more optical devices, such as one or more cameras or lasers to aid the operator in viewing, measuring and navigating the face plate 34. These optical devices may be utilized during setup and during cleaning operations.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A method comprising:
   providing a fluid jet machine for performing an operation using pressurized fluid sprayed through a nozzle; wherein the fluid jet machine is portable;
   providing a stand-alone control unit, where the control unit includes a housing and is portable;
   providing one or more connectors on the housing;
   providing a plurality of control valves in the control unit;
   connecting the plurality of control valves in the control unit to a pump on the fluid jet machine utilizing the one or more connectors;
   providing a computing device that is hand-held and mobile to a human operator located on the ground and within sight of the fluid jet machine; wherein the computing device includes a user interface;
   wirelessly connecting the computing device to the control unit;
   sending one or more wireless signals from the computing device to the control unit;
   actuating the plurality of control valves in the control unit upon receipt of the one or more wireless signals;
   assuming control of the pump on the fluid jet machine with the control unit;
   manipulating the user interface on the computing device to operate the fluid jet machine via the one or more connectors and the plurality of control valves of the control unit; and
   selectively actuating the pump on the fluid jet machine using one or more of the plurality of valves on the control unit; and
   performing the operation of the fluid jet machine.

2. The method of claim 1, wherein the using of wireless signals further comprising:
   sending a first signal from the computing device held by the human operator to the control unit;
   translating the first signal into a second signal;
   sending the second signal from the control unit to the fluid jet machine via the connector; and
   actuating an operation of the fluid jet machine when the fluid jet machine receives the second signal.

3. The method of claim 1, further comprising:
   providing a plurality of selectable options on the user interface of the computing device, wherein each option corresponds to an operation of the jet machine;
   selecting, by contacting the user interface with the human operator's finger, an option corresponding to a desired operation of the fluid jet machine;
   encapsulating information about the selected option into a first signal;
   sending the first signal from the computing device to the control unit;
   translating the first signal into a second signal;
   sending the second signal from the control unit to the fluid jet machine via the connector; and
   actuating the desired operation of the fluid jet machine when the fluid jet machine receives the second signal.

4. The method of claim 3, further comprising:
   correlating the second signal with a particular combination of the plurality of control valves; and actuating each control valve in the particular combination to send the second signal from the control unit to the fluid jet machine.

5. The method of claim 4, further comprising generating a pressure through each control valve in the particular combination to send the signal from the control unit to the fluid jet machine.

6. A system adapted to activate and deactivate an operation of a portable fluid jet machine, the system comprising:
a fluid jet machine that is portable;
a hand-held mobile computing device having a touchscreen user interface and a first wireless module;
a control unit that is stand-alone and portable, said control unit having:
a housing;
a second wireless module located within the housing;
a valve control body disposed inside the housing of the control unit, wherein the valve control body is selectively operable in an open position and a closed position;
a connector provided on the housing;
said connector having a first end and a second end, wherein the first end is connected to the valve control body, and wherein the second end is removably connected to a working unit via a pump of the fluid jet machine;
a wireless communication link between the first wireless module and the second wireless module;
wherein the computing device is operable by a human operator contacting the user interface in the immediate vicinity of the fluid jet machine to control and move the valve control body in real time between the open position and closed position via the wireless communications link and to thereby control the working unit via the pump of the fluid jet machine;
wherein the operation of the working unit via the pump of the fluid jet machine is activated when the valve control body is in one of the open position and the closed position;
and wherein the operation of the working unit via the pump of the fluid jet machine is deactivated when the valve control body is in the other one of the open position and the closed position.

7. The system of claim 6, wherein the fluid jet machine is an indexer.

8. The system of claim 6, further comprising:
a first signal, wherein the first signal is sent from the first wireless module to the second wireless module via the communication link, and wherein the valve control body moves to the open position when the second wireless module receives the first signal; and
a second signal sent from the first wireless module to the second wireless module via the communication link, and wherein the valve control body moves to the closed position when the second wireless module receives the second signal; and wherein the first signal and the second signal is generated by physically contacting and manually manipulating the touchscreen user interface using the human operator's hand.

9. The system of claim 6, further comprising:
a fluid disposed in valve control body and the connector;
wherein the operation is activated via the fluid when the valve control body is in one of the open position and the closed position; and
wherein the operation is deactivated via the fluid when the valve control body is in the other of the open position and the closed position.

* * * * *